(12) United States Patent
Yoshida

(10) Patent No.: US 7,904,424 B2
(45) Date of Patent: Mar. 8, 2011

(54) METHOD FOR MANAGING DOCUMENT DATA AND DATA STRUCTURE

(75) Inventor: Eiichi Yoshida, Toyokawa (JP)

(73) Assignee: Konica Minolta Business Technologies, Inc., Chiyoda-Ku, Tokyo (JP)

(*) Notice: Subject to any disclaimer, the term of this patent is extended or adjusted under 35 U.S.C. 154(b) by 460 days.

(21) Appl. No.: 12/026,039

(22) Filed: Feb. 5, 2008

(65) Prior Publication Data
US 2008/0212129 A1 Sep. 4, 2008

(30) Foreign Application Priority Data

Feb. 14, 2007 (JP) .................................. 2007-033586

(51) Int. Cl.
*G06F 17/00* (2006.01)
(52) U.S. Cl. ......... 707/638; 707/613; 707/610; 707/611; 707/620; 707/624; 707/634; 707/626; 707/640; 707/661; 707/674; 707/692; 707/694; 707/736; 707/791; 707/802; 707/822; 707/828; 709/217; 709/225; 358/1.15; 358/448; 705/51; 705/1
(58) Field of Classification Search .................. 707/613, 707/610, 611, 620, 624, 634, 626, 640, 661, 707/674, 692, 694, 736, 791, 802, 822, 828, 707/999.203, 999.202, 999.204; 709/217, 709/225; 358/1.15, 448; 705/51, 1
See application file for complete search history.

(56) References Cited

U.S. PATENT DOCUMENTS

| 7,042,583 | B1 | 5/2006 | Wilkins et al. |
| 2003/0014441 | A1 | 1/2003 | Suzuki et al. |
| 2003/0101065 | A1 | 5/2003 | Rohall et al. |
| 2003/0115439 | A1* | 6/2003 | Mahalingam et al. ............ 712/1 |
| 2005/0138139 | A1* | 6/2005 | Jain et al. ....................... 709/217 |
| 2005/0171914 | A1 | 8/2005 | Saitoh |
| 2006/0123337 | A1 | 6/2006 | Koinuma |

FOREIGN PATENT DOCUMENTS

| JP | 09-034901 | 2/1997 |
| JP | 10-232879 | 9/1998 |
| JP | 2001-023297 | 1/2001 |
| JP | 2002-016788 A1 | 1/2002 |
| JP | 2002-183141 A | 6/2002 |
| JP | 2003-099303 A1 | 4/2003 |
| JP | 2004-102627 A1 | 4/2004 |
| JP | 2004102627 A * | 4/2004 |

(Continued)

OTHER PUBLICATIONS

Notification of Reason(s) for Refusal in JP 2007-033586 dated Feb. 3, 2009, and an English Translation thereof.

(Continued)

*Primary Examiner* — Syling Yen
(74) *Attorney, Agent, or Firm* — Buchanan Ingersoll & Rooney PC

(57) ABSTRACT

A method is provided which enables to know a location of copied document data without the use of a server or others. Document data that is data used for reconstructing a document is managed by combining, in one document object, the document data along with relationship information for identifying other document data generated by reproducing the document data. Likewise, when a reproduction process is performed, the other document data is managed by combining, in one document object, the other document data along with relationship information for identifying the reproduction.

10 Claims, 55 Drawing Sheets

FOREIGN PATENT DOCUMENTS

| | | |
|---|---|---|
| JP | 2005-259108 | 9/2005 |
| JP | 2007-097008 | 4/2007 |

OTHER PUBLICATIONS

European Search Report Application/Patent No. 08002175.1-1228, dated May 19, 2008.

Notification of Reason(s) for Refusal in JP 2007-033586 dated Jun. 16, 2009, and an English Translation thereof.

Decision to Grant Patent issued in corresponding Japanese Application No. 2007-033586 dated Oct. 6, 2009, and an English Translation thereof.

* cited by examiner

| DOCUMENT OBJECT ID | RELATIONSHIP | DOCUMENT LOCATION | DOCUMENT DATA ACCESS PORTION KEY |
|---|---|---|---|
| 3053973 | PARENT | 705-1320030 | NO |
| 4000100 | CHILD | 705-6327 | YES:ABC123XYZ987 |
| 7053489 | CLONE | 108-100 | NO |
| 0252000 | OWNER | Username-1@domain-A | NO |

FIG. 20A
704

| DOCUMENT OBJECT ID | RELATIONSHIP | DOCUMENT LOCATION | DOCUMENT DATA ACCESS PORTION KEY |
|---|---|---|---|
| 1230000 | PARENT | 705-1230000 | NO |
| 0252000 | OWNER | Username-1@domain-A | NO |

FIG. 20B
704

| DOCUMENT OBJECT ID | RELATIONSHIP | DOCUMENT LOCATION | DOCUMENT DATA ACCESS PORTION KEY |
|---|---|---|---|
| 1230001 | CHILD | 705-1320031 | YES:ABC123XYZ001 |
| 0252000 | OWNER | Username-1@domain-A | NO |

METHOD FOR MANAGING DOCUMENT DATA AND DATA STRUCTURE

This application is based on Japanese patent application No. 2007-033586 filed on Feb. 14, 2007, the contents of which are hereby incorporated by reference.

BACKGROUND OF THE INVENTION

1. Field of the Invention

The present invention relates to a method for managing document data and a data structure including document data.

2. Description of the Related Art

An Information Technology (IT) environment has recently been developed. The IT environment development causes, for example, the increase in CPU processing power, in capacity of storage devices such as a RAM, a hard disk drive and a removable disk, in communication speed, in scan resolution of scanners, and in display resolution of displays.

In relation to that, large volumes of electronic documents can be easily replicated (copied) and distributed to many places.

In this way, document distribution becomes convenient. At the same time, however, it can be said that the leakage of confidential information and privacy information is liable to occur. Efforts are required to prevent such information leakage.

For example, a method is often used of managing document data in a server in a centralized manner and of requesting password entry upon distributing data. In addition, a method is often used of distributing data after being encrypted. According to these methods, only a person who has a password or a decryption key can browse documents.

There is proposed a method described in Japanese unexamined patent publication No. 2002-183141. According to this method, in response to a request for permission to browse a document from a browsing terminal, a document managing server issues browsing permission and a unique code. The browsing terminal receives the browsing permission to browse the document and puts the unique code in the document to update the document.

It is unclear how distributed data is dealt with after distribution. Stated differently, it can be said that data becomes in an unmanaged state after distribution. In view of network development in recent years, data traceability is very important in order to enhance the certainty of information management. Accordingly, it is conceivably possible to use a method described in Japanese patent publication No. 3383793.

According to the method, a contents copying machine reads a contents ID from a contents copy original in which a contents ID is embedded and transmits the contents ID and information of a copy event attribute that are read to a contents ID management center via network. The contents ID management center acquires the original of the contents from the received contents ID, gives a new contents ID to the original, records the information of the contents ID and the copy event attribute, embeds the new contents ID to the original of the contents and returns the result to a copy request source. The contents copying machine outputs the returned original as a copy result.

Japanese unexamined patent publication No. 2003-99303 discloses an invention relating to a data structure. Japanese unexamined patent publication No. 2004-102627 discloses a method for determining a correlation between the original document and a replicated document.

New document data is being generated on a daily basis. Besides, as described above, large quantities of generated data can be easily replicated and distributed. Thus, a large sever is required to trace where data is present and to manage data in a server in a centralized manner, which incurs a high cost.

SUMMARY

The present disclosure is directed to solve the problems pointed out above, and therefore, an object of an embodiment of the present invention is to know a location of data without using a server or others.

According to one aspect of the present invention, a document data management method is a method for managing document data that is data used for reproducing a document. The method includes generating other document data by replicating the document data, and combining, in one unit, the document data along with child identification data indicating the other document data.

Preferably, the document data may be combined along with parent identification data in one unit. The parent identification data indicates which of other document data is replicated to generate the document data.

Further, document data may be managed by the following method. The method includes, in a case where second generation document data can be generated by replicating first generation document data that is original document data and $(n+1)$-th ($n \geq 2$) generation document data can be generated by replicating n-th generation document data, combining the first generation document data and child identification data in one unit, the child identification data indicating the second generation document data generated by replicating the first generation document data, and combining k-th ($k \geq 2$) generation document data and parent identification data in one unit, the parent identification data indicating which of other $(k-1)$-th generation document data is replicated to generate the k-th generation document data.

Preferably, the method may further include incorporating, into the unit where the first generation document data is combined, an event execution permission/denial determination program for implementing a determination portion that is operable to determine permission/denial of execution of an event relating to document data whose generation is younger than the second generation document data, and incorporating, into each of the units where the document data is combined, an information exchange program for implementing an information exchange portion that is operable to send and receive information, and when the event relating to the k-th generation document data is executed, implementing, in a computer managing the k-th generation document data, the information exchange portion relating to the k-th generation document data by causing the computer to execute the information exchange program, implementing, in each computer managing document data that is in a direct line from the k-th generation document data and is older than the k-th generation document data, the information exchange portion relating to each piece of the older document data by causing each of the computers to execute the information exchange program, implementing, in a computer managing the first generation document data, the determination portion by causing the computer to execute the determination program, giving, to the determination portion implemented in the computer managing the first generation document data, a request to the effect that execution of the event relating to the k-th generation document data should be permitted, by causing each of the information exchange portions relating to each piece of the older document data to relay the request in a manner to deliver the request from the information exchange portion relating to the k-th generation document data to older generation document data based on parent attribute information, causing the determination portion to determine whether execution of the event relating to the k-th generation document data is permitted, and executing the event in a case where the determination portion determines that execution of the event relating to the k-th generation document data is permitted.

The method may further include combining, in one unit, log data indicating a log relating to the executed event and any document data that is in a direct line from the document data as a target of the event and is older than the target.

The "unit" herein means a group, a set or an assembly. In some cases, one unit may be formed by combining a plurality pieces of data in one file. In other cases, one unit may be formed by combining a plurality pieces of data in one folder. Further, one unit may be formed by assigning a common ID to a plurality pieces of data. A program may be included in a unit.

In embodiments described below, a document object 7 corresponds to a unit. As shown in FIG. 4, the document object 7 includes a document data 700 through a document object interface 708 that may be combined in one file or folder or may not be combined therein. In the latter case, a common ID is assigned to the document data 700 through the document object interface 708, and thereby a unit can be formed.

The structure described above allows for knowing a location of document data without the use of a server or others. Further, the structure described above allows for easily knowing an event that was performed on a replication of document data.

These and other characteristics and objects of the present invention will become more apparent by the following descriptions of preferred embodiments with reference to drawings.

BRIEF DESCRIPTION OF THE DRAWINGS

FIG. 8 shows an example of relationship information.

FIGS. 20A and 20B show an example of relationship information each.

DESCRIPTION OF THE PREFERRED EMBODIMENTS

Figure 1:
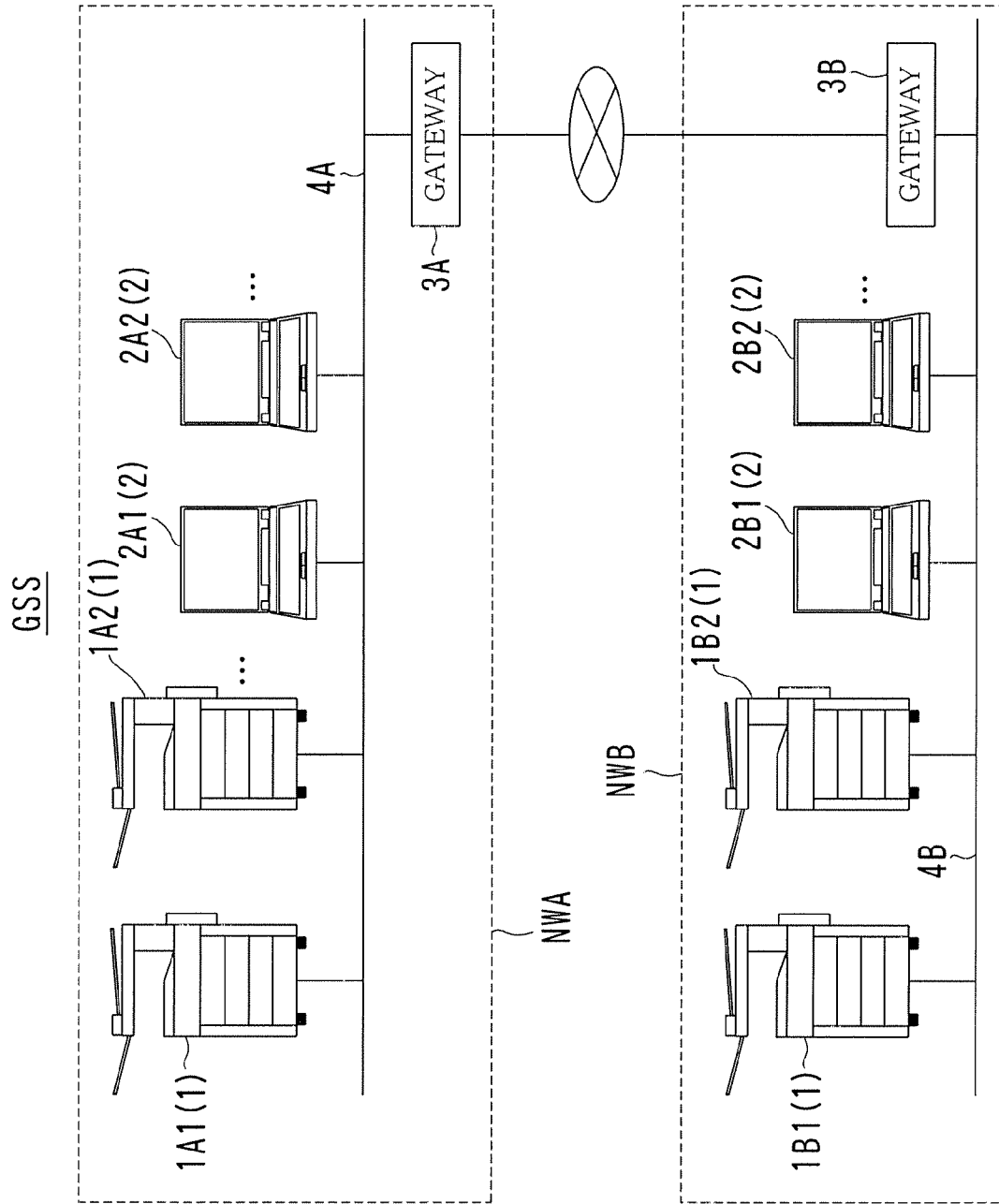
FIG. 1 is a diagram showing an example of the overall configuration of an image processing system.

Referring to FIG. 1, an image processing system GSS includes two local area networks NWA and NWB.

The local area network NWA includes a plurality of image forming apparatuses 1A1, 1A2, . . . , a plurality of general-purpose computers 2A1, 2A2, . . . , a gateway 3A and a communication line 4A.

Likewise, the local area network NWB includes a plurality of image forming apparatuses 1B1, 1B2, . . . , a plurality of general-purpose computers 2B1, 2B2, . . . , a gateway 3B and a communication line 4B.

Hereinafter, the image forming apparatuses 1A1, 1A2, . . . and 1B1, 1B2, . . . are collectively referred to as an "image forming apparatus 1". Likewise, the general-purpose computers 2A1, 2A2, . . . and 2B1, 2B2, . . . are collectively referred to as a "general-purpose computer 2".

Each of the gateways 3A and 3B is a device such as a router that serves to connect to other network via a dedicated line, a public line or the Internet line. The gateways 3A and 3B enable the apparatuses in the respective local area networks NWA and NWB to connect to each other for communication.

The image forming apparatus 1 is an image processing apparatus into which various functions such as a copy function, a scanner function, a FAX function, a printing function and a box function are integrated. The image forming apparatuses 1 are sometimes called Multi Function Peripherals (MFPs).

Figure 2:
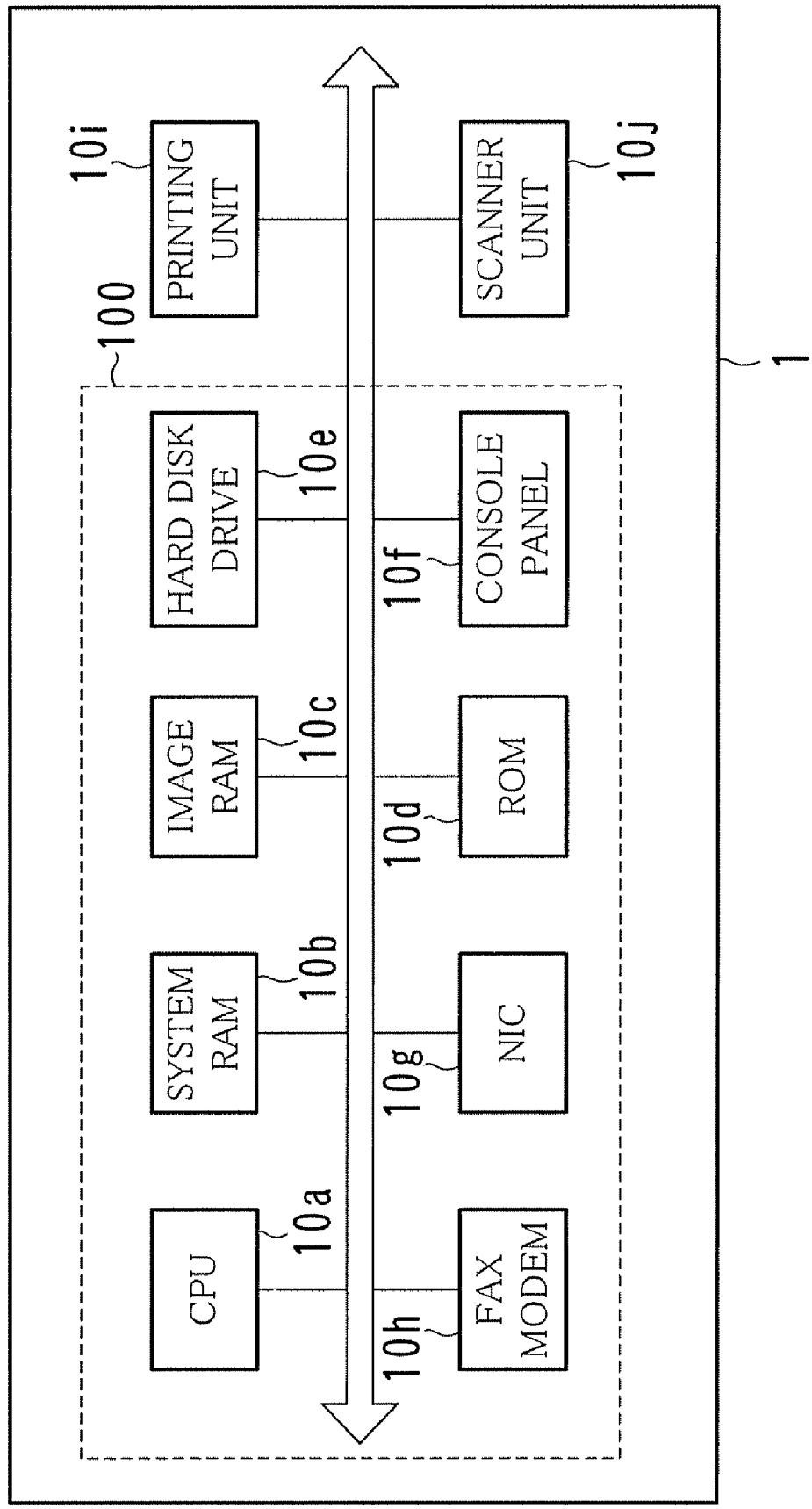
FIG. 2 is a diagram showing an example of a hardware configuration of an image forming apparatus.

Referring to FIG. 2, the image forming apparatus 1 includes a control portion 100, a printing unit 10$i$ and a scanner unit 10$j$.

The scanner unit 10$j$ optically reads original images including text, numerical expressions, symbols, photographs, diagrams or illustrations that are depicted on a sheet of paper, and generates image data.

The printing unit 10$i$ prints, on a sheet of paper, an image that is formed based on image data captured with the scanner unit 10$j$, image data sent from the general-purpose computer 2, or image data (FAX data) sent from other device with a FAX function.

The control portion 100 includes a CPU 10$a$, a system RAM 10$b$, an image RAM 10$c$, a ROM 10$d$, a hard disk drive 10$e$, a console panel 10$f$, a network interface 10$g$ and a Fax modem 10$h$. The control portion 100 serves to control the printing unit 10$i$ and the scanner unit 10$j$, to correct image data, to convert an image data format and to perform communication with other apparatus.

Figure 4:
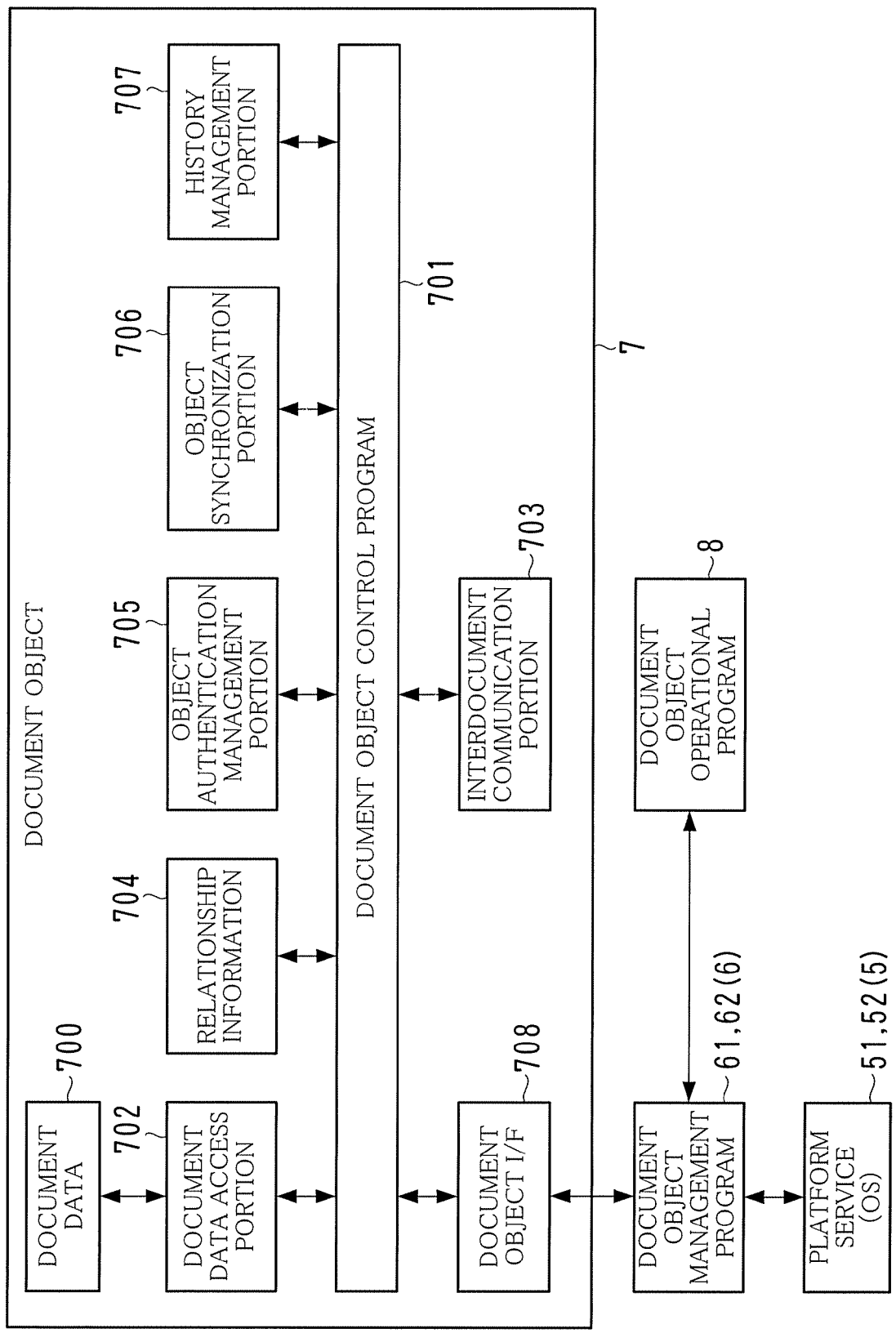
FIG. 4 is a diagram showing an example of a structure of a document object.

In the ROM 10$d$ are stored a platform service 51, various types of control programs, a document object management program 61 and others (see FIG. 4).

The platform service 51 is a program for providing basic services of the image forming apparatus 1 including a service of displaying a screen on the console panel 10$f$ and a protocol stack service for communication. In short, it can be said that the platform service 51 is an operating system of the image forming apparatus 1. The document object management program 61 is a program for managing a document object that is described later.

The programs are loaded into the system RAM 10$b$ appropriately when the image forming apparatus 1 is started or others, and the CPU 10$a$ executes the programs. Other than the above, data necessary for executing the programs is loaded into the system RAM 10$b$ appropriately.

The console panel 10$f$ includes a touch panel type liquid crystal panel, a start button and function buttons for selecting various functions.

The network interface log is a Network Interface Card (NIC) for performing data communication with other apparatuses using a protocol such as TCP/IP. The Fax modem 10$h$ is an interface for performing data communication with other apparatuses with a FAX function using FAX protocol.

In the hard disk drive 10$e$ is provided, for each user, a storage area called, for example, a "box" or a "personal box" corresponding to a folder or a directory in a personal computer. In short, a storage area for the box function is provided. A user can save document data such as an image file in his/her box. Besides, a user can save therein a file of a document object, which will be described later.

Further, it is possible to cause the hard disk drive 10$e$ to store a part or the whole of the programs stored in the ROM 10$d$.

The image RAM 10$c$ stores image data captured with the scanner unit 10$j$, image data sent from the general-purpose computer 2 or the like, or image data called from a box.

Each of the portions included in the image forming apparatus 1 cooperates with one another and implements each function, for example, in the following manner. In the case of performing the copy function, the scanner unit 10$j$ captures an original image to generate image data. The image data is temporarily stored in the image RAM 10$c$ and is sent to the printing unit 10$i$. The printing unit 10$i$ uses this image data to print the original image.

In the case of performing the scanner function, the scanner unit 10$j$ captures an original image to generate image data. The image data is temporarily stored in the image RAM 10$c$. The CPU 10$a$ encodes the image data into a general-purpose image format, e.g., GIF or PDF. Then, the image data thus encoded is, depending on instructions from a user, sent to other apparatus with the network interface log or stored in a box of the hard disk drive 10$e$.

In the case of performing a FAX transmission function, the scanner unit 10$j$ captures an original image to generate image data. The image data is temporarily stored in the image RAM 10$c$. The CPU 10$a$ converts the image data into data of a resolution and a compression format corresponding to the FAX protocol. The FAX modem 10$h$ sends the image data (FAX data) to other party that is connected by dialing a FAX number designated by a user.

At the time of performing a FAX reception function, image data (FAX data) received by the FAX modem 10$h$ is temporarily stored in the image RAM 10$c$. Then, the CPU 10$a$ converts the image data into data of a printable format and the printing unit 10$i$ uses the image data thus converted to print an image.

At the time of performing the printer function, image data that is received by the network interface 10$g$ and is described by a page description language is temporarily stored in the image RAM 10$c$. Then, the printing unit 10$i$ uses the image data to print an image.

In the case of performing the printer function using the box function, the CPU 10$a$ calls out document data accumulated in a box to the image RAM 10$c$ and converts the document data thus called out into printable format data. The printing unit 10i uses the document data thus converted to print an image. The printing process can be performed over and over again unless the number of printing processes is limited.

Figure 3:
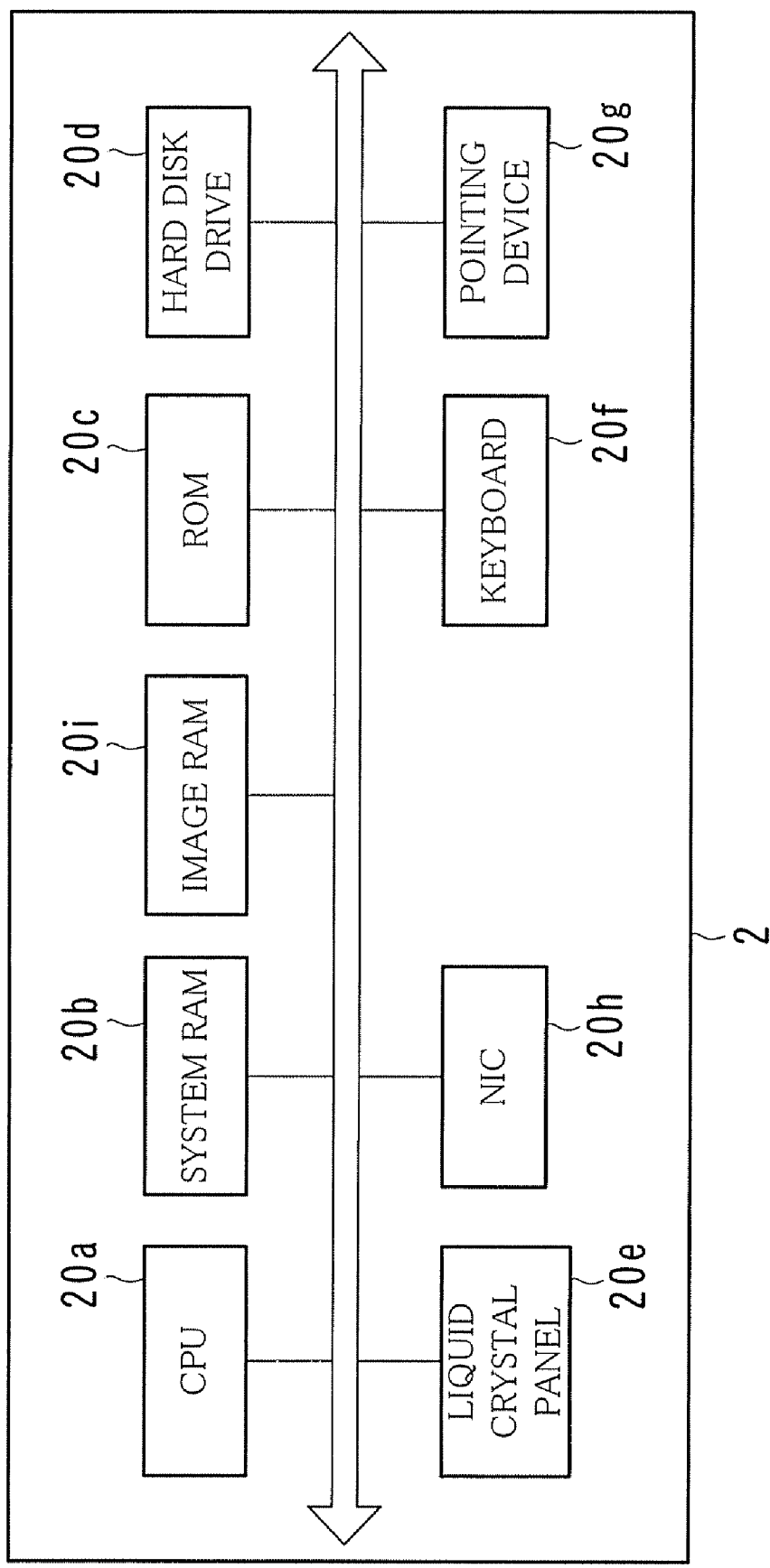
FIG. 3 is a diagram showing an example of a hardware configuration of a general-purpose computer.

Referring back to FIG. 1, the general-purpose computer 2 is typically a personal computer or a workstation that is used as a terminal of the image forming apparatus 1. Referring to FIG. 3, the general-purpose computer 2 includes a CPU 20a, a system RAM 20b, a ROM 20c, a hard disk drive 20d, a liquid crystal panel 20e, a keyboard 20f, a pointing device 20g, a network interface card (NIC) 20h and an image RAM 20i.

The ROM 20c or the hard disk drive 20d stores a platform service 52, various types of control programs and a document object management program 62 and others (see FIG. 4).

The platform service 52 is an operating system for providing basic services of the general-purpose computer 2. The document object management program 62 manages a document object that is described later as with the document object management program 61 of the image forming apparatus 1.

The programs are loaded into the system RAM 20b appropriately when the general-purpose computer 2 is started or others, and the CPU 20a executes the programs.

As described above, the platform service 51 and the document object management program 61 are prepared in the image forming apparatus 1, while the platform service 52 and the document object management program 62 are prepared in the general-purpose computer 2. Besides, as shown in FIG. 4, a document object operational program 8 is prepared in the image forming apparatus 1 and the general-purpose computer 2.

The platform services 51 and 52 are operating systems of the image forming apparatus 1 and the general-purpose computer 2 respectively as described above. Hereinafter, the platform services 51 and 52 are collectively referred to as a "platform service 5".

The document object management programs 61 and 62 are described in accordance with Application Program Interfaces (APIs) of the platform services 51 and 52 respectively. In addition, the document object management programs 61 and 62 include a common interface used for a process of a document object 7. Accordingly, the document object 7 can be used both in the image forming apparatus 1 in which the document object management program 61 runs and in the general-purpose computer 2 in which the document object management program 62 runs. The document object management programs 61 and 62 can be described by a language irrespective of the type of a device, for example, Java (Registered Trademark). Further, each of the image forming apparatus 1 and the general-purpose computer 2 may be provided with an execution engine for executing modules making up the document object management programs 61 and 62, respectively.

Hereinafter, the document object management programs 61 and 62 are collectively referred to as a "document object management program 6". The document object management program 6 is executed by the CPU 10a or the CPU 20a, and thereby a document object management portion is implemented.

The document object 7 is data used for reproducing a document image including text, numerical expressions, symbols, photographs, diagrams or illustrations. The document object 7, however, is not merely data for reproducing a document image. The document object 7 includes a program, so that it performs communication with other document object 7 and manages generations relating to replication. Stated differently, the document object 7 can be regarded as a unit in which document data and a program are combined with each other and independent-like data. The structure of the document object 7 and the independence mechanism thereof are sequentially described below.

Figure 5:
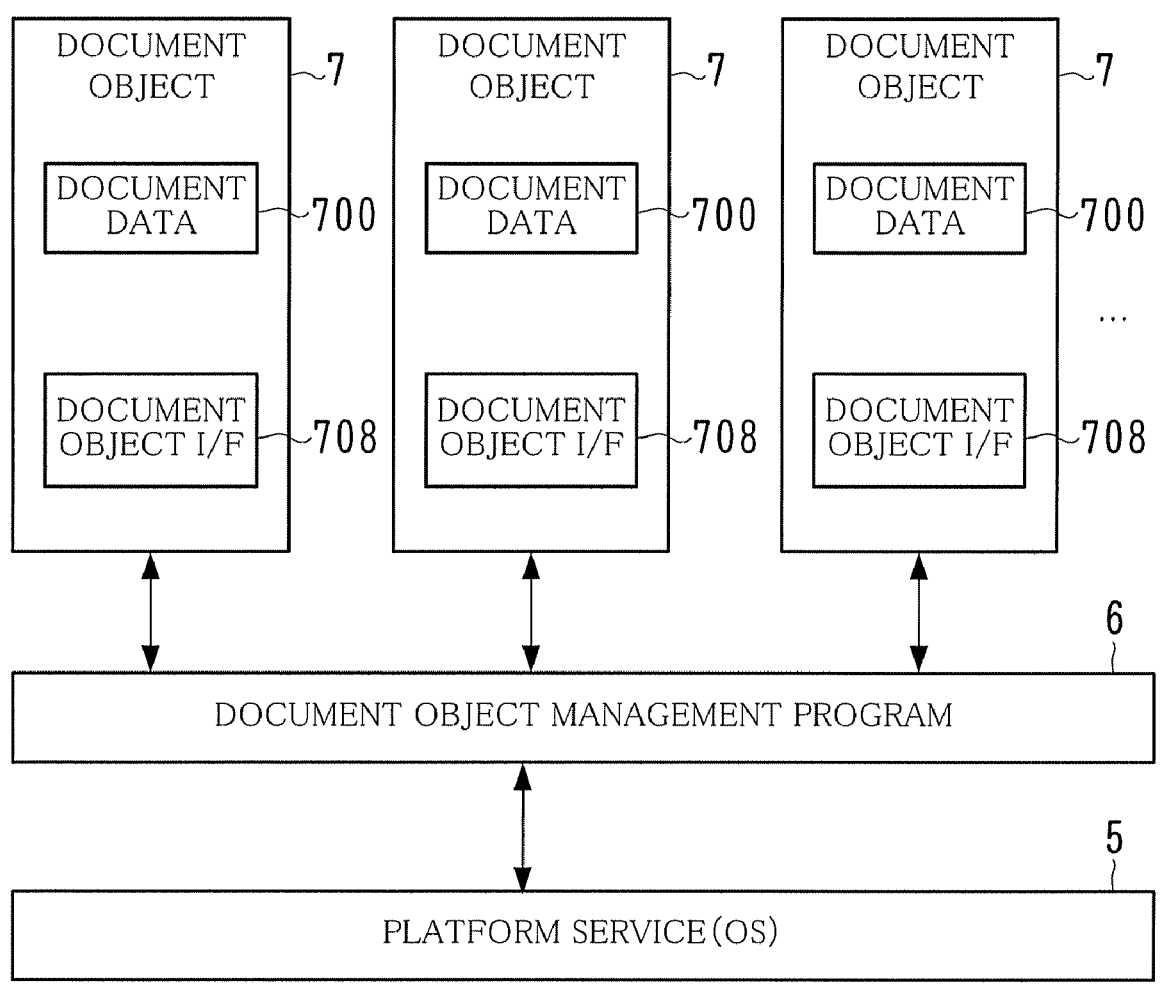
FIG. 5 is a diagram showing an example of a software configuration of an image forming apparatus and a general-purpose computer.

As shown in FIG. 5, the document object management program 6 manages document objects 7 accumulated on the same platform as the document object management program 6 itself in a centralized manner.

The document object management program 6 provides, for example, the services as described below. In the case where communication occurs between document objects 7, the document object management program 6 performs routing of the communication. In the case where a document object 7 uses a resource on the platform, the document object management program 6 calls a service routine of the platform service 5 and performs process conversion.

The document object management program 6 is resident in the system as a background service (daemon) and operates.

The document object operational program 8 provides a User Interface (UI) for a user to perform operation relating to a document object 7. While the document object operational program 8 runs, a user can give, to the image forming apparatus 1 or the general-purpose computer 2, a command to display the contents of a document object 7, a command to perform a printing process based on a document object 7, a command to replicate (copy) a document object 7 and other commands. The commands thus given are used by the document object management program 6 for a management process of document objects 7.

The CPU 10a or the CPU 20a executes the document object operational program 8, so that various portions are implemented including a portion for accepting operation that is performed on a document object by a user, a portion for notifying details of the operation to a document object management portion, and a portion for controlling a display of a screen.

The document object 7 is data made up of document data 700, a document object control program 701, a document data access portion 702, an interdocument communication portion 703, relationship information 704, an object authentication management portion 705, an object synchronization portion 706, a history management portion 707, a document object interface 708 and others.

Each of the document objects 7 is associated with identification information called a "document object ID" for distinguishing between the document objects 7. The document object 7 can be replicated (copied). Hereinafter, from the standpoint of a replication, the replication source is referred to as a "parent", a "one generation older document object" or the like. On the other hand, from the standpoint of a replication source, a replication is referred to as a "child", a "one generation younger document object" or the like. Further, from the standpoint of a replication source, a replication of a replication is referred to as a "grand child", a "two generation younger document object" or the like.

However, a document object that is replicated for backup in a removable disk or a standby server is dealt with exceptionally. Hereinafter, from the standpoint of a replication source, a replication for backup is referred to as a "clone". In addition, a replication source seen from the standpoint of a replication for backup is also a clone.

In the case where two document objects 7 that have document data 700 having the same contents are present, it is possible to determine the parent-child relationship later instead of determining the same at the beginning.

The document data 700 is data used for reproducing a document image. The document data 700 can be, for example, GIF, PDF, JPEG or TIFF format data, or data described in a page description language.

The document data 700 is encrypted by an encryption key AK. The contents of the encryption key AK, i.e., a character string thereof are desirably different for each document data 700. The following is a description of a case where common key cryptography is used.

The document data 700 is subjected to a scrambling process in the image forming apparatus 1 or the general-purpose computer 2, as with document data 700 of other document object 7 stored in the same image forming apparatus 1 or the same general-purpose computer 2.

Figure 6:
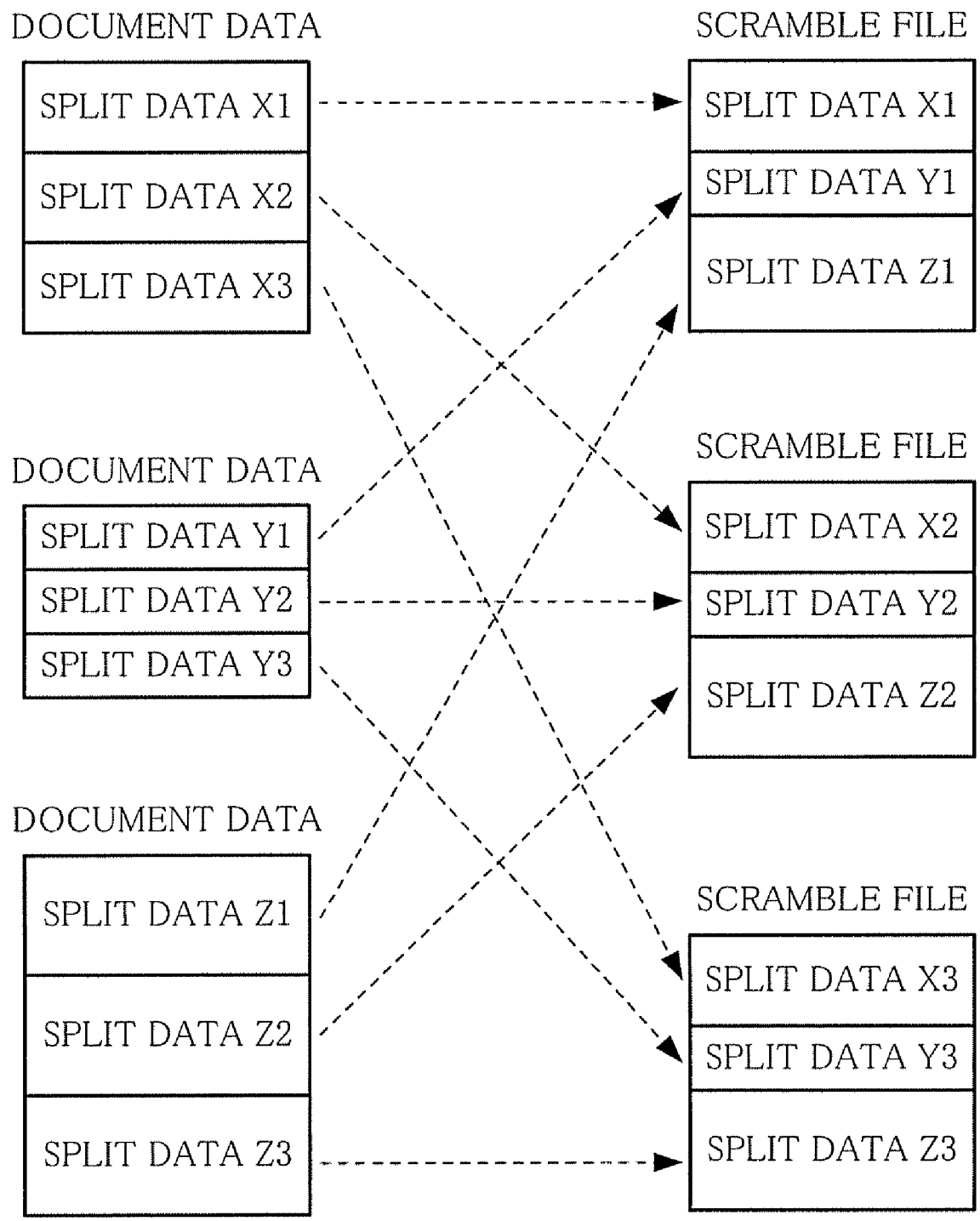
FIG. 6 is a diagram for explaining a method for saving document data.

Specifically, referring to FIG. 6, each piece of document data 700 is divided into plural pieces of split data. Then, the split data is combined with split data of other document data 700 and saved in plural scramble files separately based on a predetermined rule.

In the case where a new document object 7 is added to the same image forming apparatus 1 or the same general-purpose computer 2, split data that is obtained by dividing document data 700 of the new document object 7 is preferably added to the existing scramble files separately. In the case where the existing document object 7 is deleted, split data relating to document data 700 of the deleted document object 7 is preferably deleted from the existing scramble files.

A scrambling process may be performed between plural pieces of document data 700 of document objects 7 stored in the same storage medium.

In addition to the document data 700, the relationship information 704, which is described later, is subjected to a scrambling process together and saved.

A process relating to the scrambling process of the document data 700 is performed by the platform service 5 or the document object management program 6.

The document object interface 708 is a common interface to the document object management programs 61 and 62 described above.

The document object control program 701 determines behavior or handling of document data 700 and controls the document data access portion 702, the interdocument communication portion 703, the object authentication management portion 705, the object synchronization portion 706 and the history management portion 707 in accordance with the determined contents. In short, the CPU 10a or the CPU 20a executes the document object control program 701, and thereby a document object control portion is implemented.

The document data access portion 702 performs the following process relating to access to document data 700 in accordance with a request made by the document object control program 701.

Specifically, the document data access portion 702 restores document data 700 and supplies the same to the image forming apparatus 1 or the general-purpose computer 2. The document data access portion 702 replicates the entire document object 7 including the document data access portion 702 itself. The document data access portion 702 edits (updates) the details of document data 700.

Besides, the document data access portion 702 uses the encryption key AK to decode the document data 700.

The processing details of the document data access portion 702 are described based on Java or the like in the document object 7 in the form of program. The program is executed, so that the document data access portion 702 is implemented. The same applies to the other portions that are sequentially described below.

The interdocument communication portion 703 performs a process for communicating with other document object 7. For example, the interdocument communication portion 703 exchanges operational information unique to the document object 7 using a predetermined protocol.

In the case where other document object 7 that is the other end of the communication is present on the same platform, the communication is performed via the document object management program 6 in the platform. This case can be said to be logical communication, because, in practice, the communication is performed not via a communication line. Hereinafter, such logical communication not via a communication line is also referred to as "communication" simply.

In the case where other document object 7 that is the other end of the communication is present on a different platform, a packet is generated on an application layer on the network in accordance with the standard of a system of a document object. Then, while routing is performed, communication is performed via both the platform services 5 and both the document object management programs 6.

Figure 7:
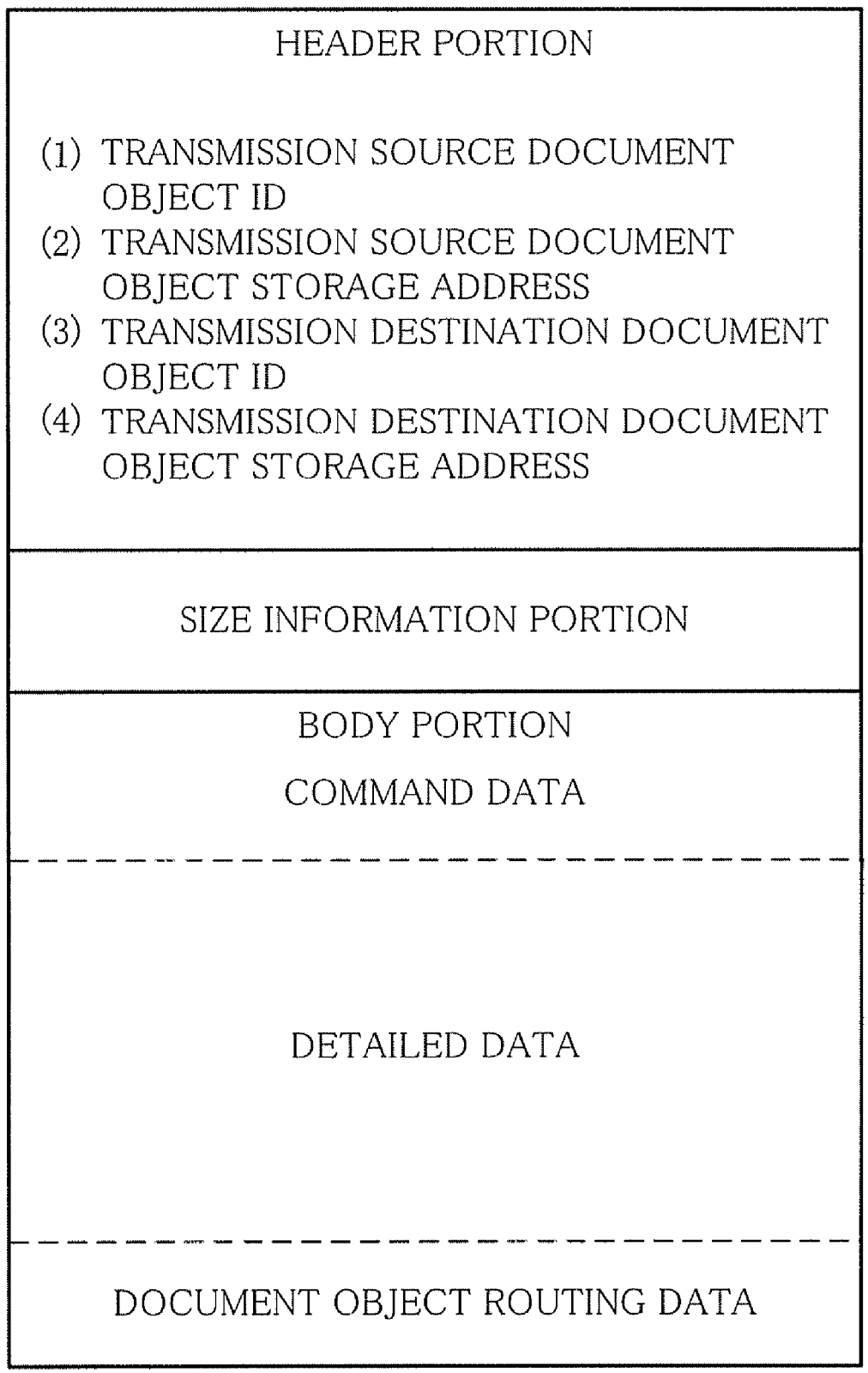
FIG. 7 is a diagram showing an example of a format of a packet used for sending a message.

Specifically, operational information is exchanged using a packet having a predetermined format as shown in FIG. 7.

Referring to FIG. 7, in a header portion are stored a document object ID of a document object 7 that is the transmission source, a document object storage address (document location) thereof, a document object ID of a document object 7 that is the transmission destination (the other party), and a document object storage address thereof. In a size information portion is stored information indicating a size of a body portion that is described next.

In the body portion is stored variable length data that is an object of communication. The variable length data includes command data, detailed data and document object routing data.

The command data indicates the details of a request regarding operation of a document object 7, e.g., replication (copying), browsing, editing or association. Alternatively, the command data indicates the details of a response to a request.

In the detailed data are set detailed parameters regarding the command data. In the case where the command data is related to, for example, a request in which editing of inserting the character "Confidential" into a position defined by the coordinates (x, y) of a document is performed on document data 700, the following data is set in the detailed data: I (insert): "Confidential" (character string), x, y The document object routing data indicates a relay status when a request or a response is transferred between a grand child and a child, or between a child and a parent. Every time when a relay is performed, the details thereof are added.

In some cases, the document object management program 6 issues such a packet for communication. In such a case, an identifier indicating a platform is specified in the document object ID and the document object storage address.

The document objects 7 can be mounted on plural apparatuses over a network because they are mounted as distributed objects.

In this embodiment, the document object interface 708 is configured to internally deliver a communication packet called a "document packet", and the internal programs (portions) perform message communication with one another. In the case of delivering data to outside the platform, the data is further encapsulated in a packet on network communication and communication is performed. This follows a general view of a hierarchical model of a network such as TCP/IP.

Referring to FIG. 8, the relationship information 704 includes information on each document object that is a parent, a younger generation (a child, a grand child, . . . ) or a clone of the document object 7 itself. Such information indicates a document object ID, a storage location (a document location) and a key for decoding (a document data access portion key) of the parent, the younger generation and the clone.

The document location may be information indicated by the number as shown in FIG. 8 or may be general-purpose identification information such as a domain name. The movement of the document object 7 changes the information described above accordingly.

The relationship information 704 further includes information on an owner of the document object 7 itself. In the case of information on an owner, the fields show the following items. The field "document object ID" specifies information for identifying the owner, e.g., a user account. The field "document location" specifies a transmission destination, e.g., an electronic mail address, when a message is notified to the owner. The field "document data access portion key" is not used.

Referring back to FIG. 4, the object authentication management portion 705 performs, based on a predetermined rule, an authentication process whether or not operation regarding a document object 7 is allowed. The operation is, for example, replicating document data 700 or performing a printing process using document data 700.

For example, a limit is placed on the number of times of replication of document data 700 or the number of times of printing process using document data 700. Then, in the case where a request for replication or for printing process is made, the request is accepted, provided that the number of times of replication or printing process up to the present does not reach the limited number of times.

A different configuration is possible in which, the request is accepted when the request source is present on the same platform as a document object 7 of the object authentication management portion 705, and the request is denied when the request source is present on a different platform.

These rules can be determined by an owner of the document object 7. In addition, data indicating those rules are included in the object authentication management portion 705.

A further different configuration is possible in which an inquiry is made to the owner of the document object 7 as to whether or not the request is accepted. In such a case, a message indicating that the request is to be accepted is sent to a notified destination of the owner described in relationship information 704 of the document object 7. Alternatively, a message indicating that the request is to be accepted is sent to an image forming apparatus 1 or a general-purpose computer 2 into which the owner logs currently. In the case where the owner does not currently log into any of the image forming apparatuses 1 or into any of the general-purpose computers 2, such a message is sent to an image forming apparatus 1 or a general-purpose computer 2 into which the owner logs the next time.

Figure 9:
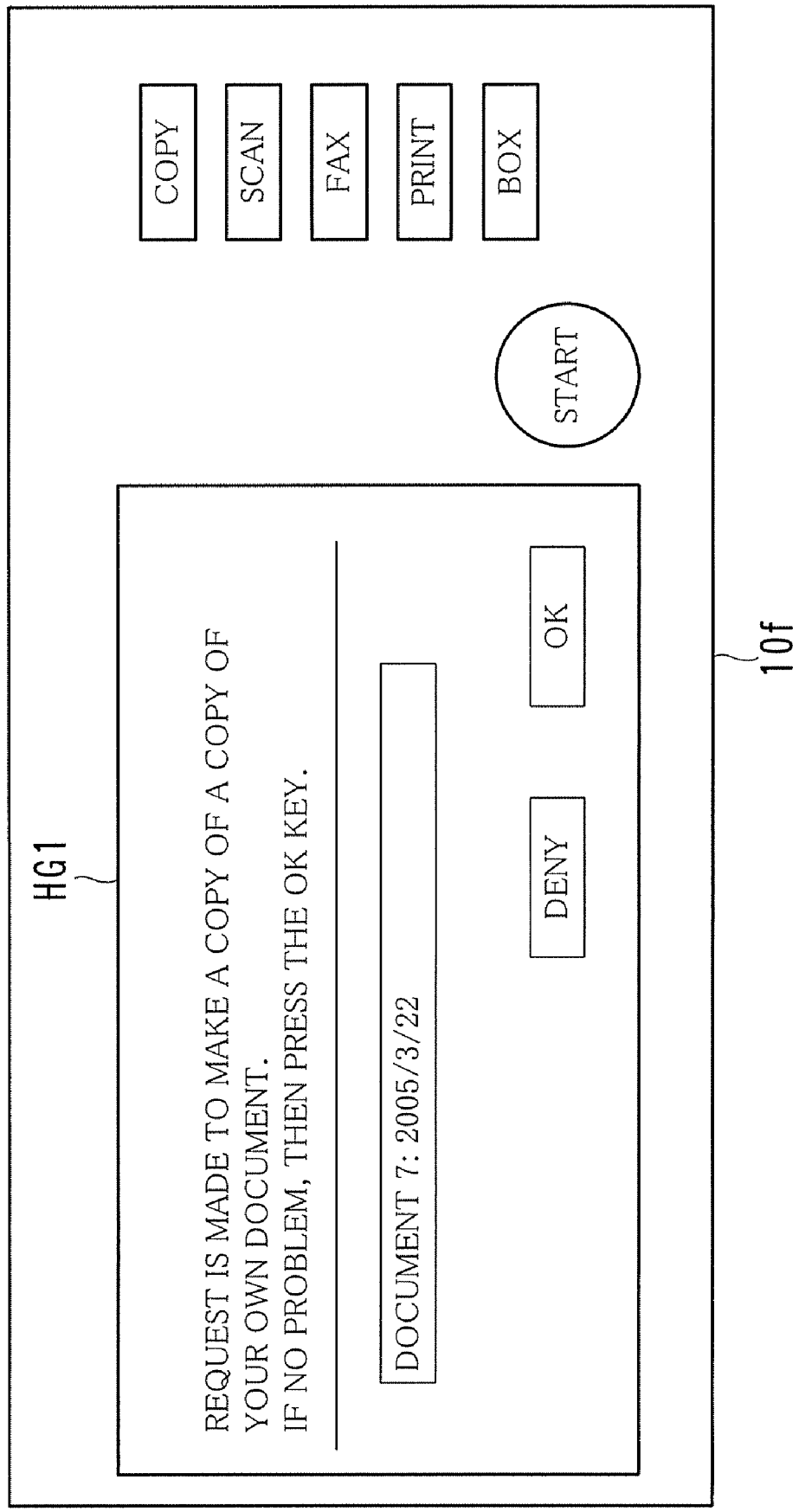
FIG. 9 shows an example of a permission request screen.

After that, a permission request screen HG1 as shown in FIG. 9 is displayed for the owner. If the owner touches the "OK" button, then the request is approved. If the owner touches the "deny" button, then the request is denied.

However, if the document object 7 has a parent, the object authentication management portion 705 requests the parent to perform an authentication process. Further, if the parent has a parent, the object authentication management portion 705 requests the parent of the parent to perform an authentication process. Stated differently, in the case where the document object 7 is not a first generation, i.e., is a second generation or later, the request for authentication process is relayed to older generations one by one and then is delivered to the first generation. Then, the object authentication management portion 705 in the first generation document object 7 performs the authentication process described above. The authentication result is relayed to younger generations one by one and is delivered to the request source.

Likewise, communication between generations, which will be sequentially described below, is so performed that target data is relayed to older generations one by one or relayed to younger generations one by one.

The object synchronization portion 706 performs a process for synchronizing the details of document data 700 between the document object 7 and a clone thereof.

Figure 10:
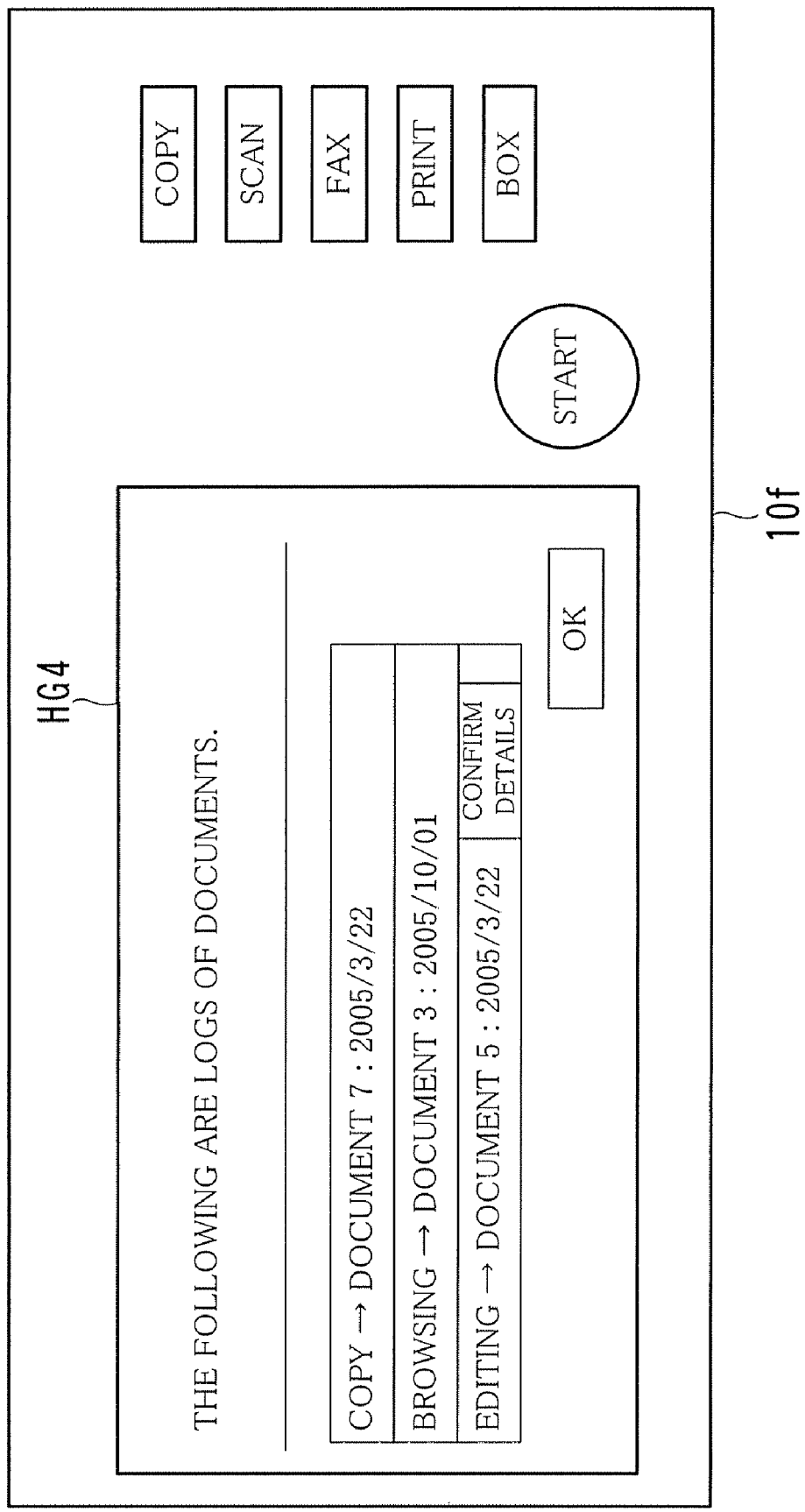
FIG. 10 shows an example of a history screen.

The history management portion 707 accumulates and manages, as history information, information on an editing (update) state of the document object 7, a distribution state and an editing state of a replication, and an issuance state and an editing state of a clone. Then, a history screen HG4 in which the history information is described is displayed as shown in FIG. 10.

As described above, the CPU 10$a$ or the CPU 20$a$ is caused to execute a program such as the document object control program 701, the document object management program 6, the document object operational program 8 or the platform service 5, and thereby various portions are implemented. Hereinafter, for simplicity, each of the portions is called a program for implementing the pertinent portion. Accordingly, giving data to a document object control portion by a document object management portion is described like this: "Giving data to the document object control program 701 by the document object management program 6". However, to be exact, this process is implemented for the CPU 10$a$ or the CPU 20$a$ to execute the document object management program 6 and the document object control program 701.

The following is a specific description as to what kind of process is performed by an image forming apparatus 1 or a general-purpose computer 2 with respect to a document object 7, and as to how the document object 7 operates in the image forming apparatus 1 and the general-purpose computer 2.

[Start of Program Upon Power ON and Display of Operational Screen]

When an image forming apparatus 1 is turned ON, the platform service 51, various system programs and the document object management program 61 are started. In other words, they are loaded into the system RAM 10$b$. Besides, data necessary for operating theses programs are also loaded into the system RAM 10$b$.

Figure 11:
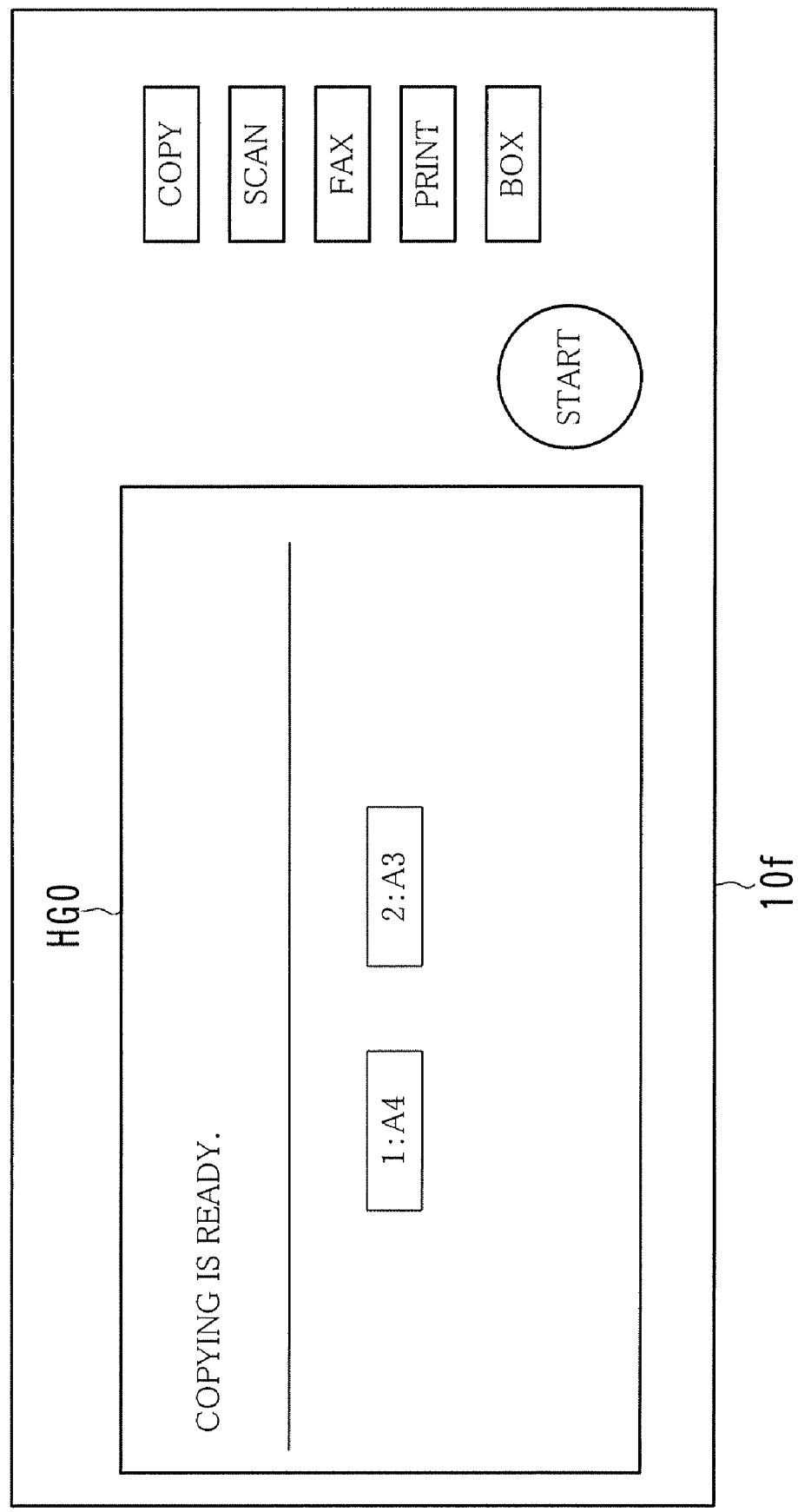
FIG. 11 shows an example of an operational screen.

After starting these programs, an operational screen HG0 as shown in FIG. 11 is displayed on a liquid crystal panel of the console panel 10$f$. Here, a user can give the image forming apparatus 1 a command to perform a process desired by him/her. The user can give a command to cause the image forming apparatus 1 to perform a replication (copy) process of an original, FAX transmission or a scanning process of an original as before. The user can also give a command to cause the image forming apparatus 1 to perform a process regarding a document object 7.

Figure 12:
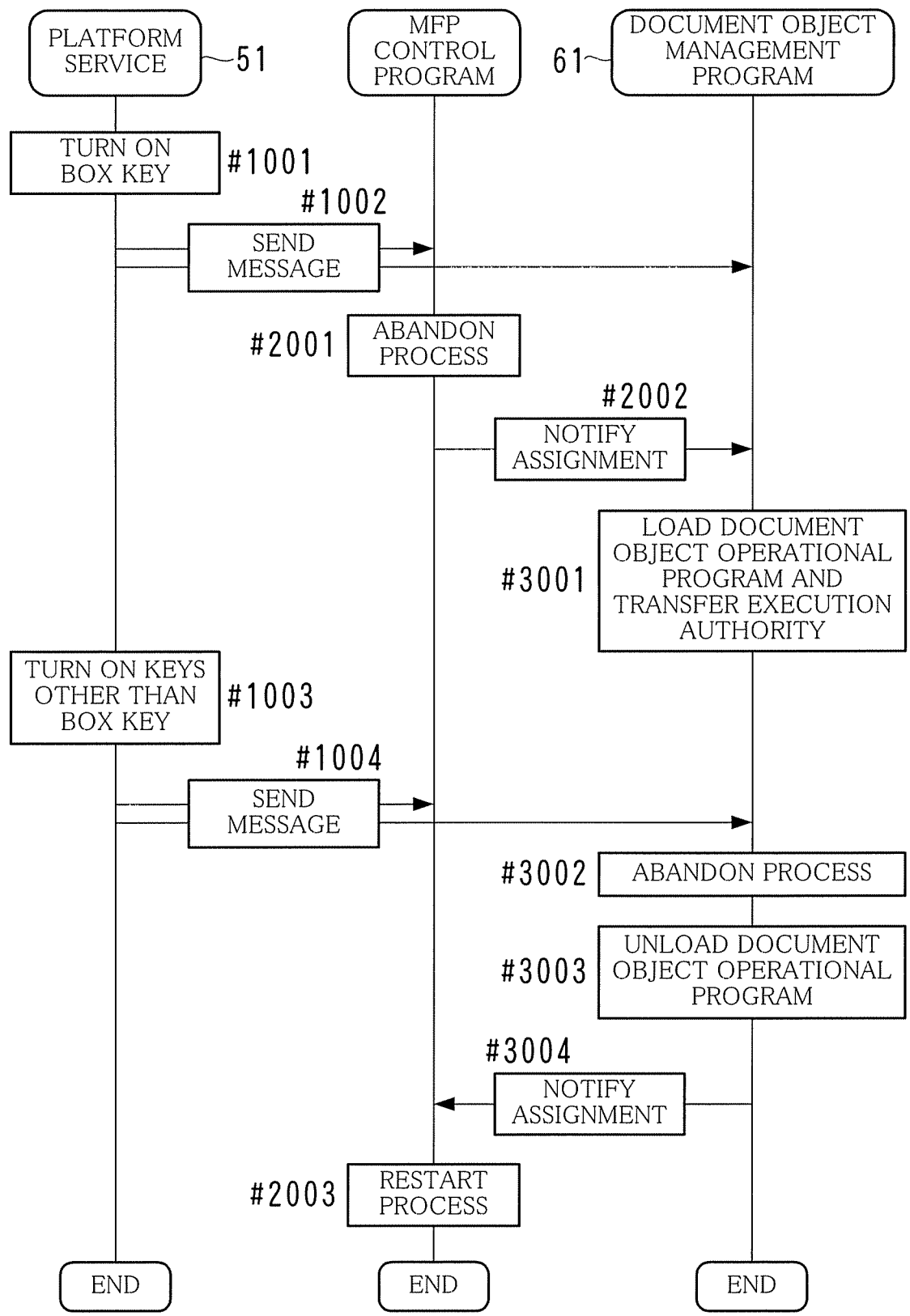
FIG. 12 is a flowchart showing an example of a process with respect to exchange of control of a screen.

Referring to FIG. 12, if a user touches the "BOX" button, then the platform service 51 detects the event (#1001) and a message indicating that the "BOX" button is touched is sent to an MFP control program (a control program of the image forming apparatus 1 at the OS level) and the document object management program 61 (#1002).

In response, a screen control process, which is conventionally performed by the MFP control program, is abandoned from the MFP control program (#2001) and the execution authority of the screen control process is assigned to the document object management program 61 (#2002).

The document object management program 61 loads the document object operational program 8 and the execution authority of the screen control process is transferred to the document object operational program 8 (#3001).

Figure 13:
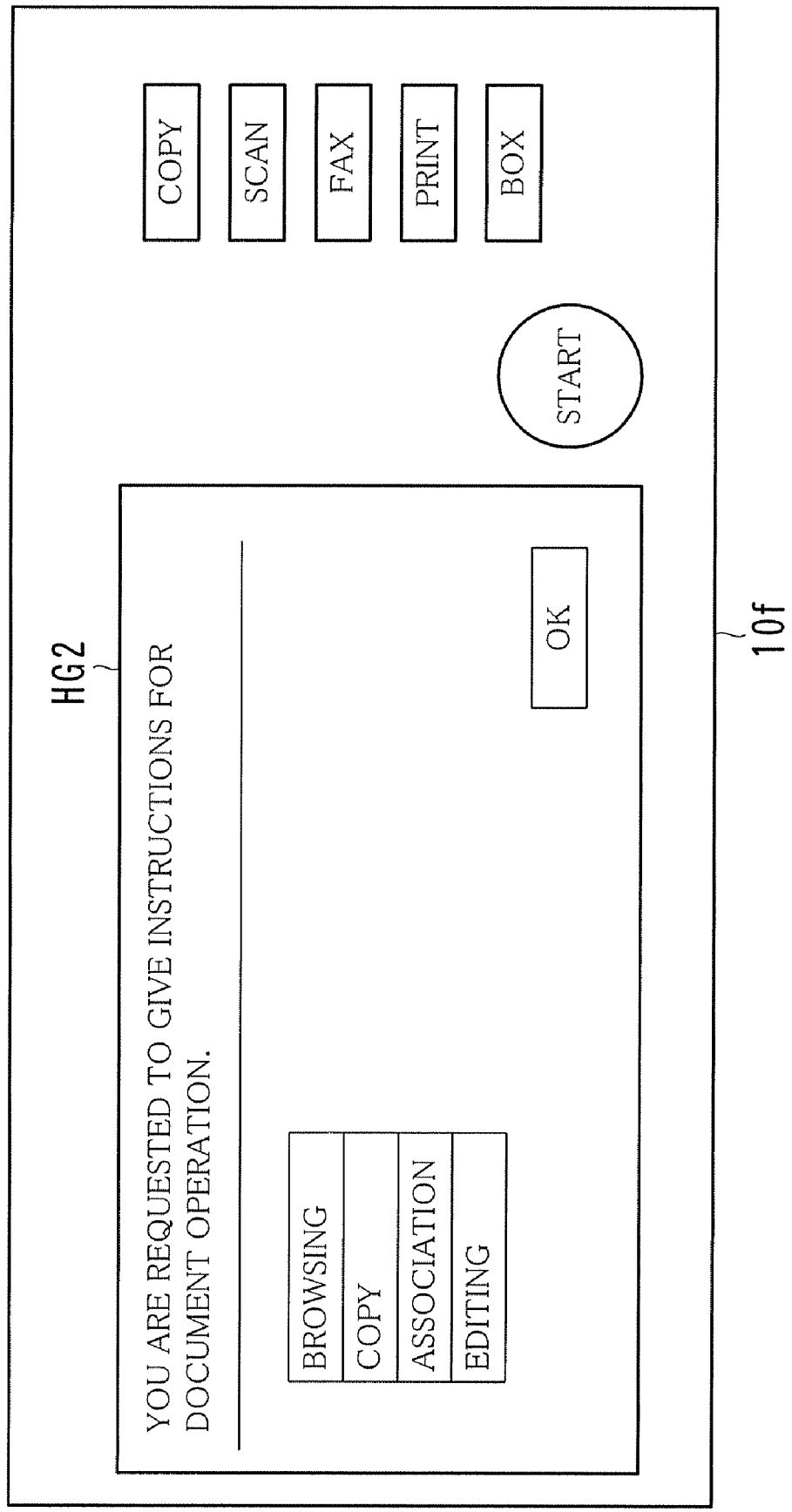
FIG. 13 shows an example of a document object operational screen.

Then, a document object operational screen HG2 as shown in FIG. 13 is displayed on the liquid crystal panel. The process regarding a screen with the document object operational program 8 is implemented by calling the existing Graphical User Interface (GUI) library of the platform service 51.

There are prepared a plurality of screens for operating document objects 7, in addition to the document object operational screen HG2. A user can switch screens appropriately depending on the details of a process that was performed by an image forming apparatus 1 according to user's instructions. The user can designate a document object 7 to be processed in the image forming apparatus 1 and give a process command thereto.

After that, if the platform service 51 detects that a button other than the "BOX" button among the function buttons is touched (#1003), then a message to that effect is notified to the document object management program 61 and the MFP control program (#1004).

In response, the execution authority of the screen control process is waived by the document object management program 61 (#3002) and is assigned to the MFP control program (#3004). At this time, the document object operational program 8 is unloaded from the system RAM 10*b* (#3003).

Then, as usual, a screen control process by the MFP control program is restarted (#2003).

Figure 14:
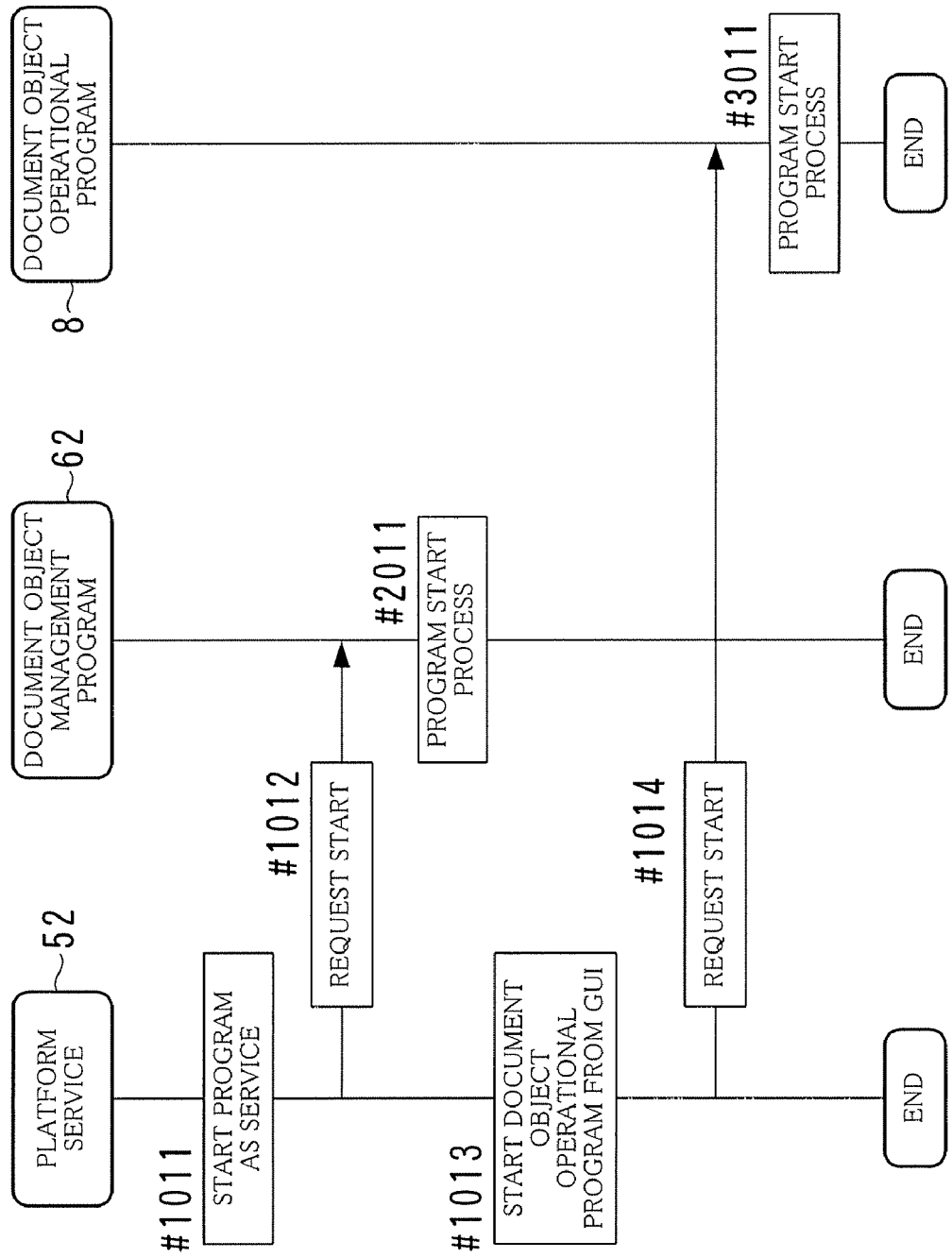
FIG. 14 is a flowchart showing an example of a process when a general-purpose computer is started.

Referring to FIG. 14, when a general-purpose computer 2 is turned ON, the platform service 52 and various system programs are started (#1011). In addition, the platform service 52 calls the document object management program 62 and starts the same (#1012 and #2011). The document object management program 62 is resident in the system RAM 20*b*. That is, the document object management program 62 runs as daemon.

If a user uses a GUI to enter a predetermined command (#1013), then the platform service 52 calls the document object operational program 8 and starts the same (#1014 and #3011).

[Start of Document Object 7]

Figure 15:
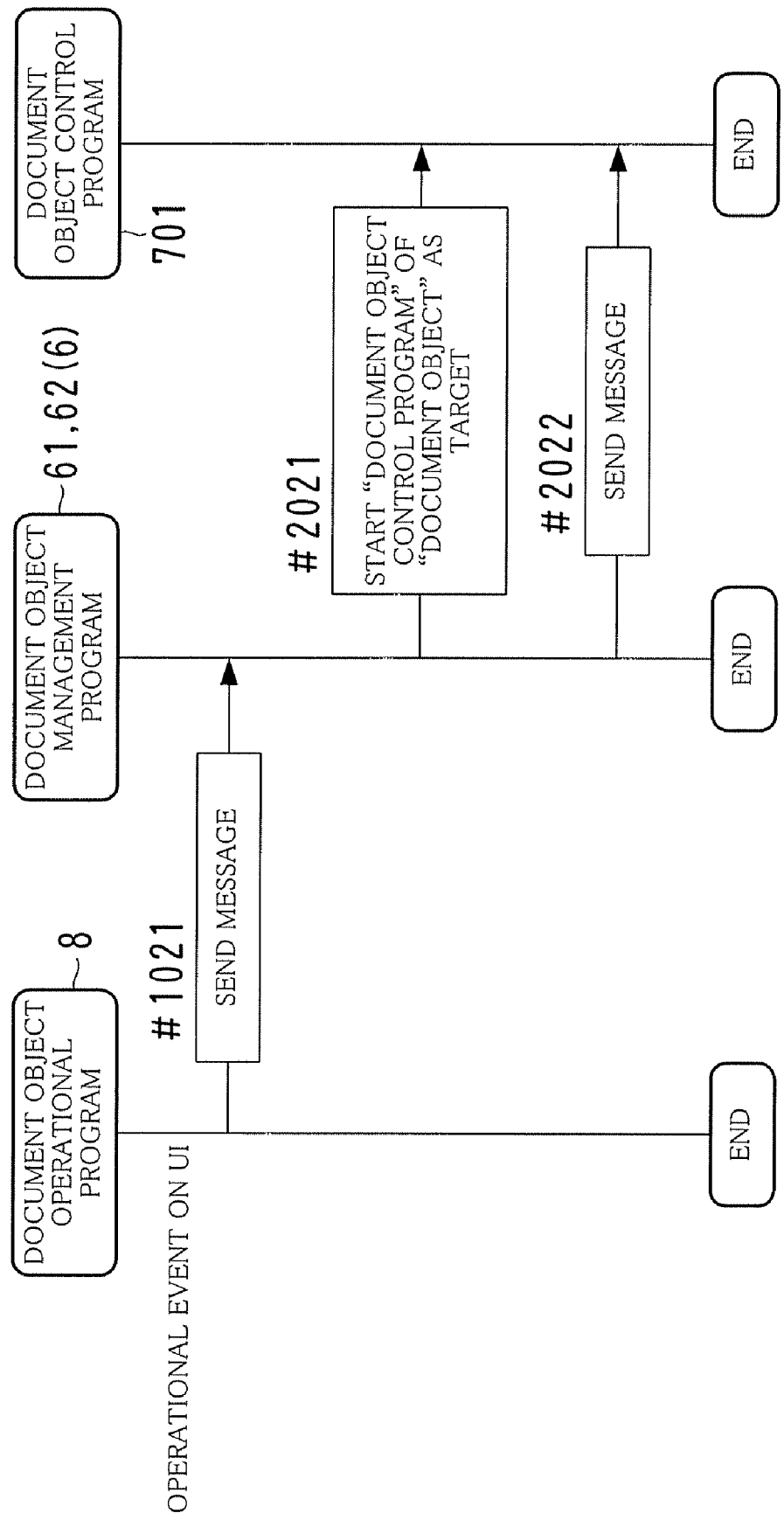
FIG. 15 is a flowchart showing an example of a process when a document object is started.

Referring to FIG. 15, a user designates a document object 7 to be processed and gives a process command to perform a process to the image forming apparatus 1 while he/she sees the document object operational screen HG2 (see FIG. 13) or others. Then, the document object operational program 8 notifies the document object management program 6 of a message indicating the designation and the command details.

The document object management program 6 loads the document object control program 701 of the document object 7 specified in the message into the system RAM 10*b* (#2021) to notify the document object control program 701 of the message via the document object interface 708 (#2022).

Thereby, preparation for operating the document object 7 designated by the user is completed. The procedure for starting the document object 7 is the same between the image forming apparatus 1 and the general-purpose computer 2.

After that, the document object control program 701 starts the document data access portion 702 through the document object interface 708 appropriately.

[New Creation of Document Object 7]

Figure 16:
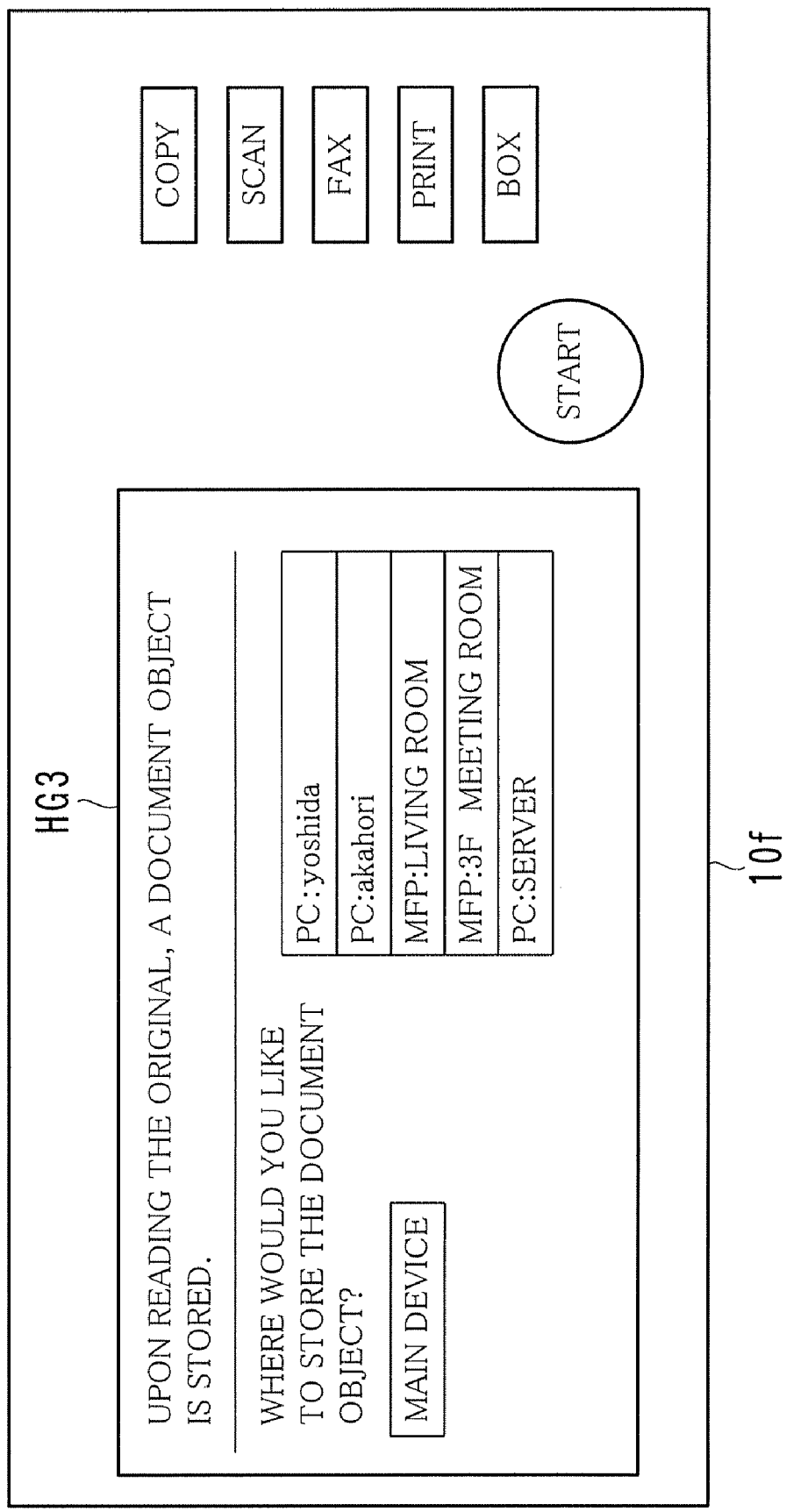
FIG. 16 shows an example of a box operational screen.

In the case where a user intends to generate a new document object 7, he/she performs predetermined operation to display a box operational screen HG3 as shown in FIG. 16 in the liquid crystal panel of the console panel 10*f*. Then, the user places an original on a platen of the image forming apparatus 1, designates a storage location of the document object 7 and touches the "START" button.

Figure 17:
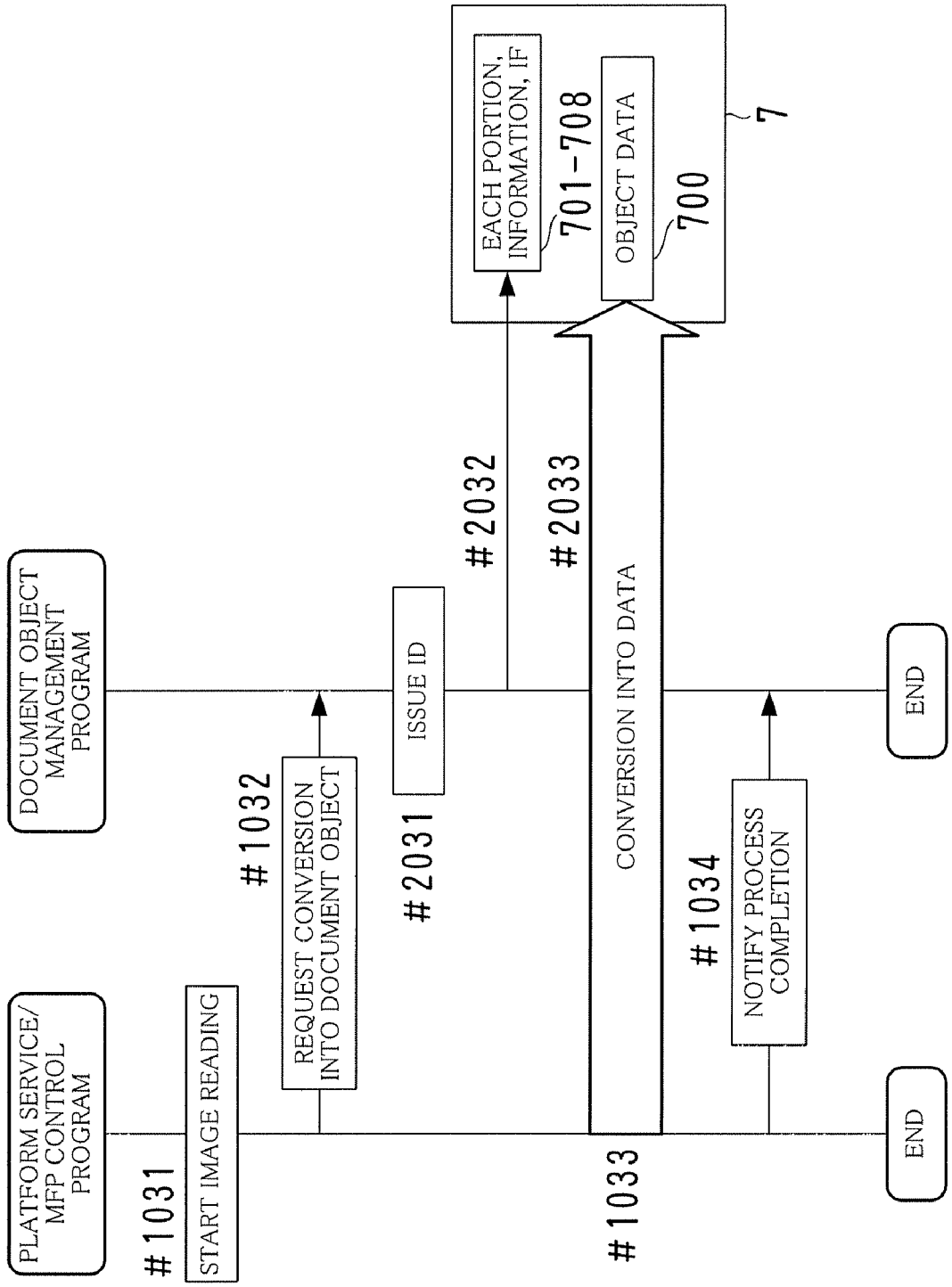
FIG. 17 is a flowchart showing an example of a process of generating a new document object.

Responding to this, in the image forming apparatus 1, a process for generating a document object 7 is performed according to the procedure shown in FIG. 17.

The platform service 5 and the MFP control program control the scanner unit 10*j* so that reading of an original image is started (#1031). In parallel with this or before or after, the platform service 5 and the MFP control program request the document object management program 6 to convert image data of the original into a document object (#1032).

Responding to this, the document object management program 6 issues a unique document object ID for a new document object 7 (#2031) and generates a document object control program 701 through a document object interface 708 by, for example, copying the programs and data that are already prepared (#2032).

Further, the document object management program 6 receives, from the platform service 5 or others, the original image data that is to be converted into electronic data by the scanner unit 10*j* or the like and generates document data 700 (#1033 and #2033). Then, the document ID is combined with the document data 700 through the document object interface 708, so that a document object 7 is generated. The document object 7 thus generated is saved at a location designated by the user.

After finishing reading the original image, a message to that effect is notified to the document object management program 6 by the platform service 5 or others (#1034).

As described earlier with reference to FIG. 6, the document data 700 and the relationship information 704 are divided into a plurality pieces of split data respectively, and are subjected to a scrambling process and saved together with document data 700 and relationship information 704 of other existing document objects 7.

The document object ID is made up of a combination of an ID that is uniquely assigned on platform basis and an ID that is generated uniquely only in the platform. The document object management program 6 keeps a management table in which the issued document object IDs are described. The document object management program 6 issues a document object newly upon request. In the case where a document object 7 is deleted, the document object ID of the document object 7 is deleted from the management table. Thereby, the document object ID is returned.

[Reproduction of Document Object 7 (a Case of Absence of Parent)]

The document object 7 replicates itself and thereby generates a child. The procedure for generating a child is different between a case where the document object 7 itself is the original, i.e., a case where the document object 7 has no parents and a case where the document object 7 has a parent.

Figure 18:
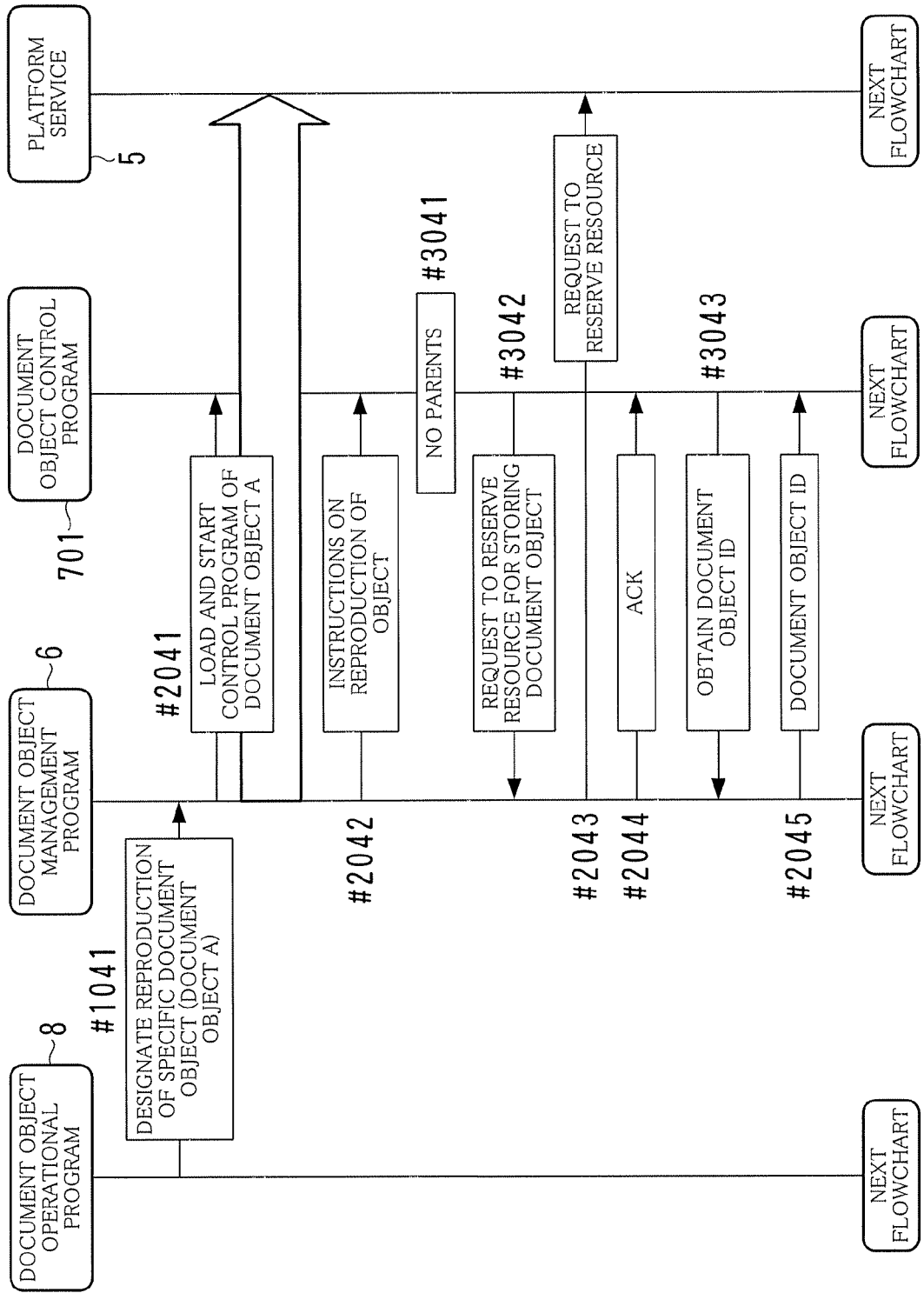
FIG. 18 is a flowchart showing an example of a process of replicating a document object having no parents.
Figure 19:
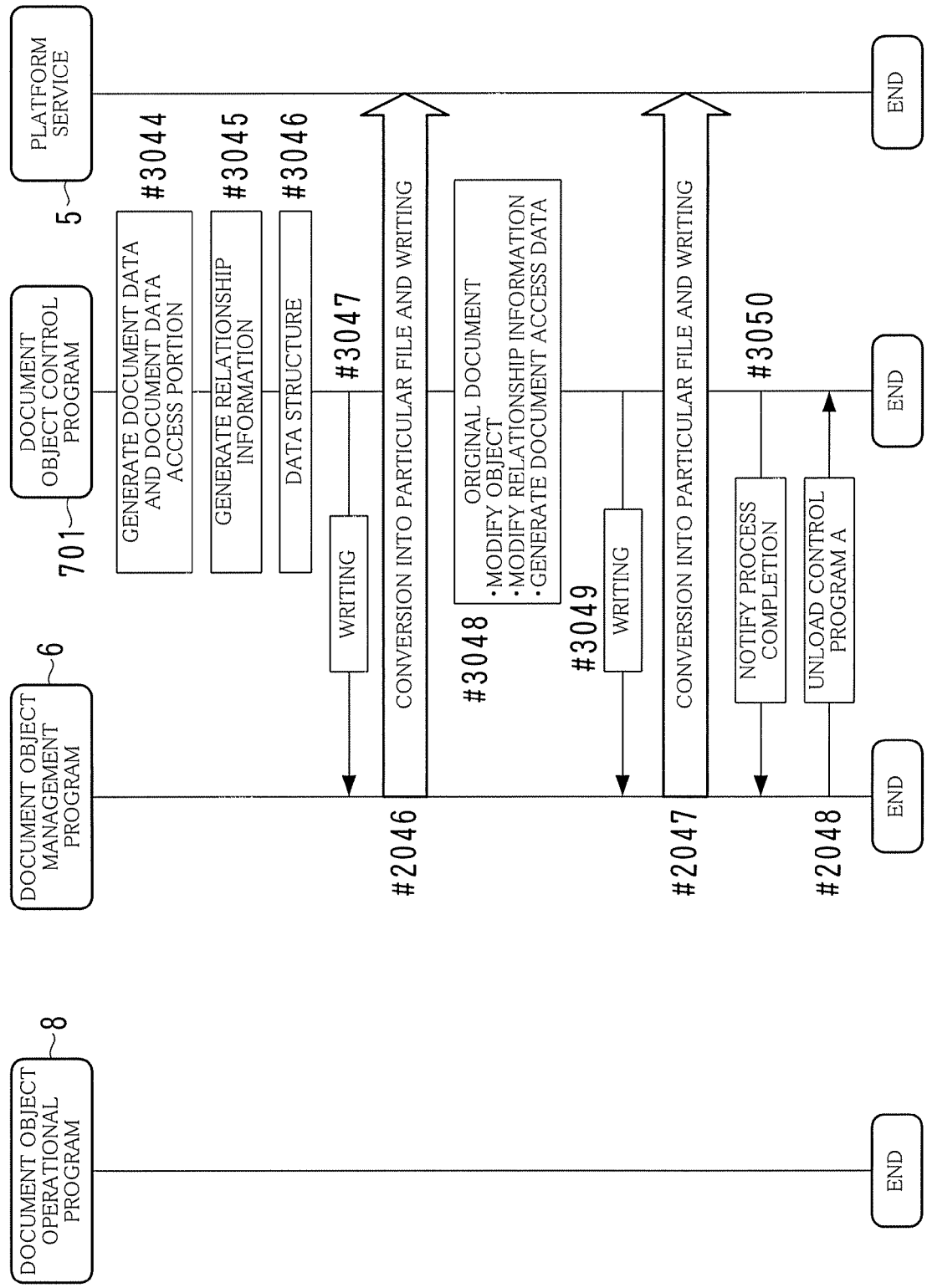
FIG. 19 is a flowchart showing an example of a process of replicating a document object having no parents.

In the case of the absence of a parent, a replication process is performed and a child is generated according to the procedure shown in FIGS. 18 and 19. When a user intends to replicate a document object 7, he/she designates a document object ID of the document object 7, and gives a command to replicate the document object 7 to an image forming apparatus 1 or a general-purpose computer 2 that manages the document object 7.

In response, in the image forming apparatus 1 or the general-purpose computer 2, the document object operational program 8 informs the document object management program 6 of the document object ID and the command (#1041 in FIG. 18).

The document object management program 6 causes the platform service 5 to load a document object control program 701 of a document object 7 (hereinafter referred to as a "document object A") relating to the document object ID (#2041).

After starting the document object control program 701 of the document object A, the document object management program 6 instructs the document object control program 701 to replicate the document object A (#2042).

After that, each portion, data or information under the control of the document object control program 701 is started appropriately. The same applies to processes relating to other object that are sequentially described below with reference to other flowcharts.

The document object control program 701 refers to the relationship information 704 of the document object A, and thereby confirms whether or not the document object A has a parent (#3041).

If it is confirmed that the document object A has no parents, then the document object control program 701 requests the document object management program 6 to reserve a resource (a storage area of the hard disk drive) for storing a replication of the document object A (#3042).

If the document object management program 6 confirms that a resource can be reserved, then it causes the platform service 5 to reserve the resource (#2043), and sends to the document object control program 701 a message indicating that the resource can be reserved and identification information (writing pointer) of the resource (#2044).

Responding to this, the document object control program 701 has the document object management program 6 issue a unique document object ID for a replication (child) of the document object (#3043 and #2045).

When the resource and the document object ID are prepared, the document object control program 701 generates document data and a document data access portion by replicating components of the document object A except the relationship information 704 (#3044 in FIG. 19). Further, the relationship information 704 as shown in FIG. 20A is generated (#3045). The relationship information 704 describes information on a parent of the replication, that is, the document object A and information on a user (owner) who owns the replication.

The document data 700 through the document object interface 708 thus generated are combined in accordance with the format of a document object. Thereby, the replication of the document object A is completely generated (#3046). Then, the replication is saved in the reserved resource via the document object management program 6 (#3047 and #2046).

The document object control program 701 uses its own encryption key AK to encrypt document data 700 of the replication. As described earlier, the document data 700 is subjected to a scrambling process by the platform service 5, i.e., the document data 700 is divided into plural scramble files as described earlier with reference to FIG. 6, and is saved.

In relation to the generation of the replication, the document object control program 701 modifies the document object A itself (#3048). Specifically, as shown in FIG. 20B, the document object control program 701 adds information on the replication (i.e., child) to the relationship information 704 of the document object A itself. If the encryption key AK that is used for encrypting the replication is newly issued this time, the encryption key AK is held.

The document object control program 701 causes the platform service 5 via the document object management program 6 to perform a scrambling process on the document object A thus modified and save the same again (#3049 and #2047).

In this way, a replication process of the document object A is completed. The log of this process details is managed by the history management portion 707.

If the document object control program 701 informs the document object management program 6 of the process completion (#3050), then the document object A is unloaded by the document object management program 6 (#2048).

[Reproduction of Document Object 7 (a Case of Presence of Parent)]

Figure 21:
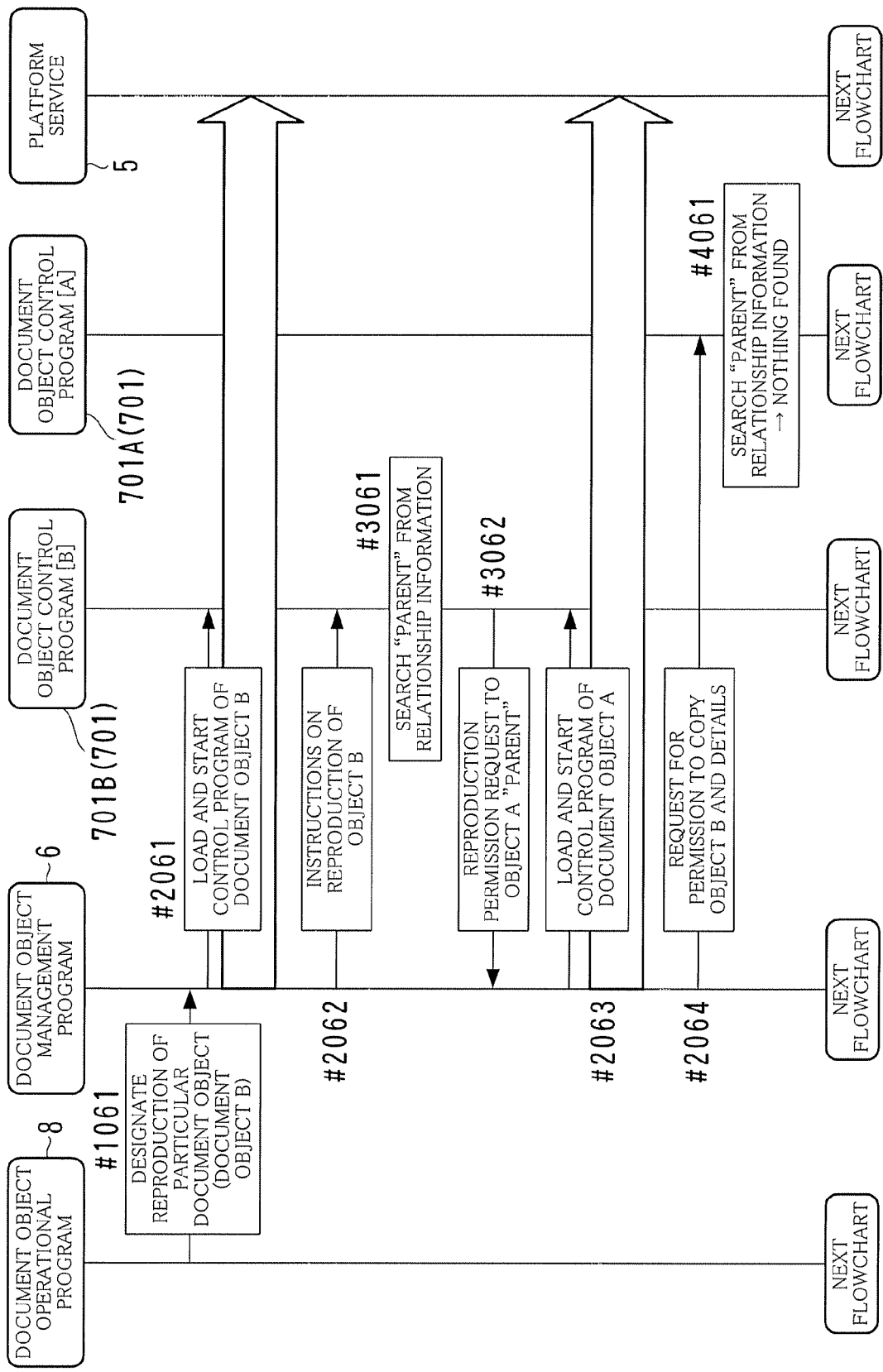
FIG. 21 is a flowchart showing an example of a process of replicating a document object having a parent.
Figure 22:
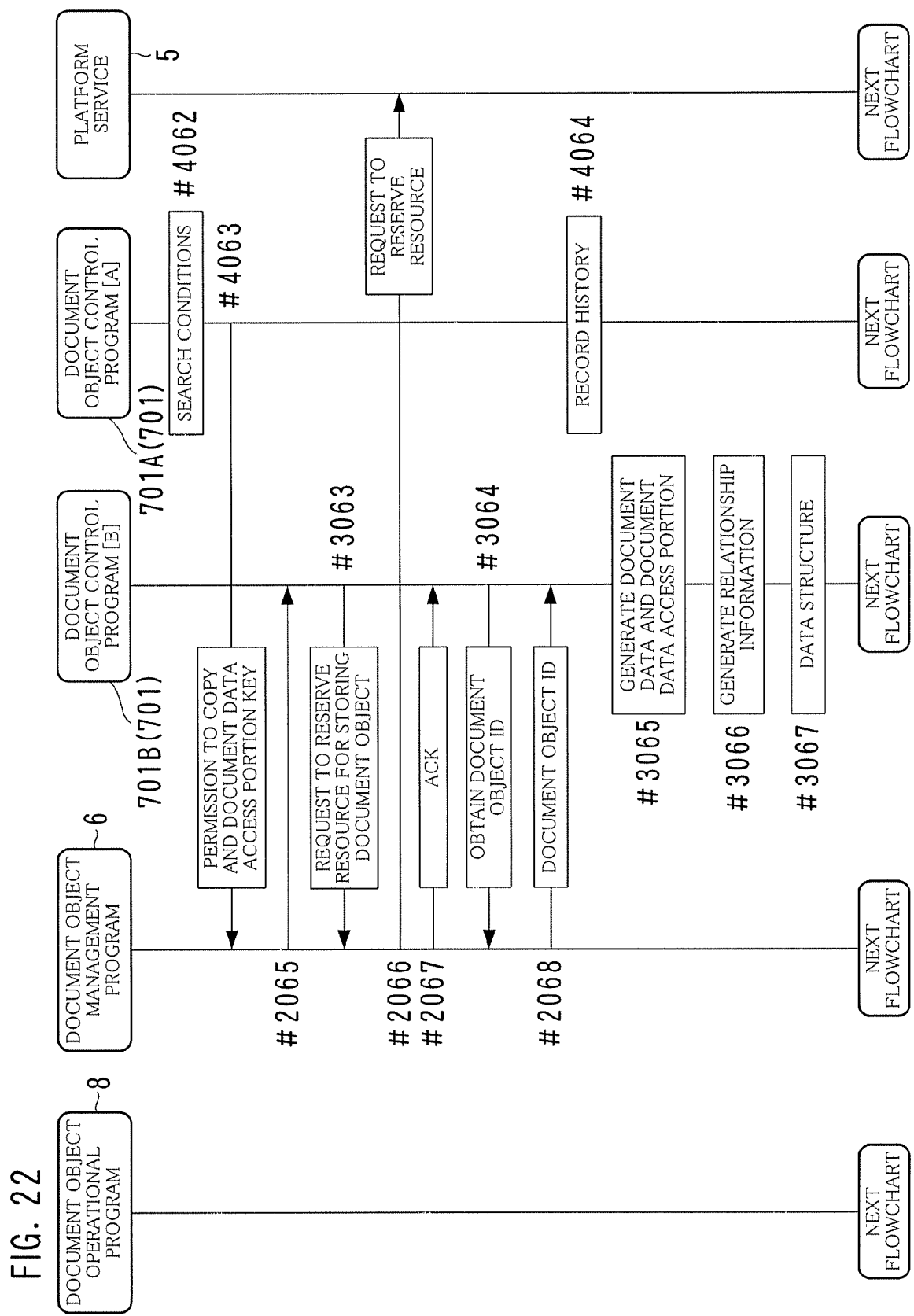
FIG. 22 is a flowchart showing an example of a process of replicating a document object having a parent.
Figure 23:
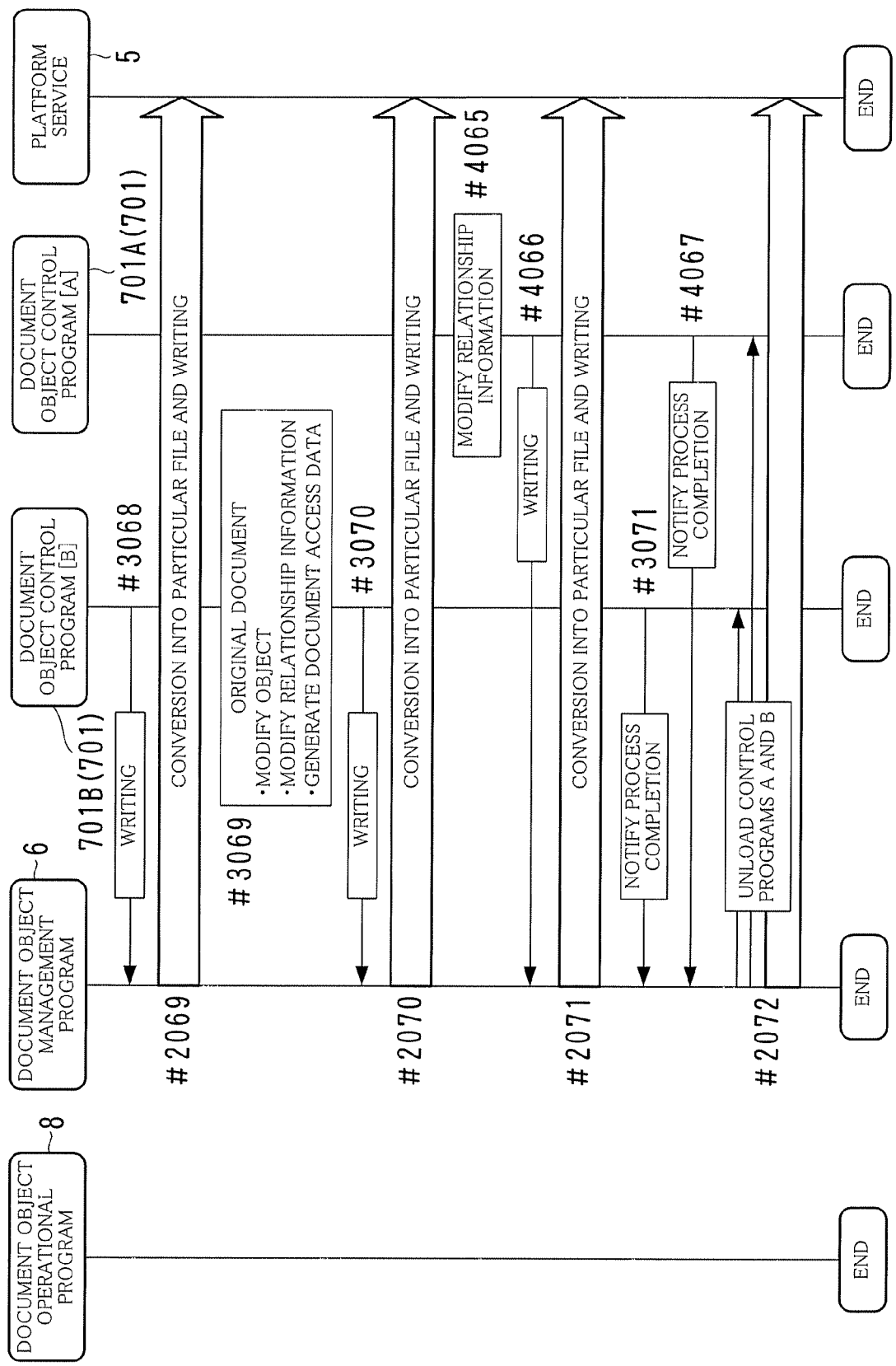
FIG. 23 is a flowchart showing an example of a process of replicating a document object having a parent.
Figure 24:
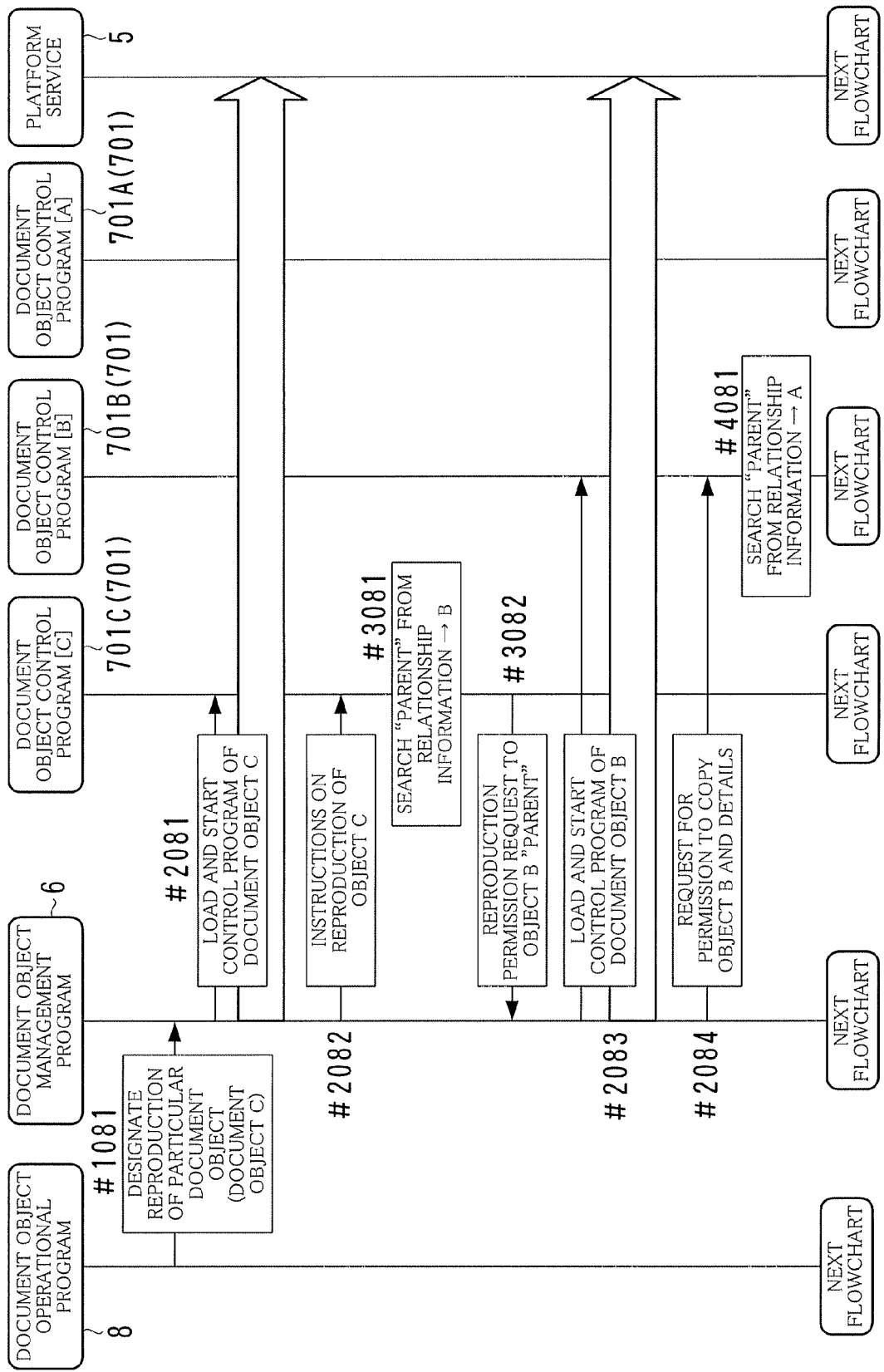
FIG. 24 is a flowchart showing an example of a process of replicating a third generation document object.

In the case where a document object 7 to be replicated has a parent, a replication process is performed according to the procedure shown in FIGS. 21, 22 and 23.

The following is a description of a process procedure when the replication of the document object A that is generated by the replication process described with reference to FIGS. 18 and 19 (hereinafter such a replication is referred to as a "document object B") is replicated. Supposing that both the document objects are present in the same platform.

When a user intends to replicate the document object B, he/she designates a document object ID of the document object B, and gives a command to replicate the document object B to an image forming apparatus 1 or a general-purpose computer 2 that manages the document object B.

In response, in the image forming apparatus 1 or the general-purpose computer 2, the document object operational program 8 informs the document object management program 6 of the document object ID and the command (#1061 in FIG. 21).

The document object management program 6 causes the platform service 5 to load a document object control program 701 of a document object 7 relating to the document object ID, i.e., of the document object B (#2061). Hereinafter, such a document object control program 701 is referred to as a "document object control program 701B".

After starting the document object control program 701B, the document object management program 6 instructs the document object control program 701B to replicate the document object B (#2062).

The document object control program 701B refers to the relationship information 704 of the document object B itself, and thereby confirms whether or not the document object B has a parent (#3061). Note that the process flow so far is the same as that of the case of the absence of a parent.

If it is confirmed that the document object B has a parent, then the document object control program 701B requests the parent, that is, the document object A via the document object management program 6 to permit a replication process (#3062).

Responding to this, the document object management program 6 causes the platform service 5 to load the document object control program 701 (hereinafter referred to as a "document object control program 701A") of the document object A.

The document object management program 6 requests the document object A to permit a replication process of the document object B (#2064).

In response, the document object control program 701A refers to the relationship information 704 of the document object A, and thereby confirms whether or not the document object A itself has a parent (#4061).

If it is confirmed that the document object A has no parents, the document object control program 701A causes the object authentication management portion 705 of the document object A to determine whether or not such a replication process should be permitted (#4062 in FIG. 22).

At this time, the object authentication management portion 705 determines whether or not to permit the replication process by, for example, searching whether the request source has conditions indicated in the rule regarding authentication.

If it is determined that the replication process is permitted, then the document object control program 701A gives the document object B, via the document object management program 6, a reply message indicating that the replication process is permitted and the encryption key AK that is used for encrypting the document data 700 of the document object B, i.e., a portion for accessing the document data 700 (#4063 and #2065).

In response, the document object control program 701B causes the document object management program 6 to perform a process for reserving a resource for storing a replication of the document object B and a process for issuing a document object ID, as with the case of the absence of a parent (#3063-#3067 and #2066-#2068). Then, the document object ID is used to generate a replication of the document object B. The document data 700 of the document object B can be decoded by the encryption key AK sent from the document object A.

However, as with the case of the absence of a parent, the replication source and the replication differ from each other in the contents of the relationship information 704 and the encryption key AK of the document access portion 702.

The document object control program 701A causes the history management portion 707 to record information indicating that a younger generation, i.e., the document object B in this example is replicated (#4064).

Referring to FIG. 23, as with the case of the absence of a parent, the document object control program 701B causes the reserved resource via the document object management program 6 to save the replication of the document object B (#3068 and #2069). The document data 700 is encrypted by the encryption key AK owned by the document object B, is subjected to a scrambling process together with document data 700 of other document object 7, and is saved.

Further, as with the case of the absence of a parent, in relation to the generation of the replication, the document object control program 701B modifies the relationship information 704 or the like of the document object B itself (#3069). Then, the document object control program 701B causes the platform service 5, via the document object management program 6, to perform a scrambling process on the document object B after the modification and save the same again (#3070 and #2070).

In relation to the generation of the replication of a child, the document object control program 701A also modifies the relationship information 704 or the like of the document object A itself (#4065). Then, the document object control program 701A causes the platform service 5, via the document object management program 6, to perform a scrambling process on the document object A thus modified and save the same again (#4066 and #2071).

If the document object control programs 701A and 701B inform the document object management program 6 of the process completion (#4067 and #3071), then the document object management program 6 unloads the document objects A and B (#2072).

In the case where a document object 7 to be replicated has a parent and the parent has a parent, a replication process is performed according to the procedure shown in FIGS. 24, 25, 26 and 27.

The following is a description of a process procedure when the replication of the document object B that is generated by the replication process described with reference to FIGS. 21, 22 and 23 (hereinafter the replication is referred to as a "document object C") is replicated. Supposing that the document objects A, B and C are present in the same platform.

When a user intends to replicate the document object C, he/she designates a document object ID of the document object C and gives a command to replicate the document object C to an image forming apparatus 1 or a general-purpose computer 2 that manages the document object C.

In response, in the image forming apparatus 1 or the general-purpose computer 2, the document object operational program 8 informs the document object management program 6 of the document object ID and the command (#1081).

As with Steps #2061-#2064, #3061-#3062 and #4061, a document object control program 701 of the document object C (hereinafter referred to as a "document object control program 701C") is started, a parent of the document object C, that is, the document object B is searched, the document object B is started and a parent of the document object B is searched (#2081-#2084, #3081-#3082 and #4081). Unlike the case shown in FIG. 21, however, as a result of the search, the document object A is found in Step #4081.

Figure 25:
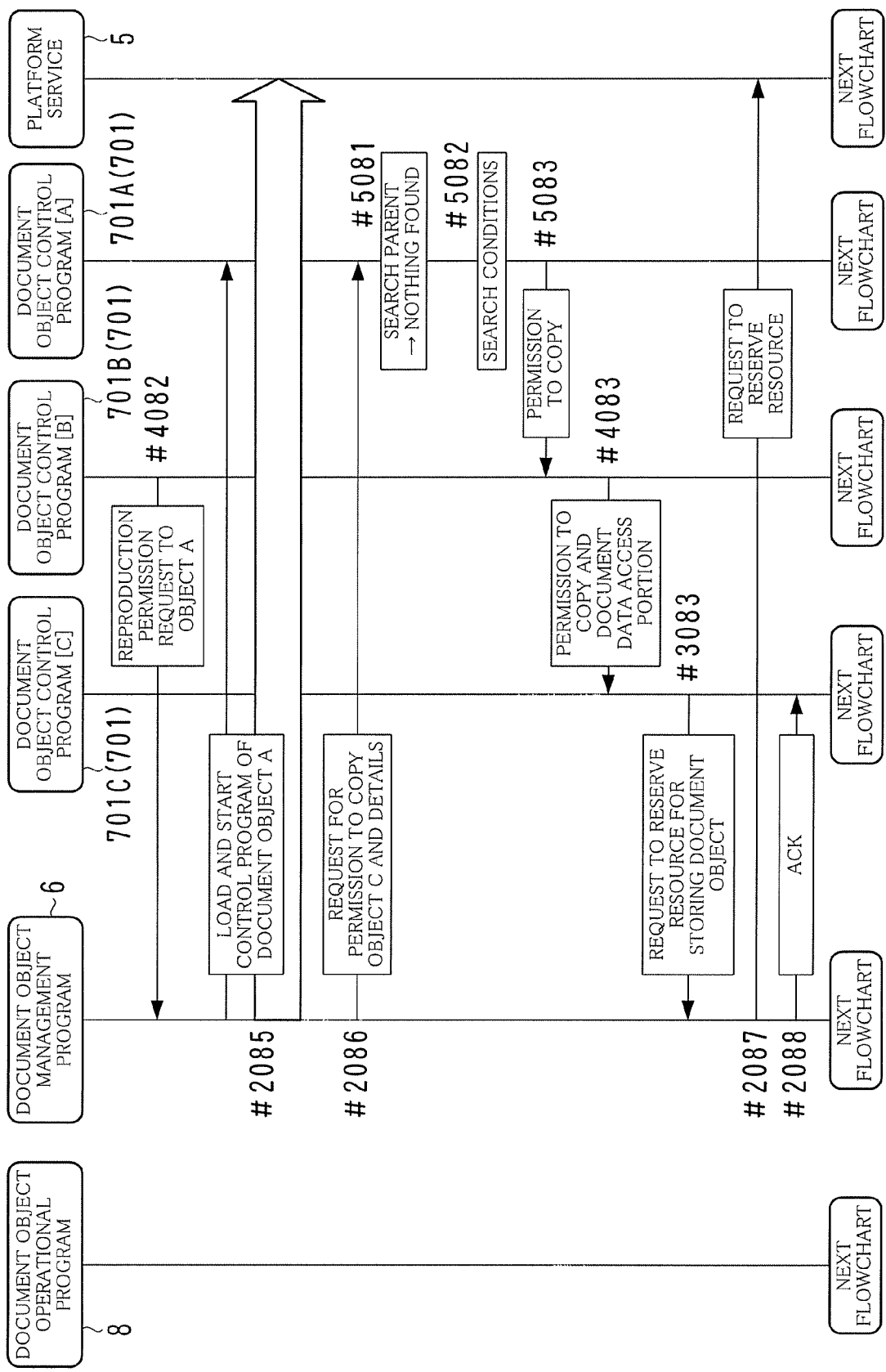
FIG. 25 is a flowchart showing an example of a process of replicating a third generation document object.

The document object control program 701B requests a parent of the document object B, i.e., the document object A via the document object management program 6 to permit the replication process of the document object C (#4082 in FIG. 25).

Responding to this, the document object management program 6 starts the document object control program 701 of the document object A, i.e., the document object control program 701A (#2085).

The document object management program 6 requests the document object A to permit the replication process of the document object C (#2086).

The document object control program 701A refers to the relationship information 704 of the document object A itself, and thereby confirms whether or not the document object A has a parent (#5081).

If it is confirmed that the document object A has no parents, then the document object control program 701A causes the object authentication management portion 705 of the document object A to determine whether or not the replication process should be permitted (#5082).

If it is determined that the replication process is permitted, then the document object control program 701A gives the document object B a reply message indicating that the replication process is permitted (#5083).

In response, the document object B that is a parent of the replication target gives the document object C a reply message indicating that the replication process is permitted and the encryption key AK that is used for encrypting the document data 700 of the document object C, that is, a portion for accessing the document data 700 (#4083).

Each of the processes shown in Steps #5083 and #4083 is performed via the document object management program 6.

Figure 26:
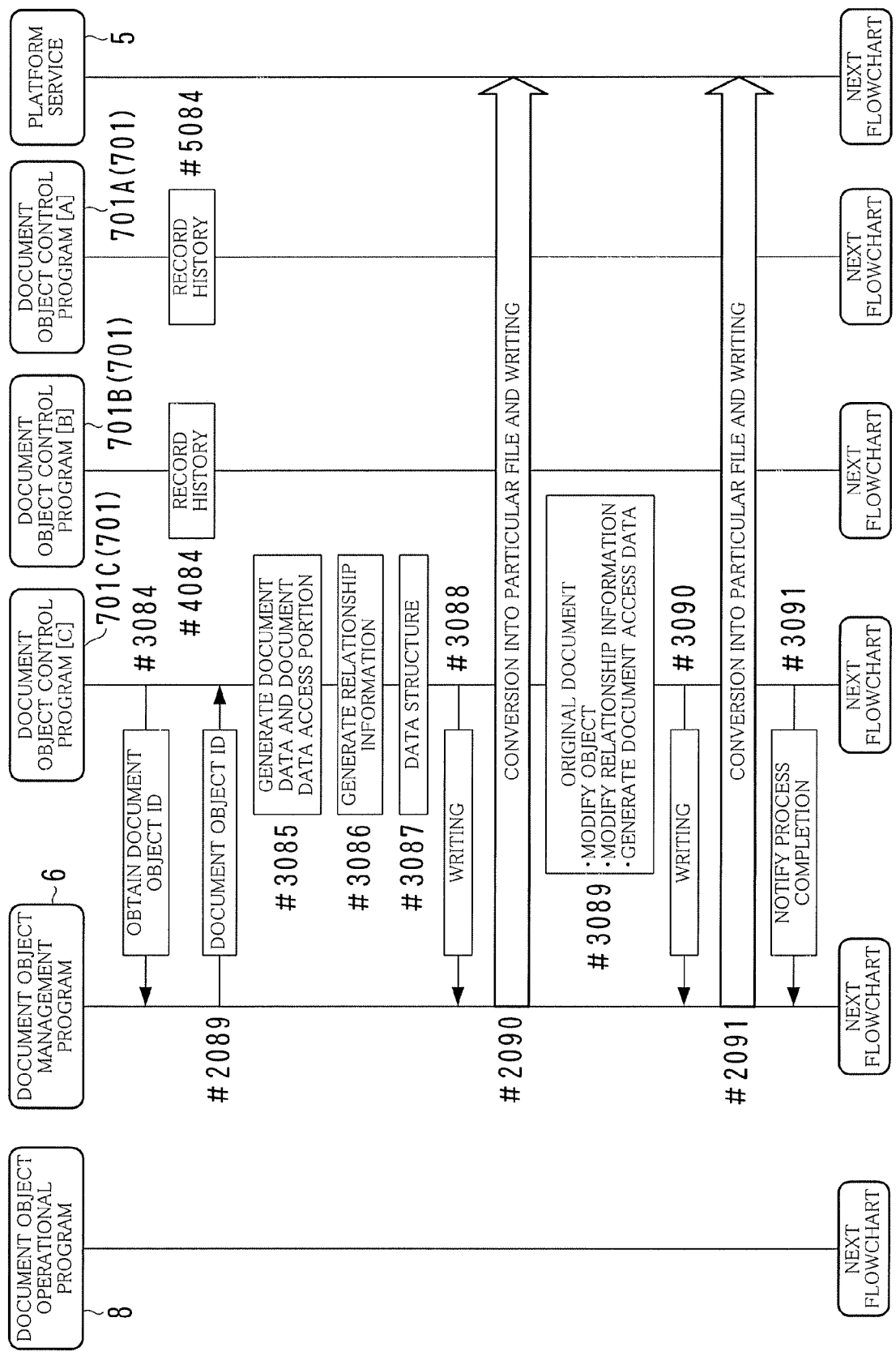
FIG. 26 is a flowchart showing an example of a process of replicating a third generation document object.

As described earlier with reference to FIGS. 18 and 22, the document object C causes the document object management program 6 to perform a process for reserving a resource for storing a replication of the document object C and a process for issuing a document object ID (#3083, #3084 in FIG. 26 and #2087-#2089). Then, the document object ID is used to generate a replication of the document object C (#3085-#3087). The document data 700 of the document object C can be decoded by the encryption key AK sent from the document object B.

The document object control programs 701A and 701B cause the respective history management portions 707 of the document objects A and B to record information indicating that a younger generation, i.e., the document object C in this example is replicated (#5084 and #4084).

As described earlier with reference to FIGS. 19, 22 and 23, the document object control program 701C causes the reserved resource via the document object management program 6 to save the replication of the document object C (#3088 and #2090). The document data 700 is encrypted by the encryption key that the document object C owns, is subjected to a scrambling process together with document data 700 of other document object 7, and is saved.

Further, as described earlier with reference to FIGS. 19, 22 and 23, in relation to the generation of the replication, the document object control program 701C modifies the relationship information 704 or the like of the document object C itself (#3089). Then, the document object control program 701C causes the platform service 5, via the document object management program 6, to perform a scrambling process on the modified document object C and save the same again (#3090 and #2091).

Figure 27:
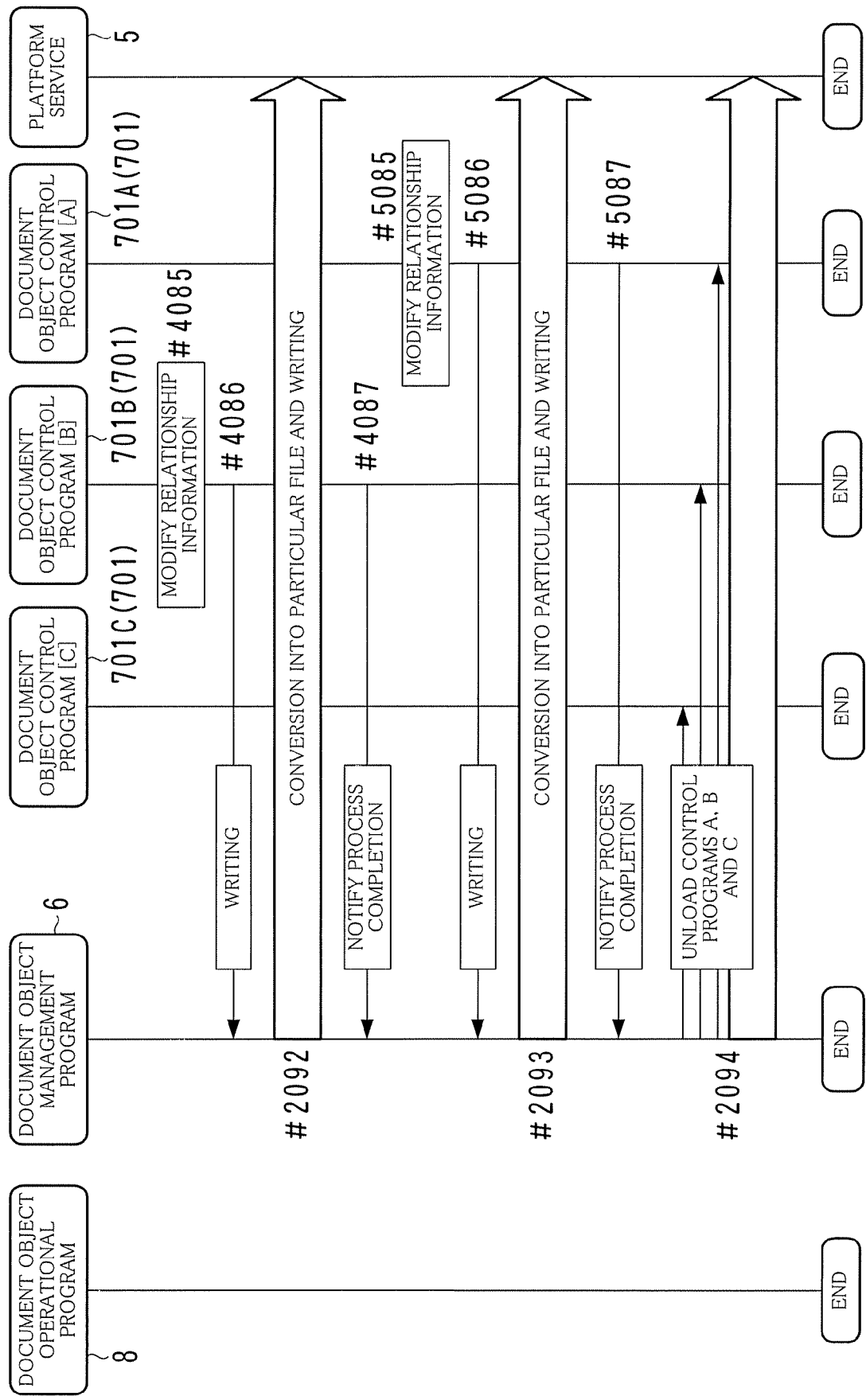
FIG. 27 is a flowchart showing an example of a process of replicating a third generation document object.

In relation to the generation of the replications of the respective younger-generation document objects, the document object control programs 701A and 701B cause the platform service 5 via the document object management program 6 to perform a process of modifying, for example, the respective relationship information 704 of the document objects A and B themselves, and of saving the modified document objects A and B again (#5085, #5086, #2093, #4085, #4086 and #2092 in FIG. 27).

The document object control programs 701A, 701B and 701C inform the document object management program 6 of the process completion (#5087, #4087, and #3091 in FIG. 25), the document objects A, B and C are unloaded by the document object management program 6 (#2094).

Thus, in the case of replicating an n-th generation document object 7, a first generation document object is required to give a permission to replicate the n-th generation document object 7 by relaying such a request through (n−1)th generation document object, (n−2)th generation document object, and the like.

[Browsing of Document Object 7]

A user can browse a document by printing, on paper, a document reproduced based on document data 700 included in a document object 7 or by displaying the same on the liquid crystal panel. Alternatively, the user can transfer the document data 700 to a personal computer and browse a document in the personal computer. At this time, it is necessary that an authentication process is performed by an object authentication management portion 705 of the oldest generation document object. This respect is the same as the case of the replication process described earlier.

Figure 28:
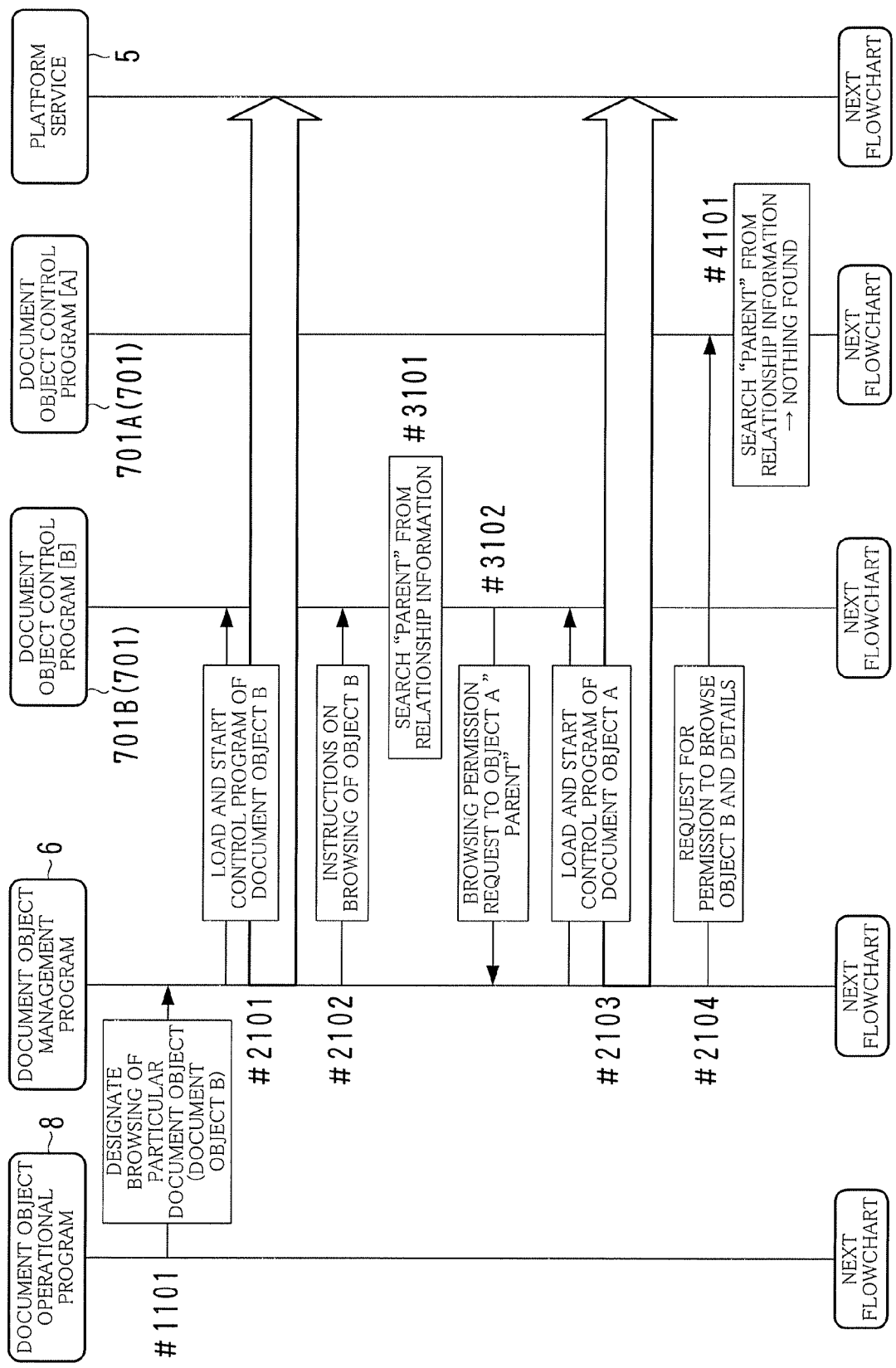
FIG. 28 is a flowchart showing an example of a process of browsing a document object.
Figure 29:
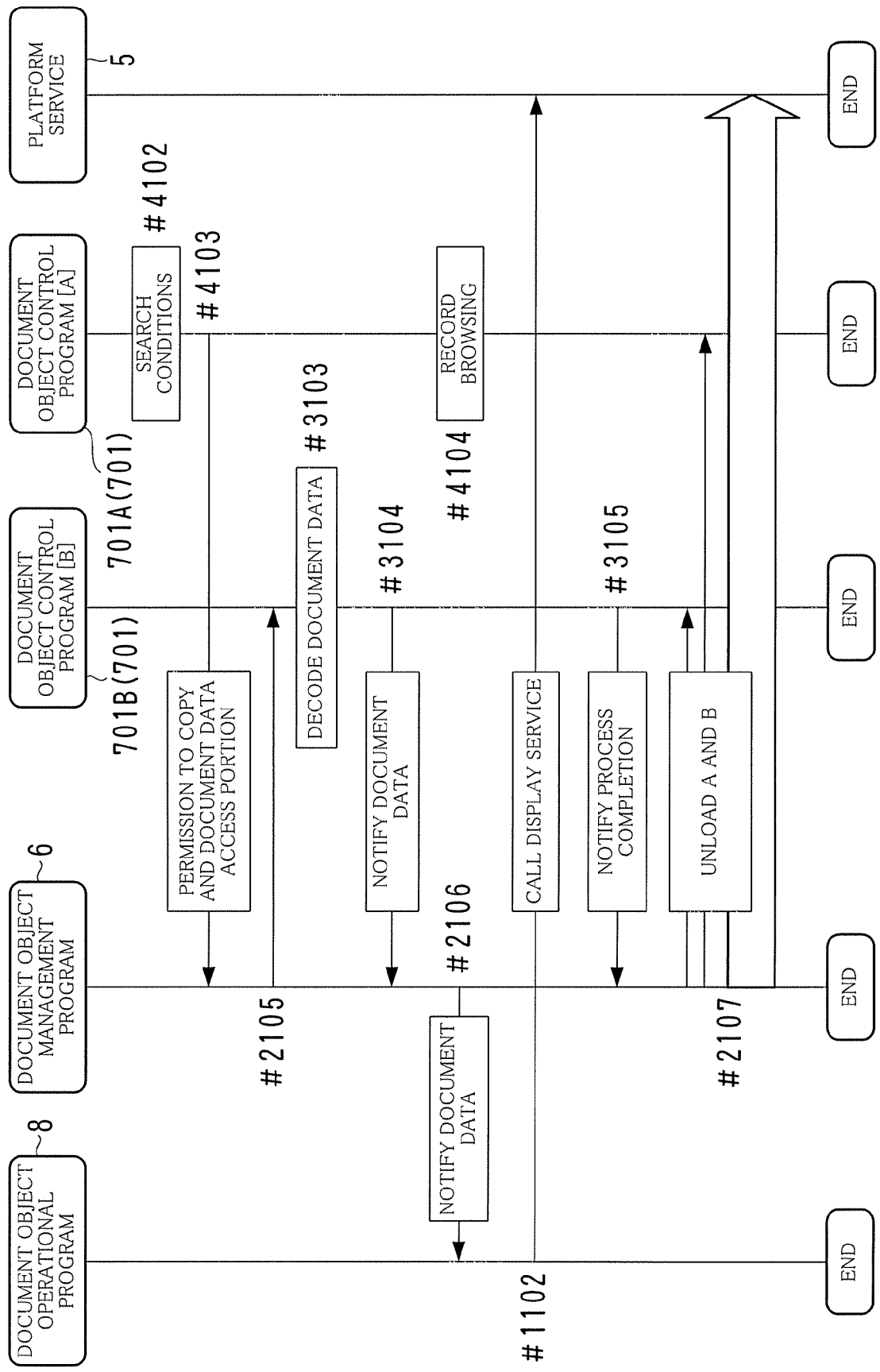
FIG. 29 is a flowchart showing an example of a process of browsing a document object.

The following is a description, with reference to FIGS. 28 and 29, of a process procedure in the case of browsing a document of the document object B that is a replication of the document object A generated by the replication process described earlier with reference to FIGS. 18 and 19. Supposing that both the document objects are present in the same platform.

When a user intends to browse an object relating to the document object B, he/she designates a document object ID of the document object B, and gives a command to browse the object relating to the document object B to an image forming apparatus 1 or a general-purpose computer 2 that manages the document object B.

In response, in the image forming apparatus 1 or the general-purpose computer 2, the document object operational program 8 informs the document object management program 6 of the document object ID and the command (#1101 in FIG. 28).

The document object management program 6 causes the platform service 5 to load the document object control program 701 of the document object 7 relating to the document object ID, i.e., the document object control program 701B (#2101).

After starting the document object control program 701B, the document object management program 6 instructs the document object control program 701B to perform a process for browsing the document of the document object B (#2102).

The document object control program 701B refers to the relationship information 704 of the document object B itself, and thereby confirms whether or not the document object B has a parent (#3101).

If it is confirmed that the document object B has a parent, then the document object control program 701B requests the parent, that is, the document object A via the document object management program 6 to permit to browse the document (#3102).

Responding to this, the document object management program 6 causes the platform service 5 to load the document object control program 701 of the document object A, i.e., the document object control program 701A (#2103).

The document object management program 6 requests the document object A to permit to browse the document of the document object B (#2104).

In response, the document object control program 701A refers to the relationship information 704 of the document object A, and thereby confirms whether or not the document object A itself has a parent (#4101).

If it is confirmed that the document object A has no parents, then the document object control program 701A causes the object authentication management portion 705 of the document object A to determine whether or not browsing the document should be permitted (#4102 in FIG. 29).

If it is determined that browsing the document is permitted, then the document object control program 701A gives the document object B, via the document object management program 6, a reply message indicating that browsing the document is permitted and the encryption key AK that is used for encrypting the document data 700 of the document object B, i.e., a portion for accessing the document data 700 (#4103 and #2105).

The document object control program 701B uses the encryption key AK sent from the document object A to decode the document data 700 of the document object B (#3103), and gives the document object operational program 8 the document data 700 via the document object management program 6 (#3104 and #2106).

The document object operational program 8 uses the document data 700 to perform an output process for browsing (#1102). For example, when the output process for browsing is performed in the form of display on the liquid crystal panel, a display service is called on the platform service 5. Then, the platform service 5 reproduces a document image based on the document data 700 and displays the same on the liquid crystal panel.

The document object control program 701A causes the history management portion 707 to record information indicating that a younger generation, i.e., the document object B in this example is browsed (#4104).

After that, the document object control program 701B gives a notice of the process completion to the document object management program 6 (#3105). Then, the document objects A and B are unloaded by the document object management program 6 (#2107).

Thus, in the case where authentication is obtained from the object authentication management portion 705 of the oldest generation document object, a process for browsing is performed. The same applies also to the case where the document object 7 relating to browsing has no parents, or the case where the document object 7 relating to browsing has two generations older or more parents.

Specifically, in the former case, the object authentication management portion 705 of that document object 7 itself performs an authentication process. In the latter case, a request is relayed to one older generation document object, two older generation document object, . . . and eventually to the first generation document object in this order, and the object authentication management portion 705 of the first generation document object performs an authentication process.

[Association of Two Document Objects]

Figure 30:
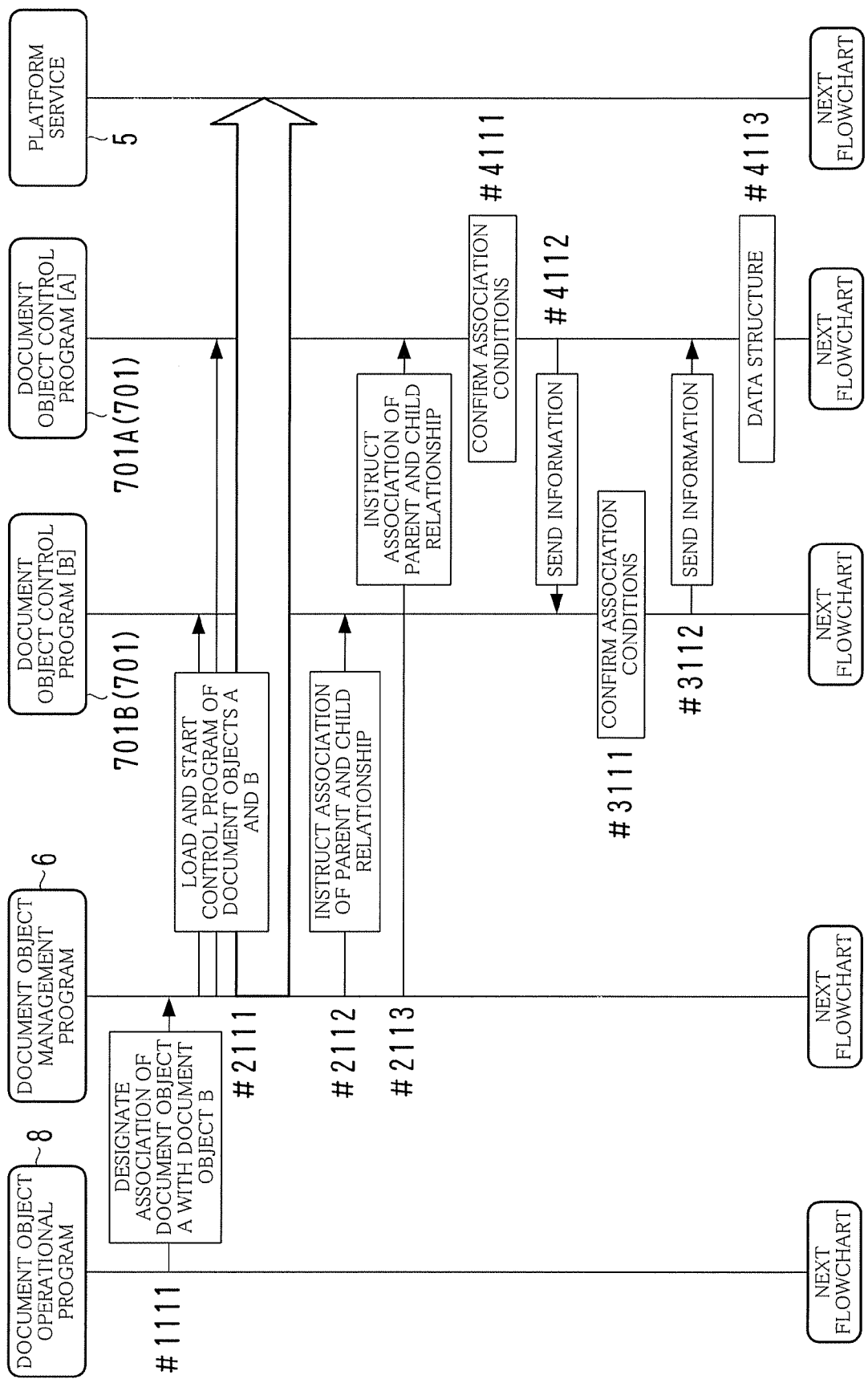
FIG. 30 is a flowchart showing an example of a process of associating two document objects.
Figure 31:
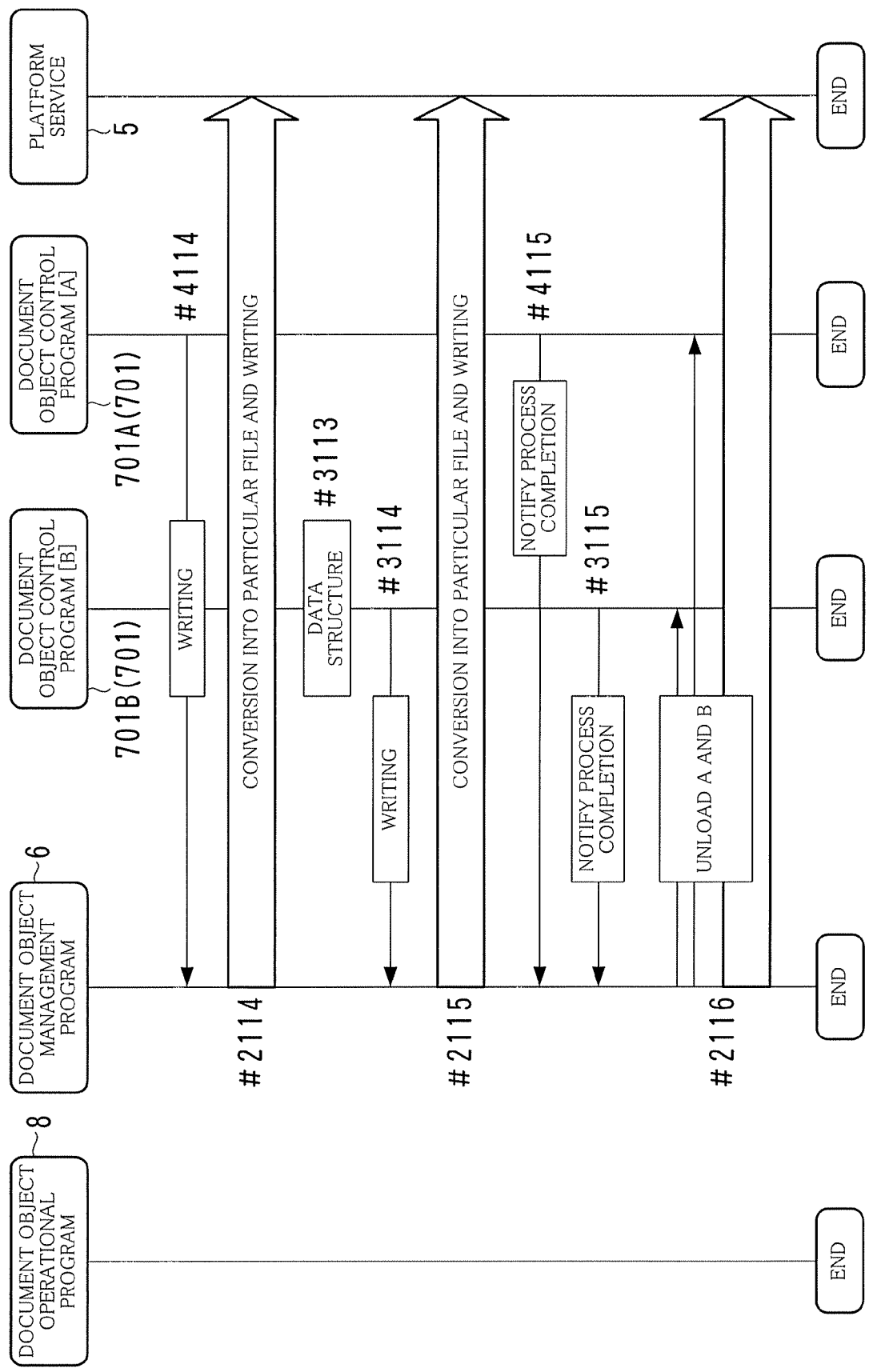
FIG. 31 is a flowchart showing an example of a process of associating two document objects.

A user can determine a parent-child relationship of two document objects 7 including document data 700 having the same contents. The following is a description, with reference to FIGS. 30 and 31, of a process flow in the case of determining a parent-child relationship of the document objects A and B that include the document data 700 having the same contents and are saved in the same platform.

The user designates the document object B as a child of the document object A for the platform where the document objects A and B are saved and gives a command to associate the document object A with the document object B to the platform.

In response, in the platform, the document object operational program 8 informs the document object management program 6 of the designation and the command (#1111 in FIG. 28).

The document object management program 6 causes the platform service 5 to load the document object control programs 701 (701A, 701B) of the respective document objects A and B (#2111).

The document object management program 6 instructs the document object control program 701B to designate the document object A as a parent of the document object B (#2112), and instructs the document object program 701A to designate the document object B as a child of the document object A (#2113).

The document object control programs 701A and 701B confirm the current association conditions thereof respectively and exchange information indicating the contents or the like with each other (#4111, #4112, #3111 and #3112).

The document object control program 701A updates the relationship information 704 of the document object A itself in a manner to indicate that the document object B is a child of the document object A itself (#4113). The relationship information 704 after the update is subjected to a scrambling process and saved (#4114 and #2114 in FIG. 31).

Likewise, the document object control program 701B updates the relationship information 704 of the document object B itself in a manner to indicate that the document object A is a parent of the document object B itself (#3113). The relationship information 704 after the update is subjected to a scrambling process and saved (#3114 and #2115).

In this way, the association of the document objects A and B with each other is finished. Then, the document object control programs 701A and 701B inform the document object management program 6 to that effect (#4115 and #3115).

The document objects A and B are unloaded by the document object management program 6 (#2116).

[Editing of Document Data]

A user performs the same operation as before and thereby can modify an image reproduced by document data 700 and perform a trimming or noise reduction process on the image. The document data 700 is edited (updated) accordingly. Further, history information managed by the history management portion 707 of a document object that is the oldest document object with respect to the document object 7 relating to the document object 700 is updated.

Figure 32:
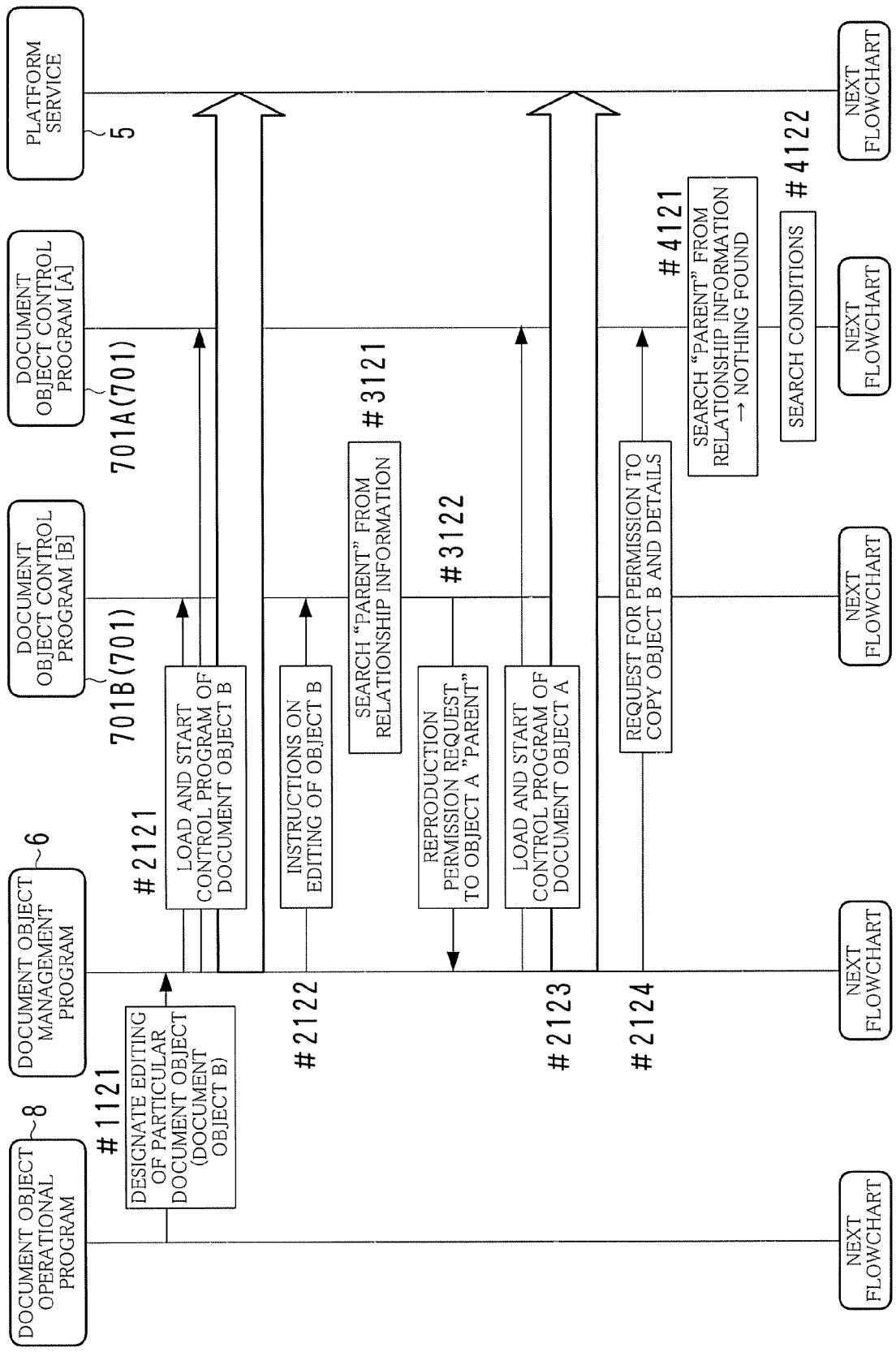
FIG. 32 is a flowchart showing an example of a process of editing document data.
Figure 33:
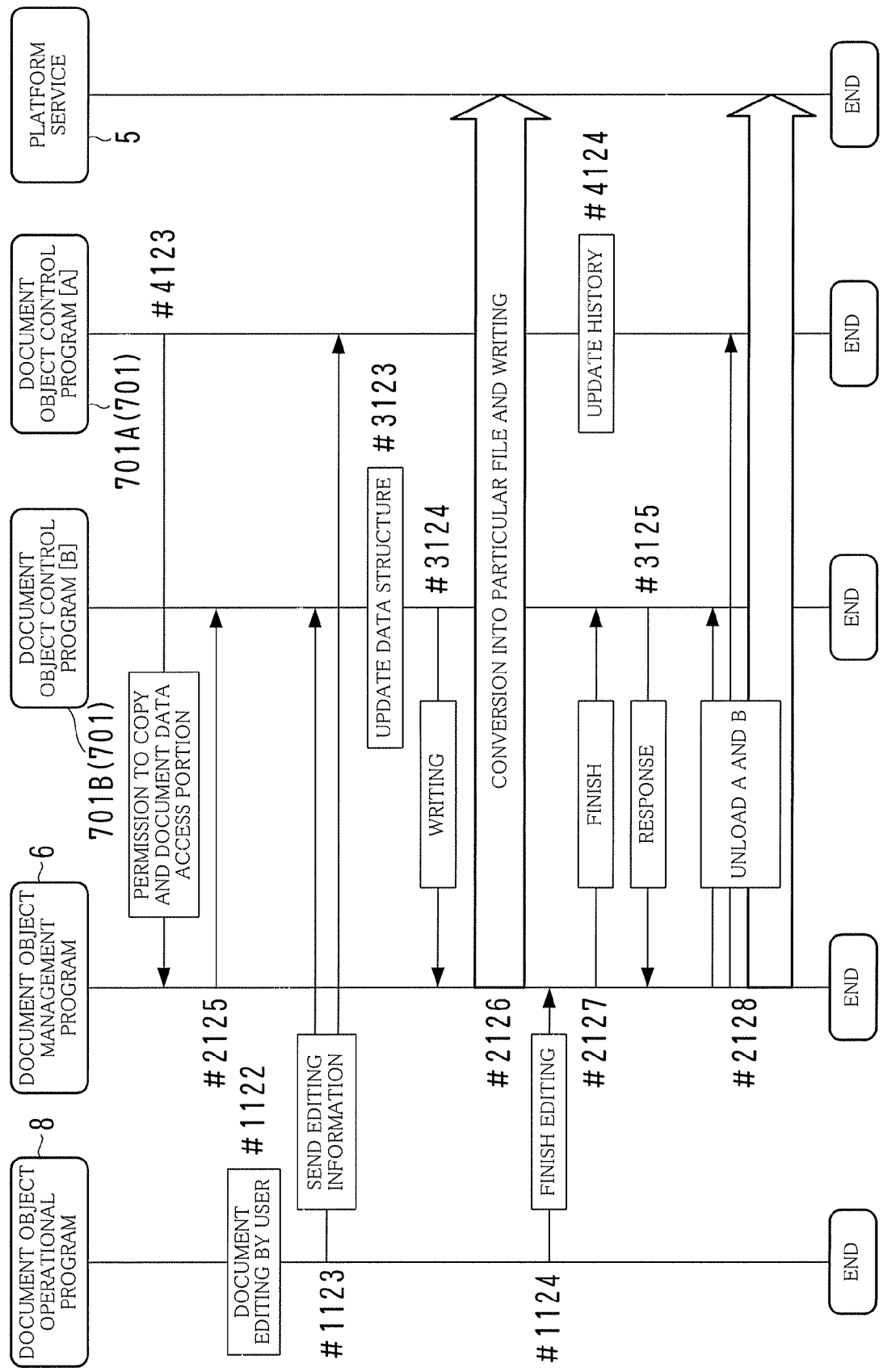
FIG. 33 is a flowchart showing an example of a process of editing document data.

The following is a description, with reference to FIGS. 32 and 33, of a process procedure in the case of editing the document data 700 of the document object B generated by the replication process described earlier with reference to FIGS. 18 and 19. Supposing that the document objects A and B are present in the same platform.

If a user designates the document object B and enters a command to edit, then the document object operational program 8 informs the document object management program 6 of the designation and the command (#1121 in FIG. 32).

The document object management program 6 causes the platform service 5 to load the document object control program 701 (701B) of the document object B (#2121).

The document object management program 6 instructs the document object control program 701B to start a process for editing the document data 700 of the document object B (#2122).

In response, the document object control program 701B refers to the relationship information 704 of the document object B itself, and thereby confirms whether or not the document object B itself has a parent (#3121).

If it is confirmed that the document object B has a parent, then the document object control program 701B requests the parent, that is, the document object A via the document object management program 6 to permit to edit the document data 700 (#3122).

Then, the document object management program 6 causes the platform service 5 to load the document object control program 701 (701A) of the document object A (#2123).

The document object management program 6 requests the document object A to permit to edit the document data 700 of the document object B (#2124).

In response, the document object control program 701A refers to the relationship information 704 of the document object A itself, and thereby confirms whether or not the document object A itself has a parent (#4121).

If it is confirmed that the document object A has no parents, then the document object control program 701A causes the object authentication management portion 705 of the document object A to determine whether or not editing the document data 700 should be permitted (#4122).

If it is determined that the editing process is permitted, then the document object control program 701A gives the document object B, via the document object management program 6, a reply message indicating that the editing process is permitted and the encryption key AK that is used for encrypting the document data 700 of the document object B, i.e., a portion for accessing the document data 700 (#4123 and #2125 in FIG. 33).

The document data 700 is decoded by the encryption key AK, so that a document image is reproduced as before. Here, the user modifies the document image or performs various processes thereon (#1122). Then, the document object operational program 8 sends, to the document objects A and B, information on operation performed by the user on the document image (editing information) (#1123).

The document object control program 701B updates (edits) the document data 700 based on the editing information sent from the document object operational program 8 (#3123).

Then, the document data 700 thus edited is encrypted again by the encryption key AK sent from the document object A, subjected to a scrambling process, and saved (#3124 and #2126).

The history management portion 707 of the document object A adds the details, and the date and time of the editing this time to the history information (#4124).

When the user enters a command to complete the editing process, the document object operational program 8 sends the completion notice to the document object control program 701B via the document object management program 6 (#1124 and #2127). If the document object control program 701B responds to this (#3125), then the document objects A and B are unloaded by the document object management program 6 (#2128).

If the document object 7 of the edited document data 700 has no parents, the details, and the date and time of the editing this time are added to the history information of the history management portion 707 of the document object 7 itself. Further, if the document object 7 of the edited document data 700 has two generations or more, the details, and the date and time of the editing this time are added to the history information of the history management portion 707 of the oldest generation document object. The idea for authentication is similar to the case of replication or browsing of the document object 7.

[Reproduction on Backup Device]

In principle, a process procedure of replicating a document object 7, for backup, on a device such as a removable disk or a standby server is the same as that of the replication process described earlier with reference to FIGS. 18 and 19.

Figure 34:
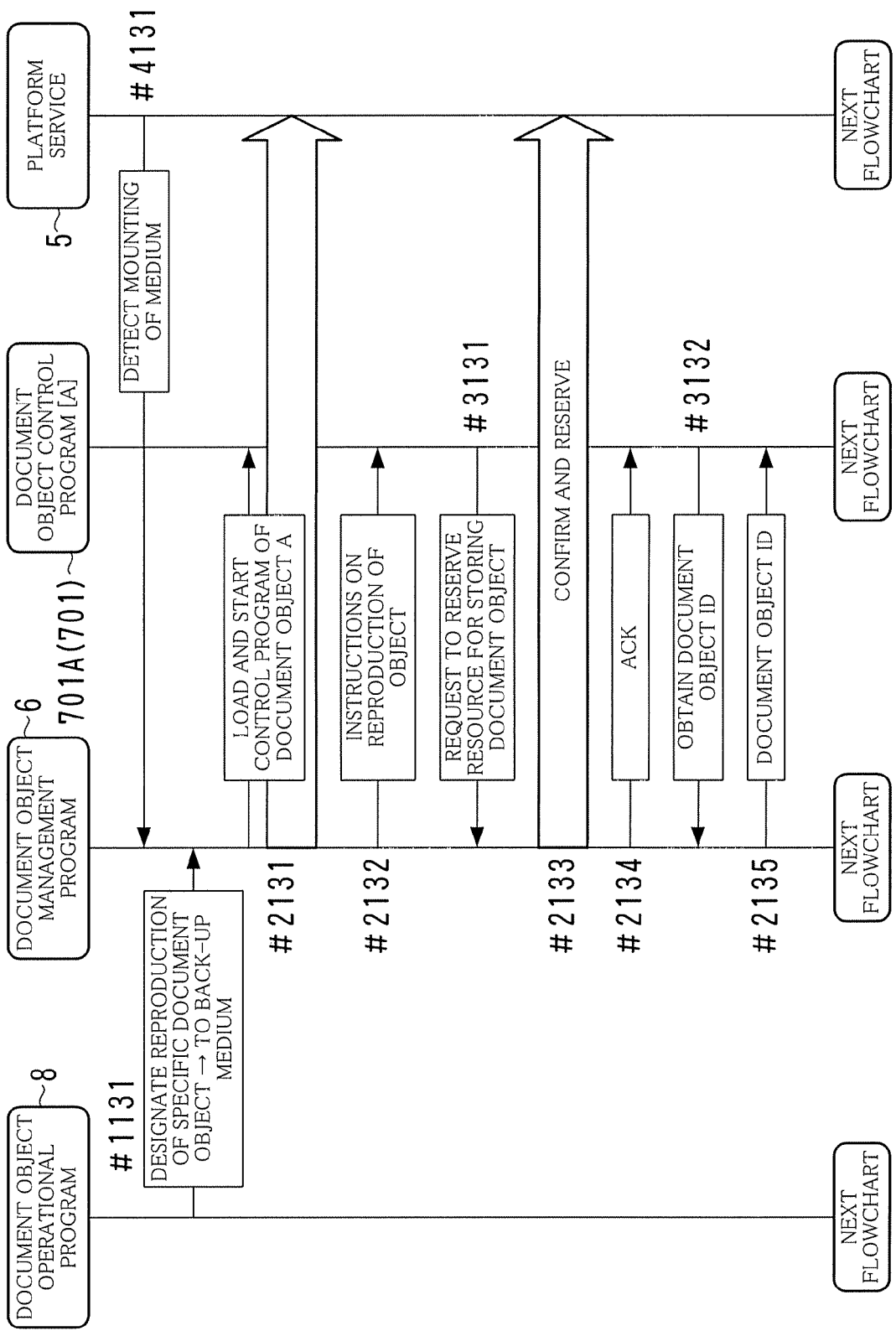
FIG. 34 is a flowchart showing an example of a replication process on a backup device.
Figure 35:
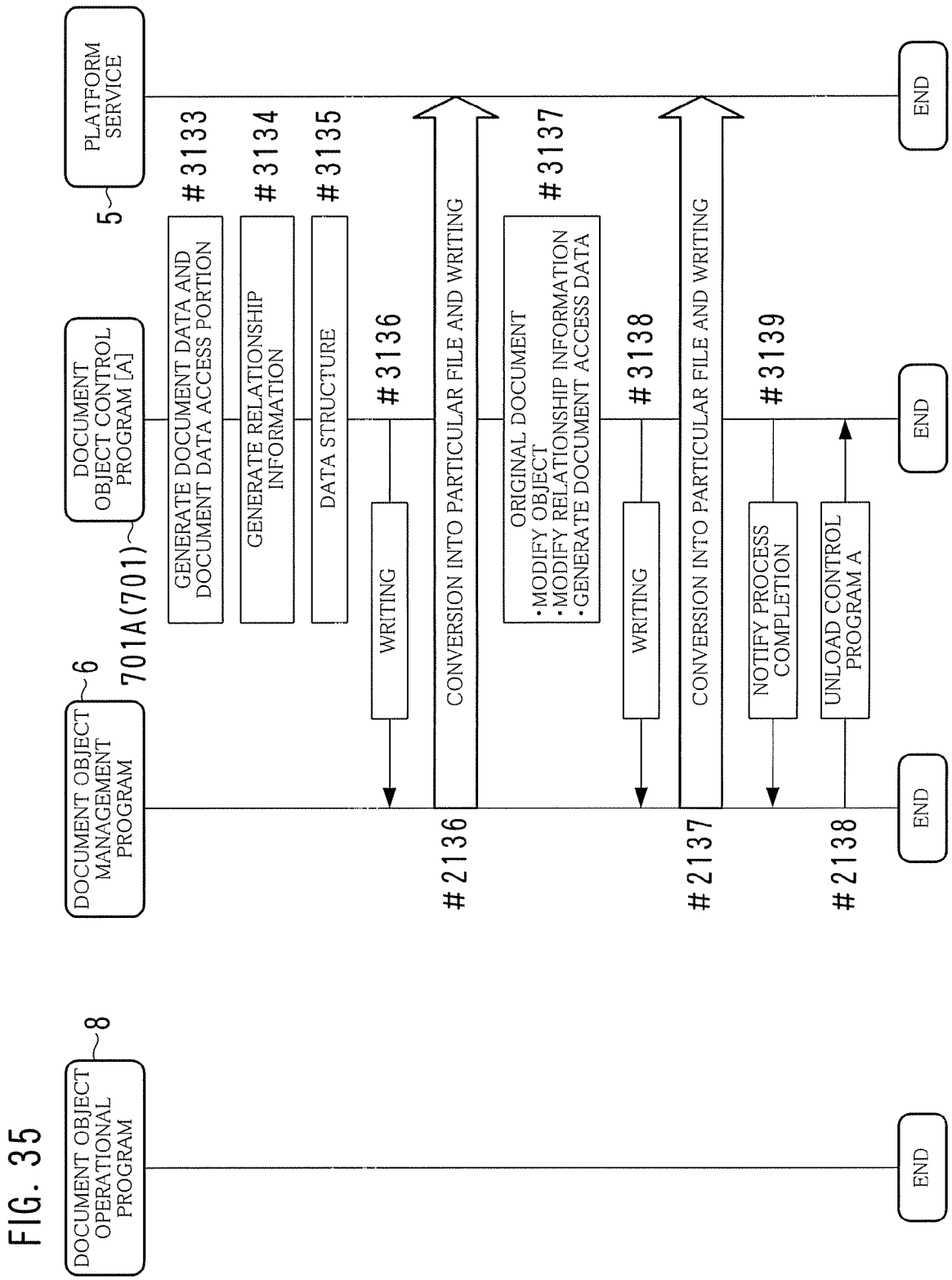
FIG. 35 is a flowchart showing an example of a replication process on a backup device.

The following is a description, with reference to FIGS. 34 and 35, of a replication process flow for backup in the case where the document object A is replicated on a removable disk.

When detecting that the removable disk is mounted, the platform service 5 of the image forming apparatus 1 or the general-purpose computer 2 informs the document object management program 6 of the image processing apparatus 1 or the general-purpose computer 2 itself to that effect (#4131 in FIG. 34).

If a user designates the document object A and enters a command to backup to the removable disk, then the document object operational program 8 informs the document object management program 6 of the designation and the command (#1131).

The document object management program 6 causes the platform service 5 to load the document object control program 701 (701A) of the document object A (#2131).

The document object management program 6 instructs the document object control program 701A to start a process for replicating the document object A into the removable disk (#2132).

In response, the document object control program 701A requests the document object management program 6 to reserve a resource for storing a replication of the document object A (a storage area on the removable disk) (#3131).

If the document object management program 6 confirms that a resource can be reserved, then it causes the platform service 5 to reserve the resource (#2133), and sends to the document object control program 701 a reply message indicating that the resource can be reserved and identification information (writing pointer) of the resource (#2134).

Responding to this, the document object control program 701A has the document object management program 6 issue a unique document object ID for a replication (clone in this case) of the document object (#3132 and #2135).

If the resource and the document object ID are prepared, then the document object control program 701A replicates components of the document object A except for the relationship information 704, and thereby generates document data and a document data access portion (#3133 in FIG. 35). Further, the document object control program 701A generates the relationship information 704 indicating information on a document object 7 that is a partner of the replication (clone), that is, the document object A and information on an owner who owns the document object A (#3134).

The generated document data 700 through the document object interface 708 are combined in accordance with a predetermined format. Thereby, a clone of the document object A is completely generated (#3135). Then, the clone is saved in the reserved resource via the document object management program 6 after being subjected to a scrambling process and others (#3136 and #2136).

In relation to the generation of the clone, the document object control program 701A modifies the document object A itself (#3137). Specifically, the document object control program 701A adds information on the clone to the relationship information 704 of the document object A itself.

Then, the document object control program 701A causes the platform service 5 via the document object management program 6 to perform a process for performing a scrambling process on the document object A thus modified to save the same again (#3138 and #2137).

In this way, the replication process of the document object A is completed. The log of this process details is managed by the history management portion 707.

When the document object control program 701A informs the document object management program 6 of the process completion (#3139), the document object A is unloaded by the document object management program 6 (#2138).

Figure 36:
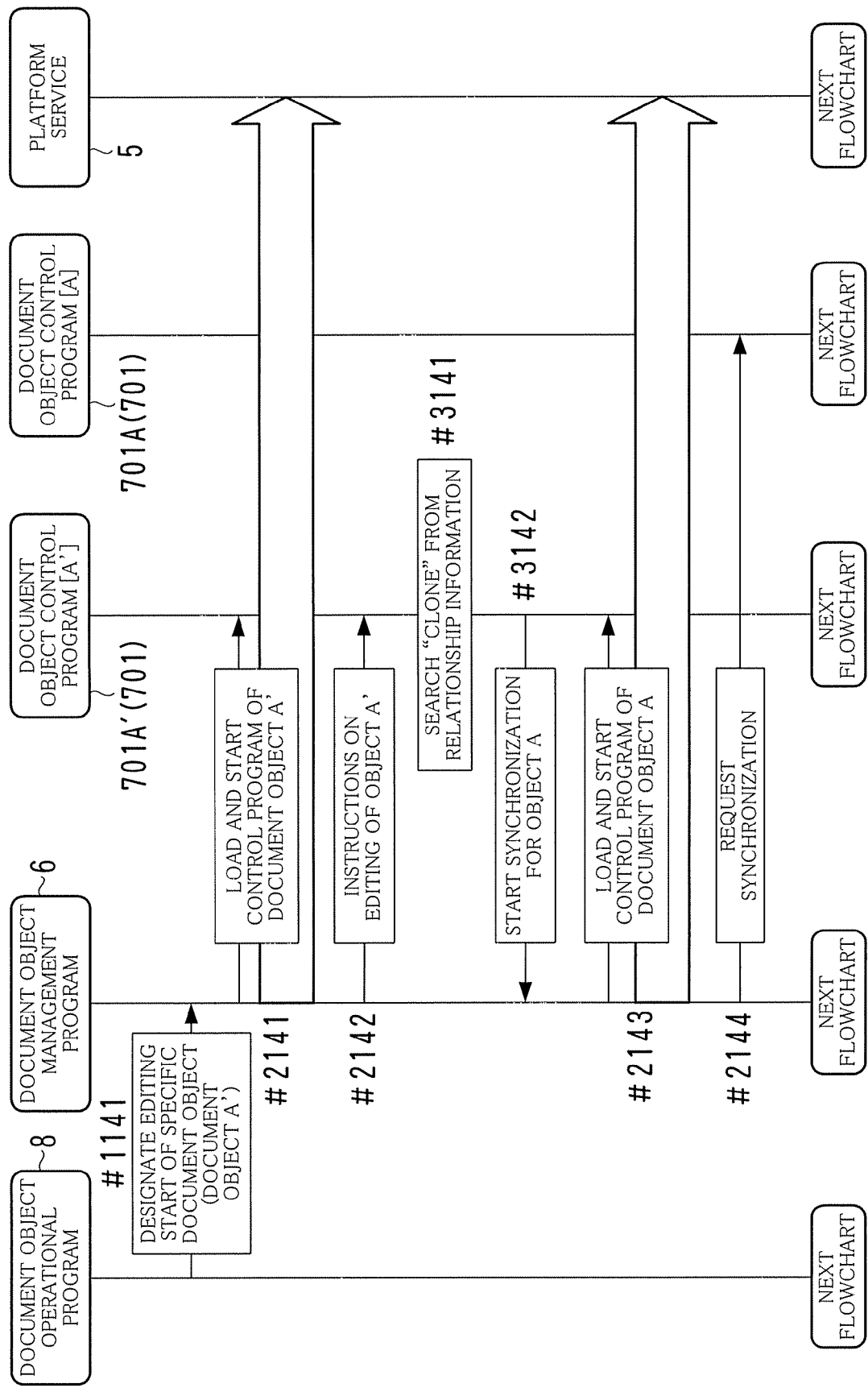
FIG. 36 is a flowchart showing an example of a process of synchronizing a document object with a clone.

After that, when any one of the document object A and the clone thereof is updated, the other is updated accordingly. Stated differently, the document object A and the clone thereof are synchronized with each other. The following is a description, with reference to FIGS. 36 and 37, of a process procedure of synchronizing the document object A with the clone thereof (hereinafter referred to as a "document object A'") in the case where document data 700 of the document object A' is edited.

As described earlier with reference to Steps #1121, #2121 and #2122 in FIG. 32, a document object control program 701 (hereinafter referred to as a "document object control program 701A'") of the document object A' including the document data 700 that is the target of editing is started and instructions to start a process for editing are issued to the document object control program 701A' (#1141, #2141 and #2142).

In response, the document object control program 701A' refers to relationship information 704 of the document object A' itself, and thereby confirms whether or not the document object A' itself has a clone (#3141).

If it is confirmed that the document object A' has a clone, then the document object control program 701A' requests the clone, i.e., the document object A via the document object management program 6, to start a process for synchronization of the document data 700 (#3142).

Responding to this, the document object management program 6 causes the platform service 5 to load the document object control program 701 (701A) of the document object A (#2143).

The document object management program 6 requests the document object control program 701 (701A) to synchronize the document data 700 of the document object A in line with the editing details of the document data 700 of the document object A' (#2144).

Figure 37:
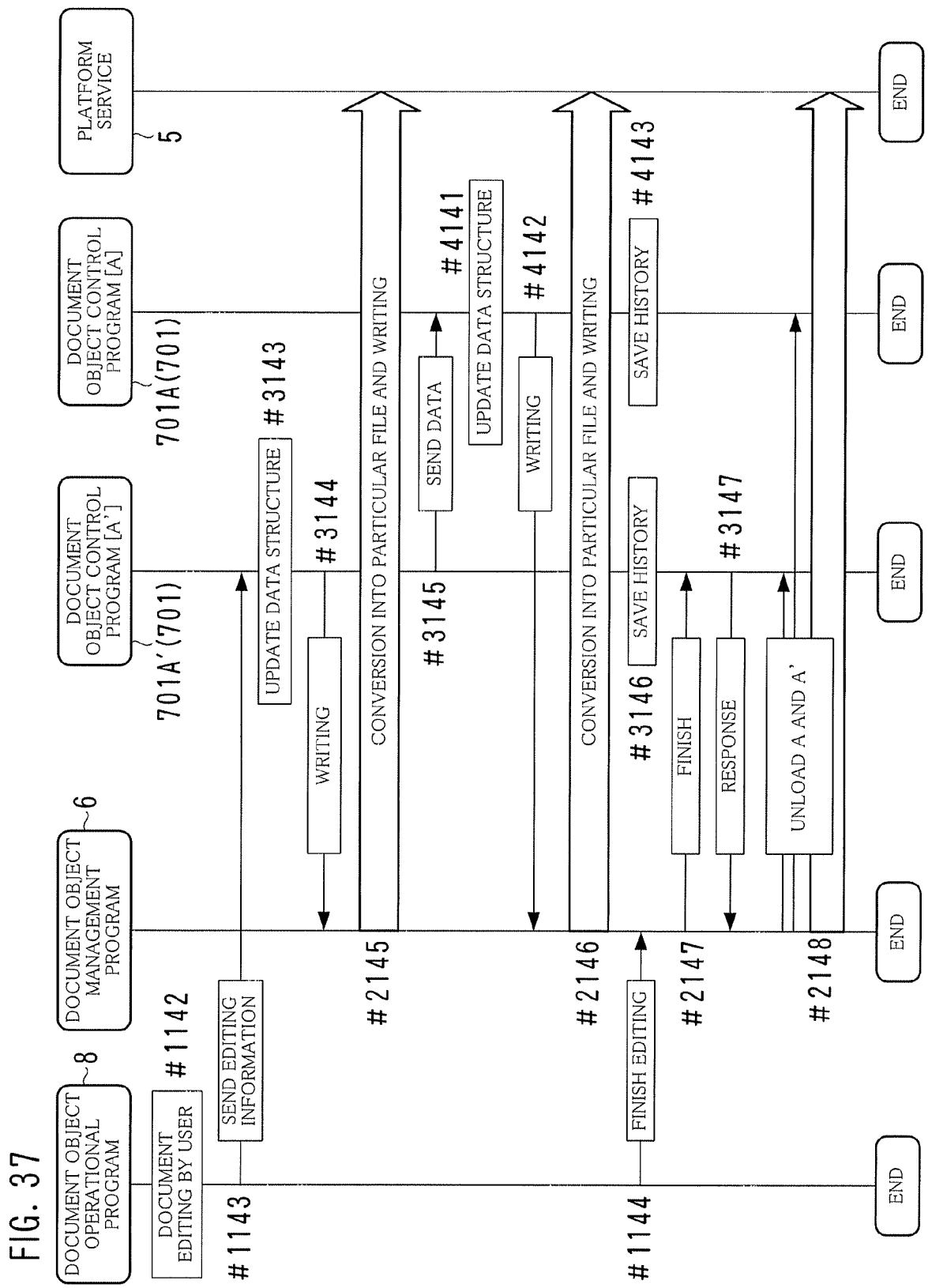
FIG. 37 is a flowchart showing an example of a process of synchronizing a document object with a clone.

After a document image is reproduced based on the document data 700 of the document object A', a user modifies the image or performs various process on the image (#1142 in FIG. 37). Then, information indicating the editing details (editing information) is sent from the document object operational program 8 to the document object A' (#1143).

The document object control program 701A' updates (edits) the document data 700 of the document object A' based on the editing information sent from the document object operational program 8 (#3143). The document data 700 thus edited is subjected to a scrambling process, etc. and saved (#3144 and #2145).

In parallel with this or before or after the process of updating (editing) the document data 700 of the document object A', the document object control program 701A' transfers the editing information to the document object A via the document object management program 6 (#3145).

Likewise, the document data 700 relating to the document object control program 701A is updated (edited) based on the editing information (#4141) and the document data 700 is subjected to a scrambling process, etc. and saved (#4142 and #2146).

The history management portions 707 of the respective document objects A and A' add the details, and the date and time of the editing this time to the history information (#3146 and #4143).

When the user enters a command to finish the editing process, the document object operational program 8 sends the completion notice to the document object control program 701A' via the document object management program 6 (#1144 and #2147). If the document object control program 701A' responds to this (#3147), then the document objects A and A' are unloaded by the document object management program 6 (#2148).

As described earlier with reference to FIGS. 32 and 33 in the case where the document object A has a parent, authentication is obtained from the parent, and after that, an editing process of the document data 700 of each of the document objects A and A' is performed.

[Activation of Backup Device]

A case arises where a removable disk in which a document object 7 is saved is ejected from a drive once and is mounted on the drive again. Further, a case arises where document data 700 relating to a clone of the document object 7 saved in the removable disk is edited while the removable disk is ejected from the driver. If such is the case, the document data 700 of the document object 7 saved in the removable disk is inconsistent with the document data 700 relating to the clone.

Figure 38:
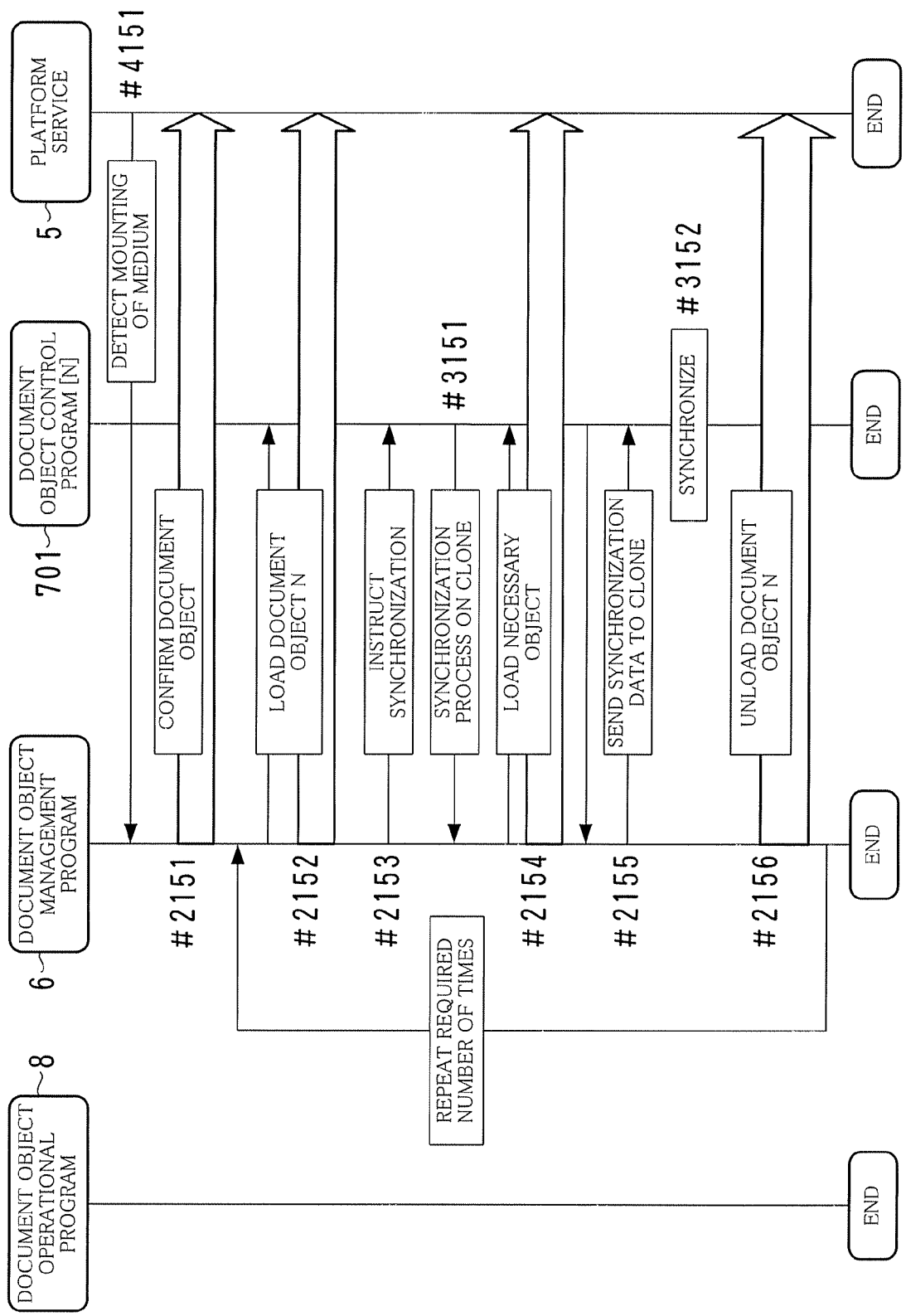
FIG. 38 is a flowchart showing an example of a process when a backup device is activated.

In order to avoid such inconsistency, a process shown in FIG. 38 is performed to synchronize between both the document data 700 when the removable disk is mounted on the drive.

When detecting that the removable disk is mounted, the platform service 5 of the image forming apparatus 1 or the general-purpose computer 2 informs the document object management program 6 thereof to that effect (#4151 in FIG. 38).

In response, the document object management program 6 inquires of the platform service 5 as to whether or not the document object 7 is saved in the removable disk (#2151).

If it is confirmed that the document object 7 is saved, the document object management program 6 starts the document object 7 (#2152) and instructs the document object 7 to perform a process for obtaining the synchronization (#2153).

Responding to this, the document object 7 is caused to load a clone thereof via the document object management program 6 (#3151 and #2154). The difference between both the document data 700 is searched, for example by comparing both the document data 700 with each other. Then, the difference data is sent as synchronization data from the new side to the old side (#2155). The document object control program 701 of the document object 7 that has received the synchronization data updates the document data 700 of the document object 7 itself in accordance with the synchronization data (#3152). Thereby, the synchronization is obtained and the inconsistency is corrected.

The document object 7 to which the synchronization was obtained is appropriately unloaded (#2156).

In the case where a plurality of document objects 7 are saved in the removable disk, the process of Steps #2152 through #2156, #3151 and #3152 is performed on each of the document objects 7.

The following is a description of a process flow of each of the document object management program 6 and the document object control program 701 with reference to flowcharts.

Figure 39:
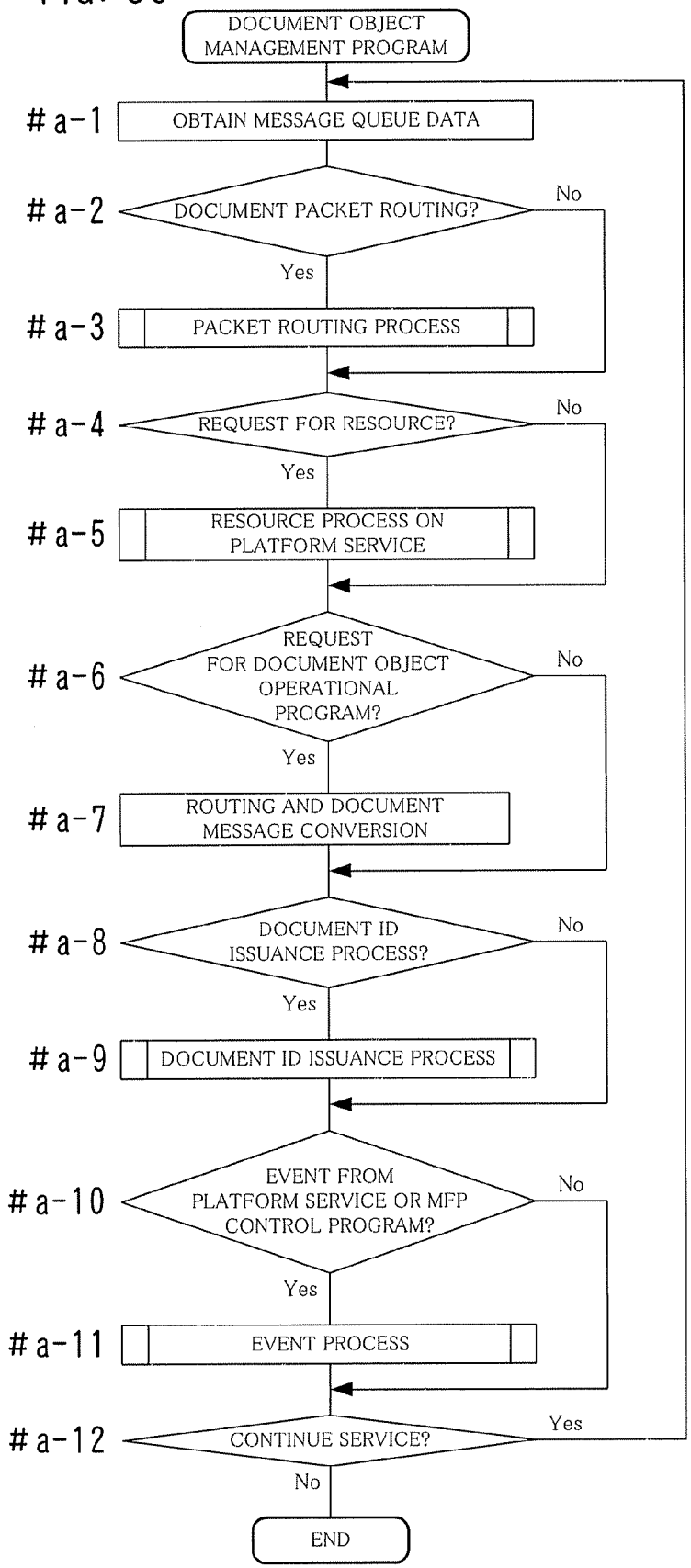
FIG. 39 is a flowchart showing an example of a main routine of a document object management program.

With the document object management program 6, a process procedure shown in FIG. 39 is performed.

Specifically, in the document object management program 6, when a message is obtained from a message queue (#a-1), the following process is performed depending on, for example, the contents indicated in the message.

In the case where the message is to be exchanged between two document objects 7 (Yes in #a-2), packet routing is performed (#a-3). The packet routing procedure is as shown in FIG. 40.

Figure 40:
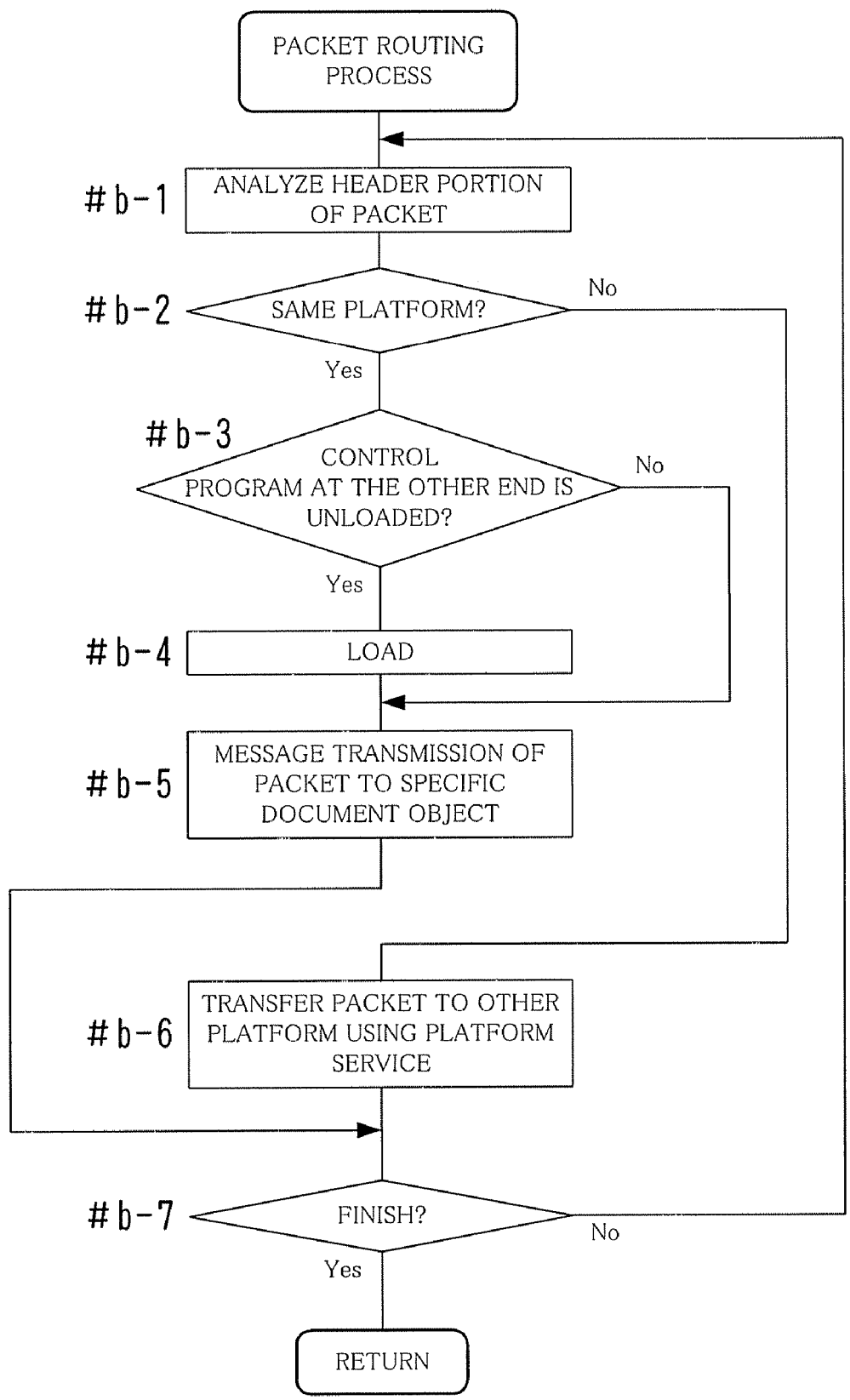
FIG. 40 is a flowchart showing an example of packet routing.

A header portion of a packet of the message is analyzed, and thereby to determine a document object 7 that is the transmission source and a document object 7 that is the transmission destination (#b-1 in FIG. 40).

In the case where both the document objects 7 are present in the same platform (Yes in #b-2), if the document object 7 that is the transmission destination is not loaded (started) yet (Yes in #b-3), then the document object 7 is loaded (#b-4). Then, the packet is sent to the transmission destination (#b-5).

In contrast, in the case where both the document objects 7 are present in different platforms (No in #b-2), the packet is transferred by the platform service 5 via the communication line to the platform where the document object 7 as the transmission destination is present (#b-6). Then, in that platform, the packet is routed again by the platform service 5 and the document object management program 6, and the packet is delivered to the document object 7 that is the transmission destination. In the case where that document object 7 is not loaded, it is loaded at this timing.

In the case where the message is made up of a plurality of packets, the process of Steps #b-1 through #b-6 is appropriately performed on each of the packets.

Figure 41:
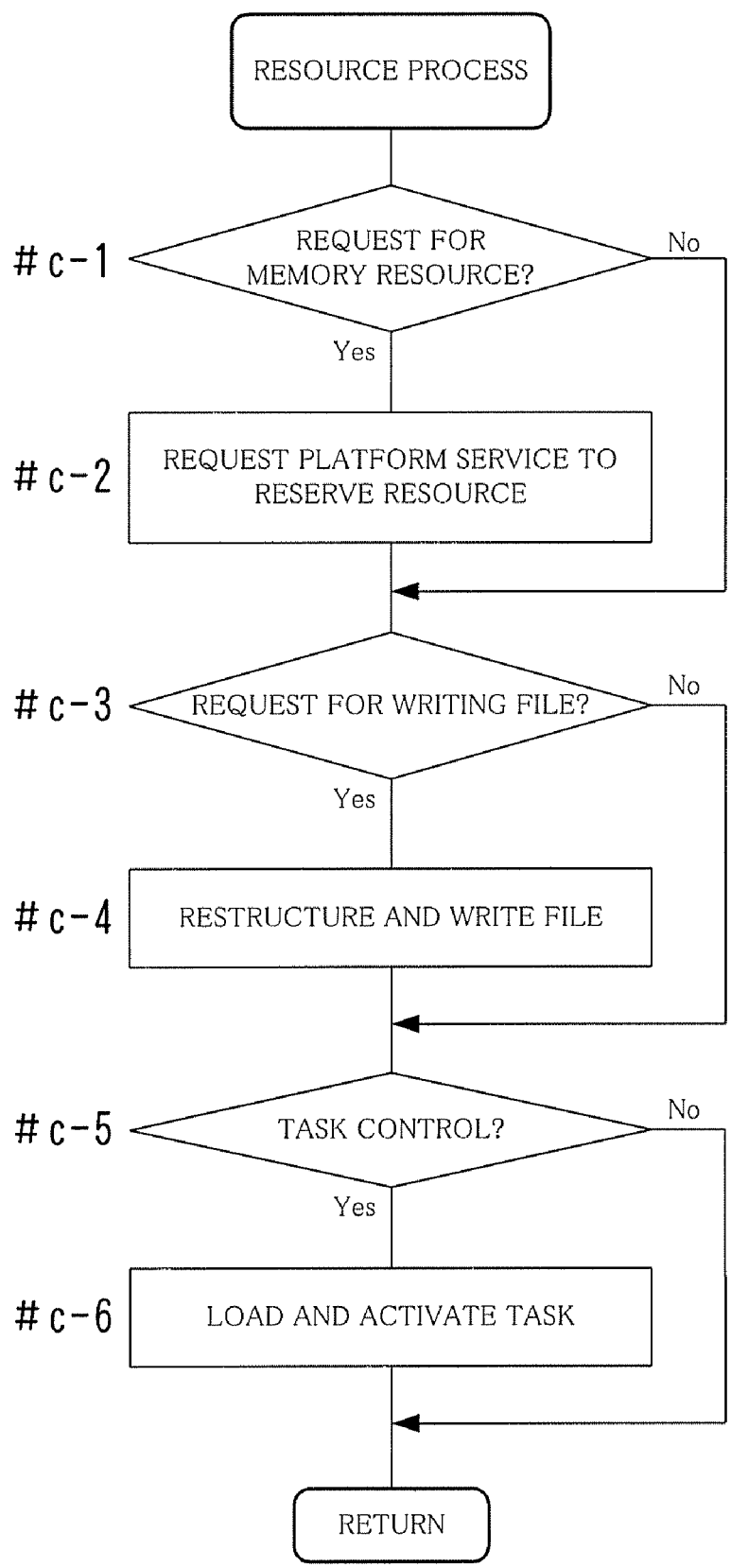
FIG. 41 is a flowchart showing an example of a resource process.

Referring back to FIG. 39, when a request to reserve a resource, to write a file into the resource, or to perform task control is received (Yes in #a-4), a process as shown in FIG. 41 is performed (#a-5).

When the request to reserve a resource is received (Yes in #c-1 in FIG. 41), the document object management program 6 requests the platform service 5 to reserve a resource for saving (writing) a particular document object 7 in the hard disk or the removable disk (#c-2).

When the request to write a file (a scramble file, for example) relating to the document object 7 is received (Yes in #c-3), the document object management program 6 causes the platform service 5 to perform a process for writing the file in the reserved resource (#c-4).

When the request to perform task control is received (Yes in #c-5), the document object management program 6 loads a program or others for the task to activate the task (#c-6).

Referring back to FIG. 39, a request made by a user is notified from the document object operational program 8 (Yes in #a-6), the document object management program 6 converts a message indicating the contents of the request into a packet having a predetermined format and sends the message to the document object 7 that is the request source (#a-7).

Figure 42:
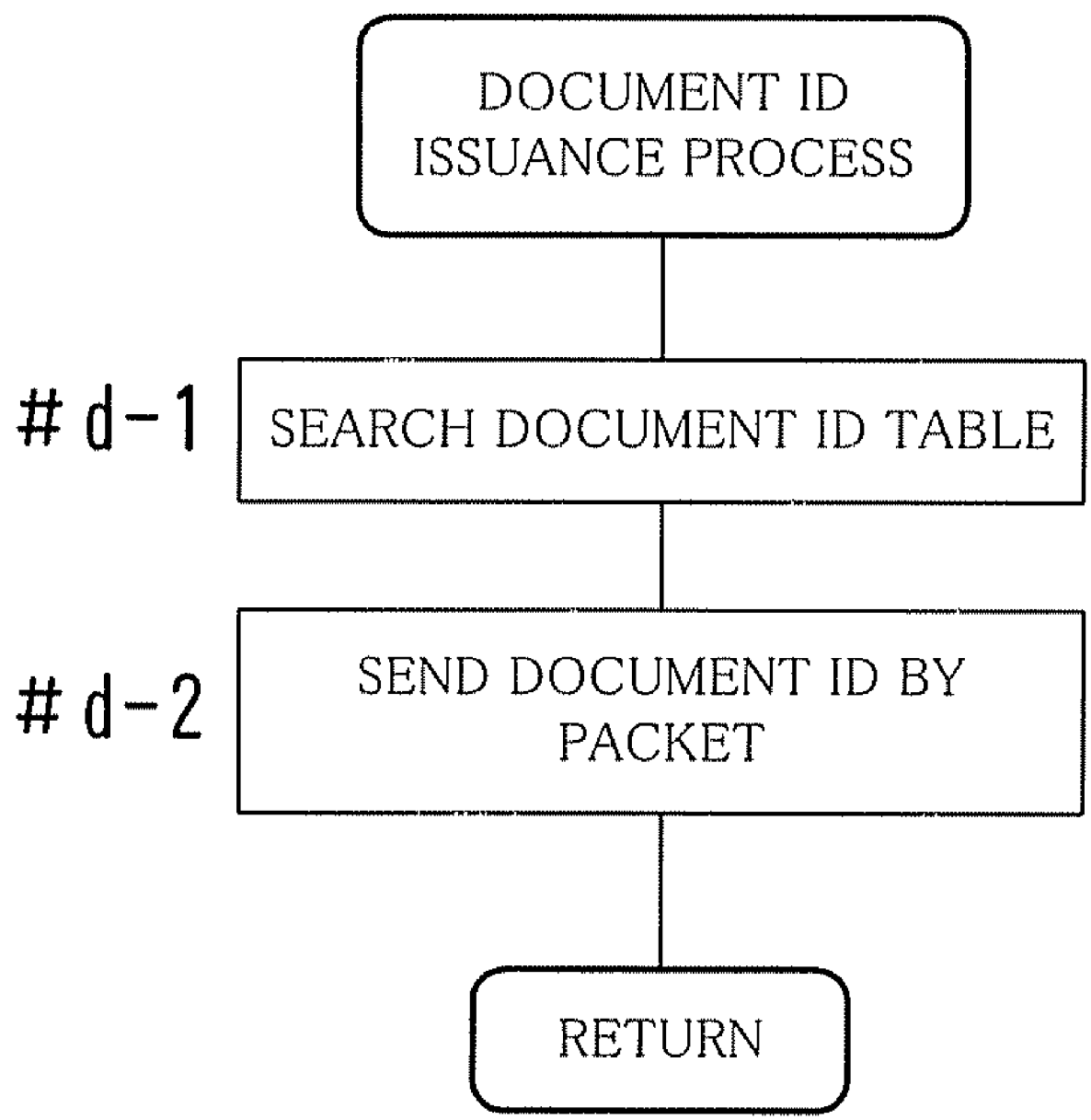
FIG. 42 is a flowchart showing an example of a process of issuing a document object ID.

When a request to issue a document object ID is made (Yes in #a-8), the document object management program 6 performs a process for issuing the same according to the procedure shown in FIG. 42 (#a-9).

Available document object IDs are searched from the management table (#d-1 in FIG. 42). Then, one of the available document IDs is selected and sent to the document object 7 that is the request source by a packet having a predetermined format (#d-2).

Figure 43:
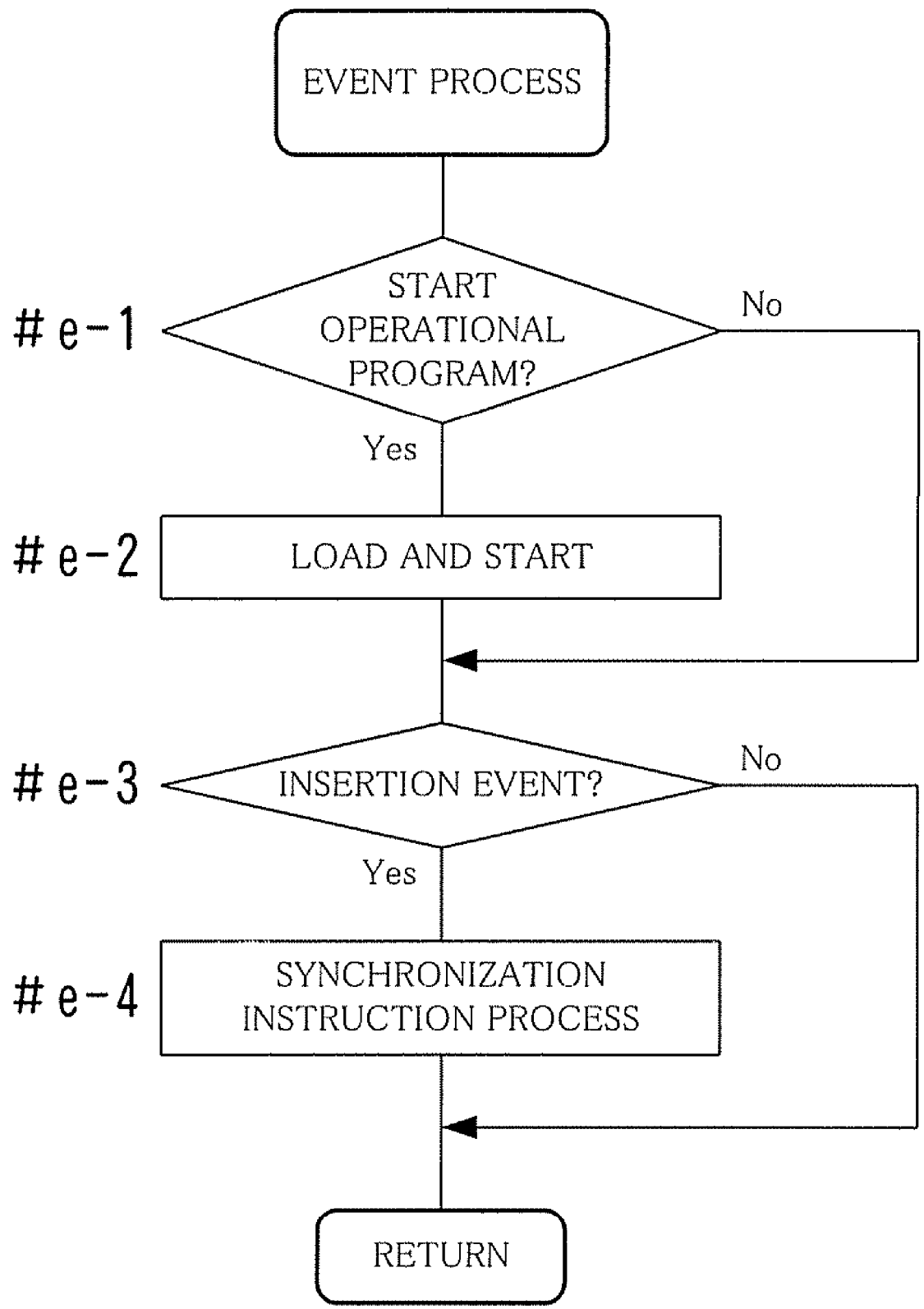
FIG. 43 is a flowchart showing an example of an event process.

Referring back to FIG. 39, in the case where the document object management program 6 receives an event from the platform service 5 or the MFP control program (Yes in #a-10), the document object management program 6 performs a process according to the procedure shown in FIG. 43 (#a-11).

When receiving an event of requesting to start the document object operational program 8 (Yes in #e-1 in FIG. 43), the document object management program 6 loads the document object operational program 8 (#e-2). When receiving an event of detecting the insertion of a removable disk (Yes in #e-3), the document object management program 6 instructs the document object 7 saved in the removable disk and a clone corresponding thereto to obtain synchronization therebetween (#e-4).

Each of the processes of Steps #a-2 through #a-11 is appropriately performed during running the document object management program 6 every time when a message is obtained from a message queue.

Figure 44:
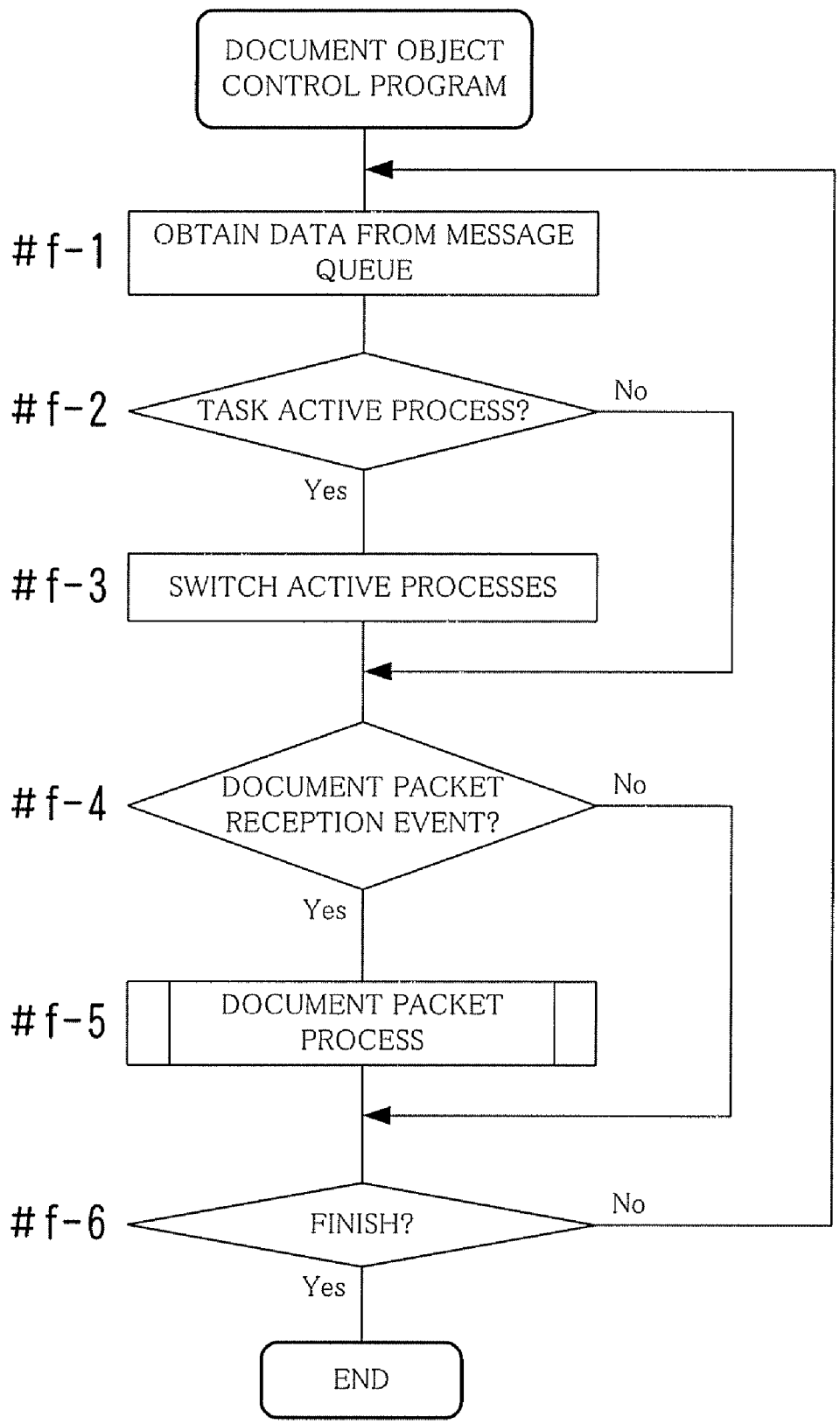
FIG. 44 is a flowchart showing an example of a main routine of a document object control program.

With the document object control program 701, a process procedure shown in FIG. 44 is performed.

Specifically, in the document object control program 701, if a message is obtained from a message queue (#f-1), then the following process is performed depending on the contents indicated in the message and others.

When it is necessary to make portions such as the document data access portion 702 under the control of the document object control program 701 active (Yes in #f-2), such portions are made to be active (#f-3).

Figure 45:
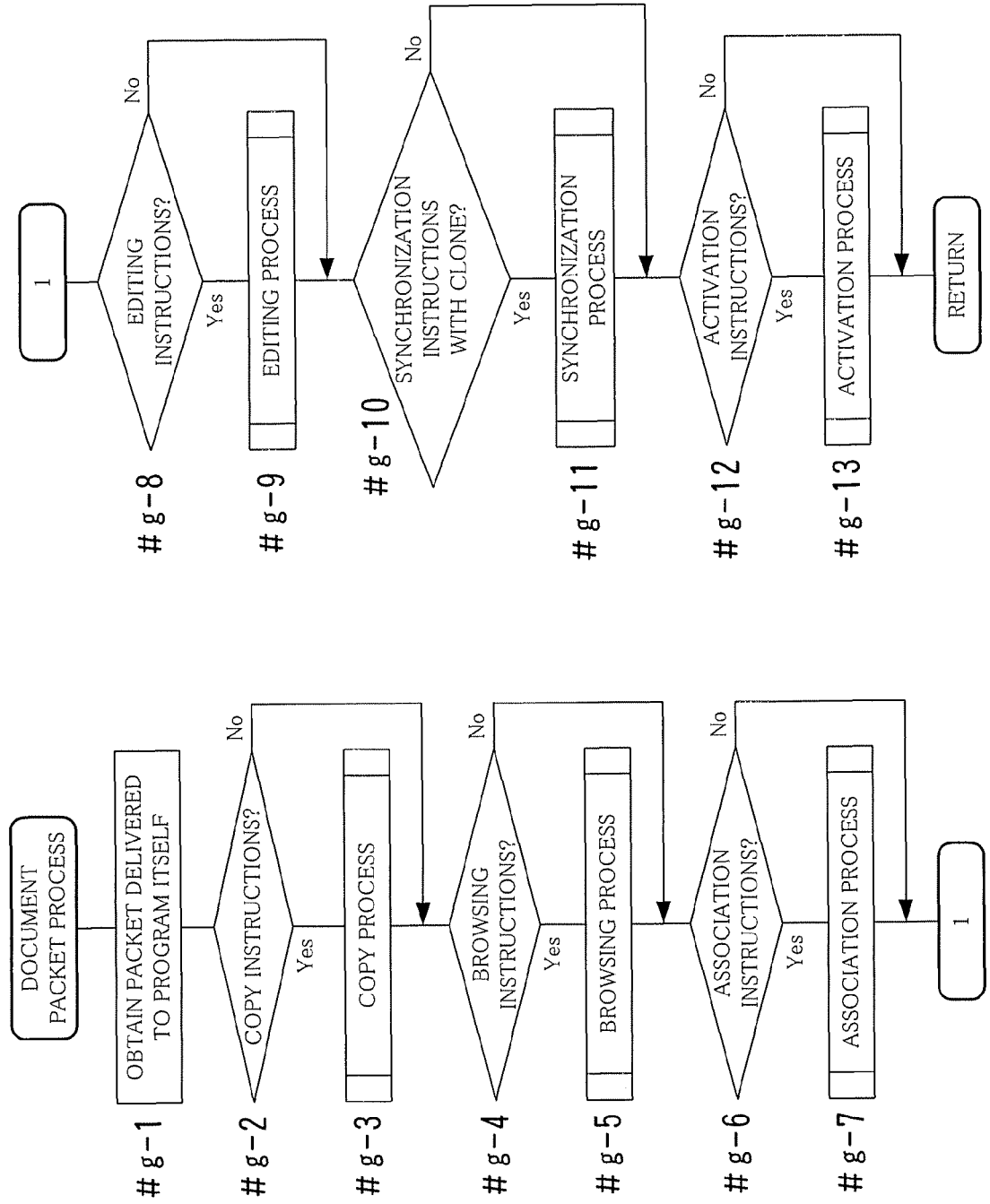
FIG. 45 is a flowchart showing an example of a document packet process.

When a packet of a message such as a request relating to the document object 7 or others is received (Yes in #f-4), a process shown in FIG. 45 is performed depending on the message (#f-5).

Figure 46:
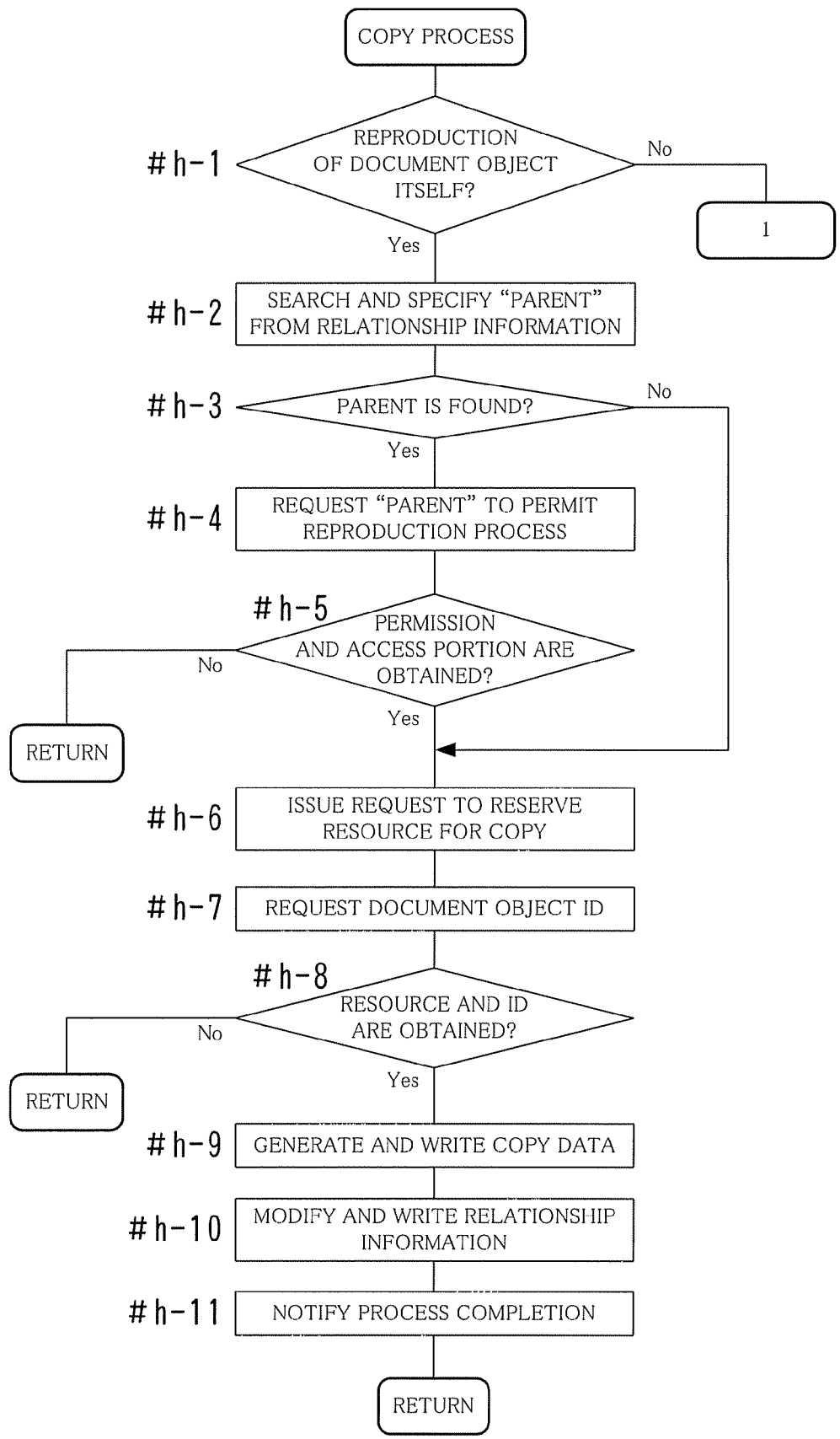
FIG. 46 is a flowchart showing an example of a copy process.
Figure 47:
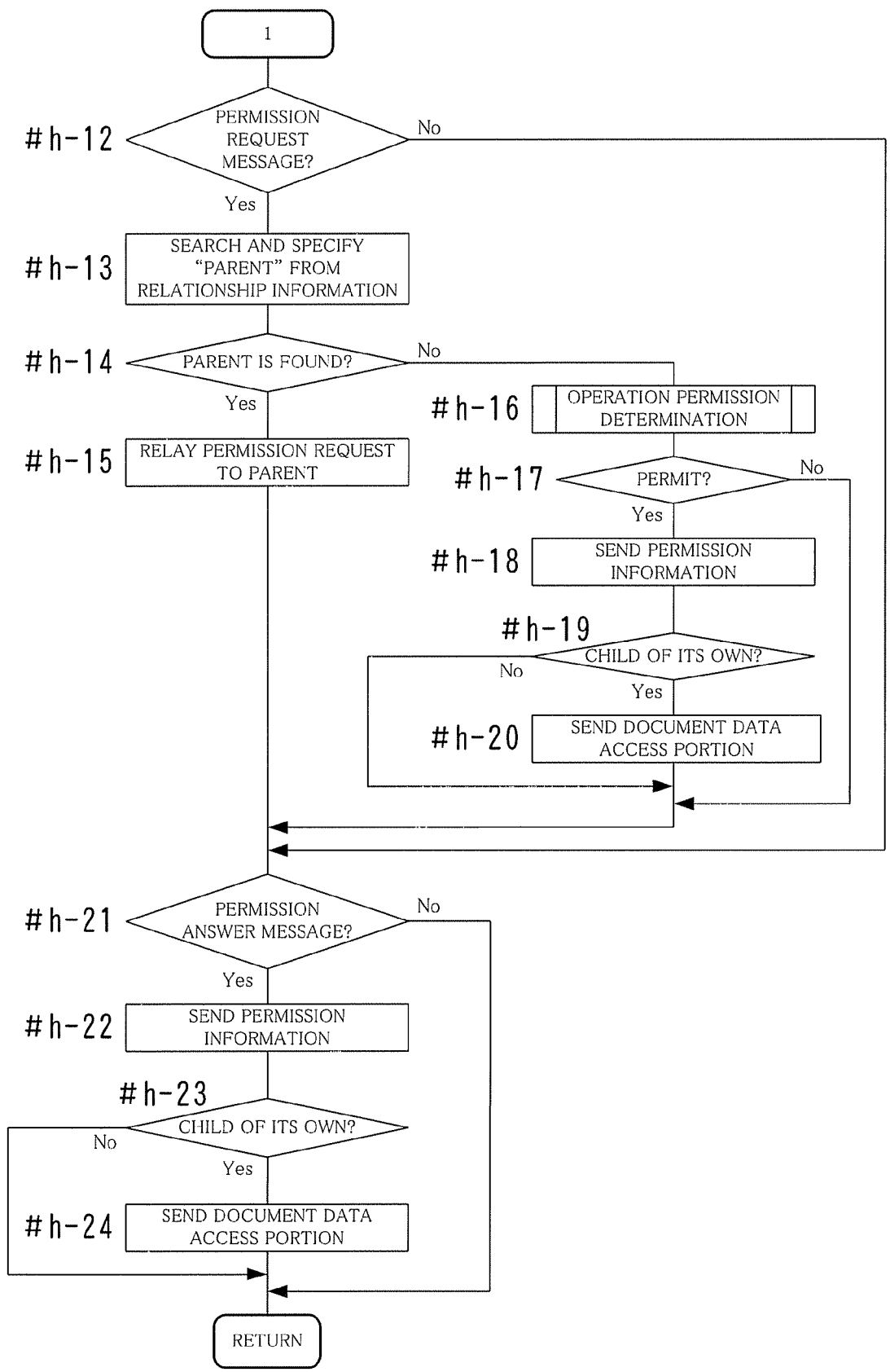
FIG. 47 is a flowchart showing an example of a copy process.

When the packet of the message delivered to the document object control program 701 itself is obtained (#g-1 in FIG. 45), if the message relates to replication (copying) of the document object 7 (Yes in #g-2), then a replication process is performed according to the procedure shown in FIGS. 46 and 47 (#g-3).

More specifically, if the message relates to replication of the document object 7 itself including the document object control program 701 (Yes in #h-1 in FIG. 46), then a parent of the document object 7 is searched and specified based on the relationship information 704 (#h-2).

If the document object 7 has no parents (No in #h-3), then the document object control program 701 requests the document object management program 6 to reserve a resource for replication, and further to issue a document object ID (#h-6 and #h-7).

If the document object 7 has a parent (Yes in #h-3), then the document object control program 701 requests the parent to permit a replication process (#h-4). Then, if the permission is obtained and an encryption key AK for decoding the document data 700 (i.e., a portion for accessing the document data 700) is obtained (Yes in #h-5), then the document object control program 701 requests to reserve a resource and to issue a document object ID as with the case of the absence of a parent (#h-6 and #h-7).

Then, if the resource and the document object ID are obtained (Yes in #h-8), then the document object control program 701 requests the platform service 5 via the document object management program 6 to generate a replication of the document object 7 and to write the same into the reserved resource (#h-9). The document object control program 701 adds information on the replication this time, i.e., a child to the relationship information 704 of the document object 7 (#h-10), and then informs the document object management program 6 of the completion of the replication process (#h-11).

In contrast, in the case where a message relating to replication of other document object 7 whose generation is younger than the document object 7 itself is obtained (No in #h-1), a process is performed according to the procedure shown in FIG. 47.

When the message relates to a request to permit a replication process (Yes in #h-12 in FIG. 47), a parent of the document object 7 itself is searched and specified based on the relationship information 704 (#h-13).

If the document object 7 has a parent (Yes in #h-14), then the document object control program 701 relays a message relating to the request to the parent (#h-15).

Figure 48:
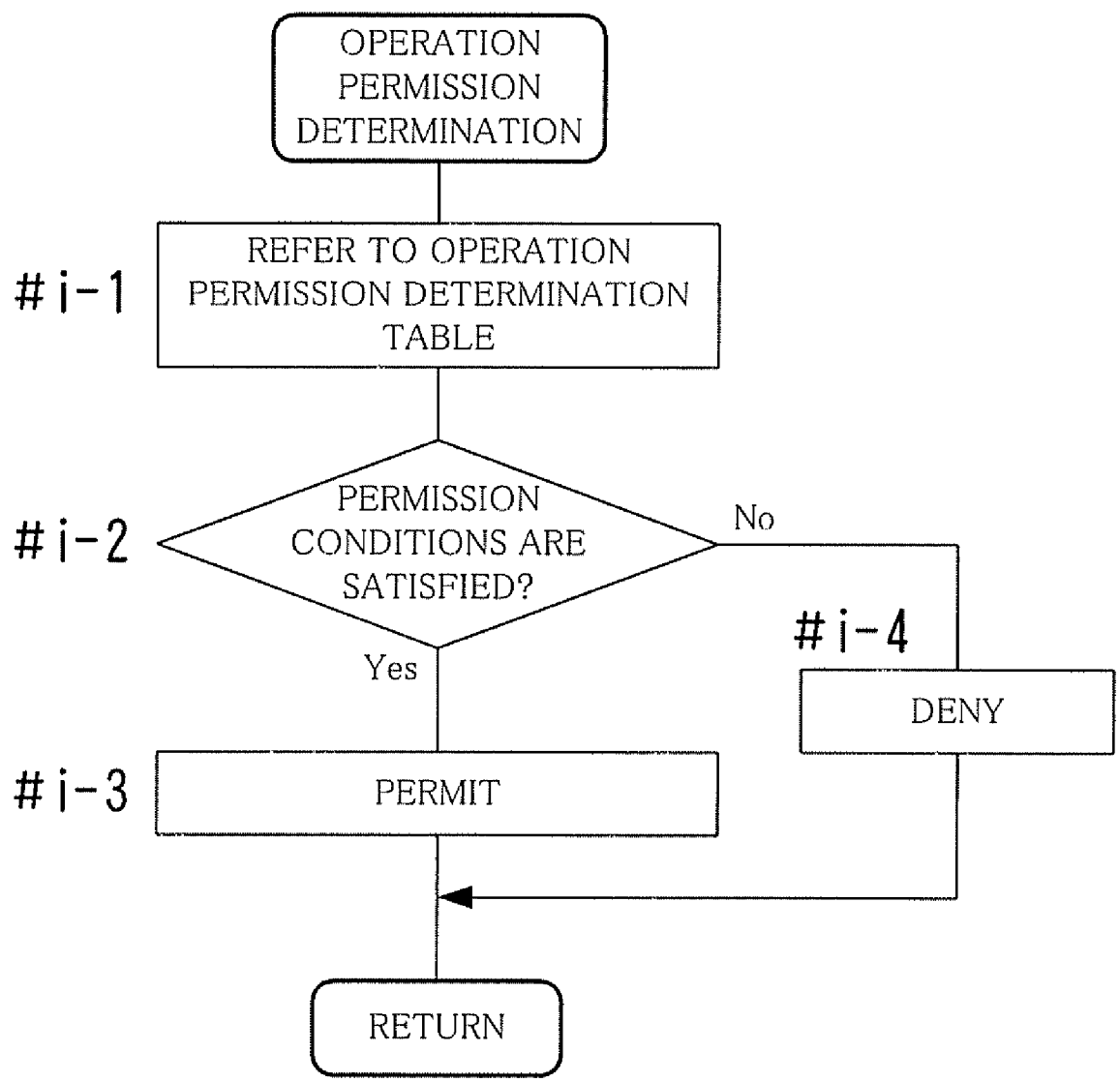
FIG. 48 is a flowchart showing an example of an operation permission determining process.

If the document object 7 has no parents (No in #h-14), the document object control program 701 determines whether or not permission of a replication process should be given, for example, according to the procedure shown in FIG. 48 (#h-16).

The document object control program 701 refers to a table showing the reference of permission/denial of operation and the history information managed by the history management portion 707. Thereby, it is checked whether or not allowable conditions are satisfied (#i-1 in FIG. 48). If the conditions are satisfied, then it is determined that the replication process is permitted (#i-3). If the conditions are not satisfied, it is determined that the replication process is not permitted (is denied) (#i-4). At this time, the determination result, i.e., whether or not permission is given is recorded in the history information of the history management portion 707.

In the case where it is determined that the replication process is permitted (Yes in #h-17 in FIG. 47), information to that effect, i.e., permission information is sent to the request source as a reply (#h-18). Further, when the request source is a child of its own (Yes in #h-19), an access portion of the child, i.e., an encryption key AK for decoding is also sent (#h-20). The permission information is transferred to younger generations one by one and eventually to the request source.

If the obtained message is permission information (Yes in #h-21), then the information is sent (transferred) to the request source (#h-22). Further, when the request source is a child of its own (Yes in #h-23), an access portion of the child, i.e., an encryption key AK for decoding is also sent (#h-24).

Figure 49:
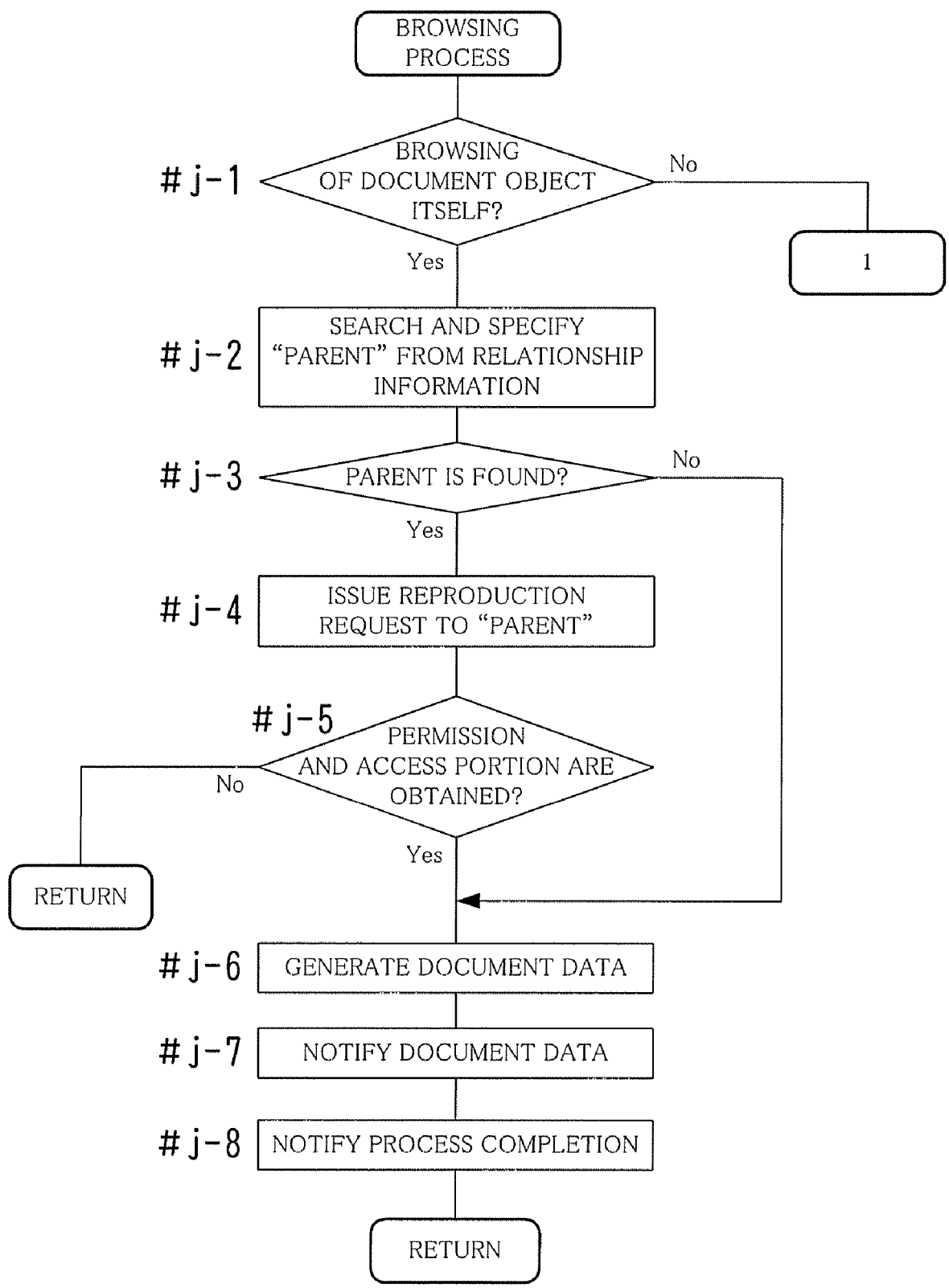
FIG. 49 is a flowchart showing an example of a browsing process.
Figure 50:
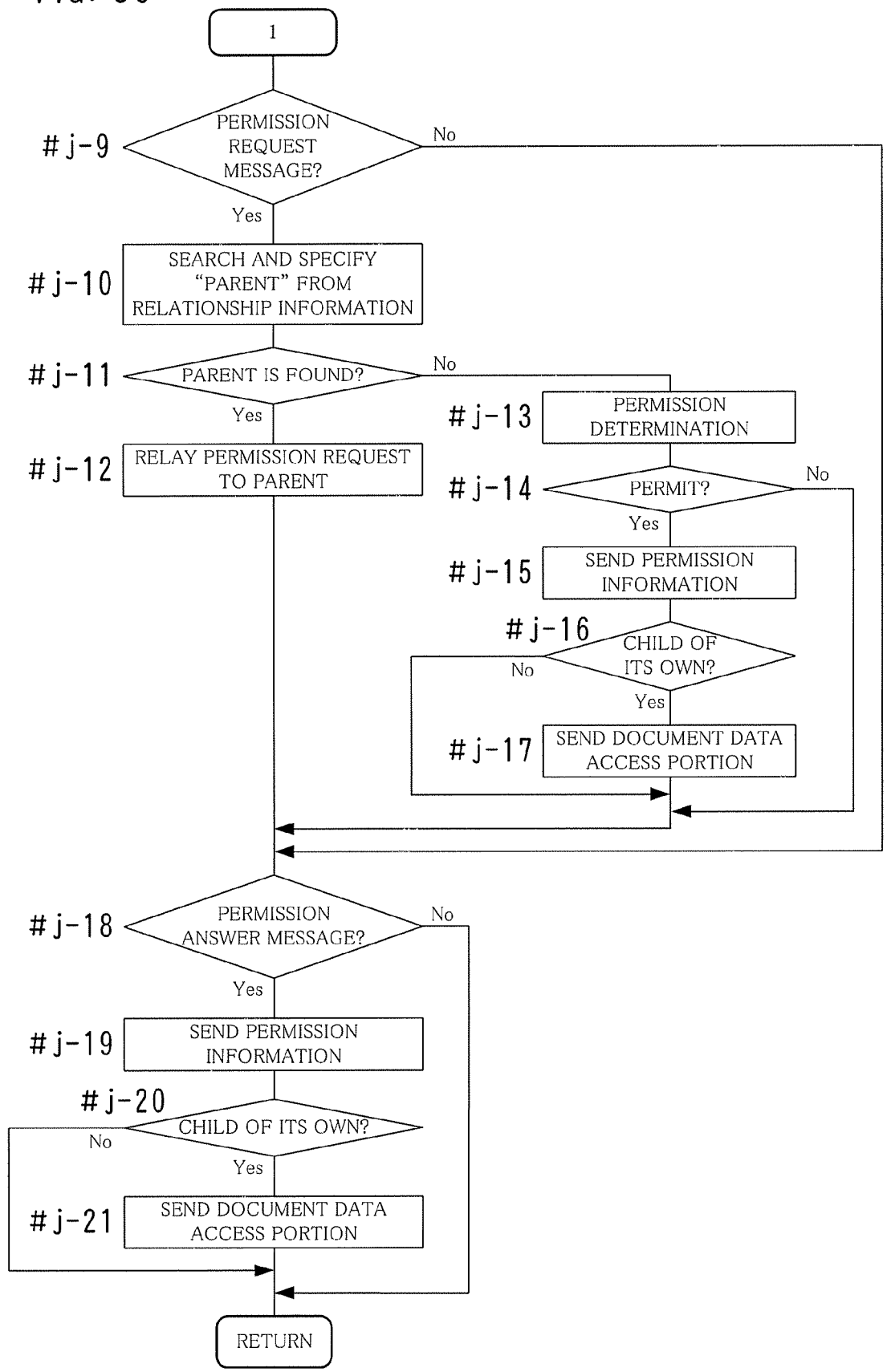
FIG. 50 is a flowchart showing an example of a browsing process.

Referring back to FIG. 45, when the obtained message relates to browsing of a document relating to the document object 7 (Yes in #g-4), a process for browsing is performed according to the procedure shown in FIGS. 49 and 50 (#g-5).

Specifically, in the case where the message relates to browsing of a document of the document object 7 itself including the document object control program 701 (Yes in #j-1 in FIG. 49), a parent of the document object 7 itself is searched and specified based on the relationship information 704 (#j-2).

If the document object 7 has no parents (No in #j-3), then the document data 700 of the document object 7 itself is regenerated by, for example, decoding (#j-6) and the document data 700 is given to the document object management program 6 (#j-7). In response, the document object management program 6 and the platform service 5 reproduce a document based on the document data 700.

If the document object 7 has a parent (Yes in #j-3), then the document object control program 701 requests the parent to permit browsing (#j-4). Then, if the permission is obtained and an encryption key AK for decoding the document data 700 is obtained (Yes in #j-5), then the document data 700 is regenerated by, for example, decoding (#j-6) and the document data 700 is given to the document object management program 6 as with the case of the absence of a parent (#j-7). Thereby, a document is reproduced.

Then, the document object control program 701 informs the document object management program 6 of the completion of the browsing process (#j-8).

In contrast, in the case where a message relating to browsing of a document of other document object 7 whose generation is younger than the document object 7 itself is obtained (No in #j-1), a process is performed according to the procedure shown in FIG. 50.

When the message relates to a request to permit browsing (Yes in #j-9 in FIG. 50), a parent of the document object 7 itself is searched and specified based on the relationship information 704 (#j-10).

If the document object 7 has a parent (Yes in #j-11), then the document object control program 701 relays a message relating to the request to the parent (#j-12).

If the document object 7 has no parents (No in #j-11), the document object control program 701 determines whether or not permission of browsing should be given (#h-16). The determination may be made by, for example, the same method as the case of determining permission of a replication process described earlier with reference to FIG. 48.

In the case where it is determined that the browsing is permitted (Yes in #j-14), information to that effect, i.e., permission information is sent to the request source as a reply (#j-15). Further, when the request source is a child of its own (Yes in #j-16), an access portion of the child, i.e., an encryption key AK for decoding is also sent (#j-17). The permission information is transferred to younger generations one by one and eventually to the request source.

If the obtained message is permission information (Yes in #j-18), then the information is sent (transferred) to the request source (#j-19). Further, when the request source is a child of its own (Yes in #j-20), an access portion of the child, i.e., an encryption key AK for decoding is also sent (#j-21).

Figure 51:
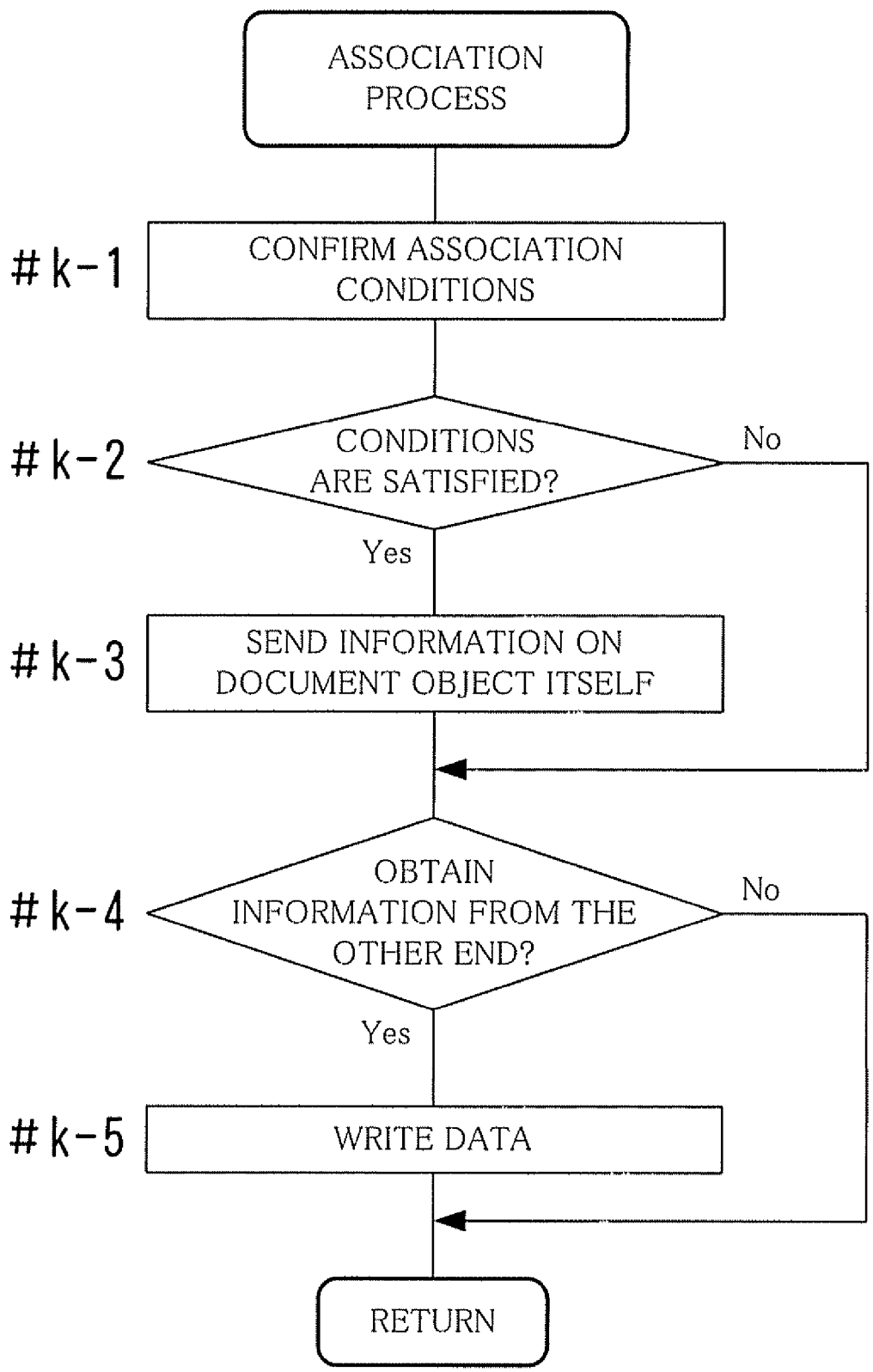
FIG. 51 is a flowchart showing an example of an association process.

Referring back to FIG. 45, in the case where the obtained message relates to association with other document object 7 (Yes in #g-6), a process for association is performed according to the procedure shown in FIG. 51 (#g-7).

Specifically, conditions for association are confirmed by, for example, checking the current relationship between the document object 7 itself and the other document object 7 (#k-1 in FIG. 51). If the conditions are satisfied (Yes in #k-2), then information on the document object 7 itself is sent to the other document object 7 (#k-3).

Upon receiving the information on the other document object 7 (#k-4), the document object control program 701 associates the other document object 7 with the document object 7 itself by updating the relationship information 704 based on the received information (#k-5).

Figure 52:
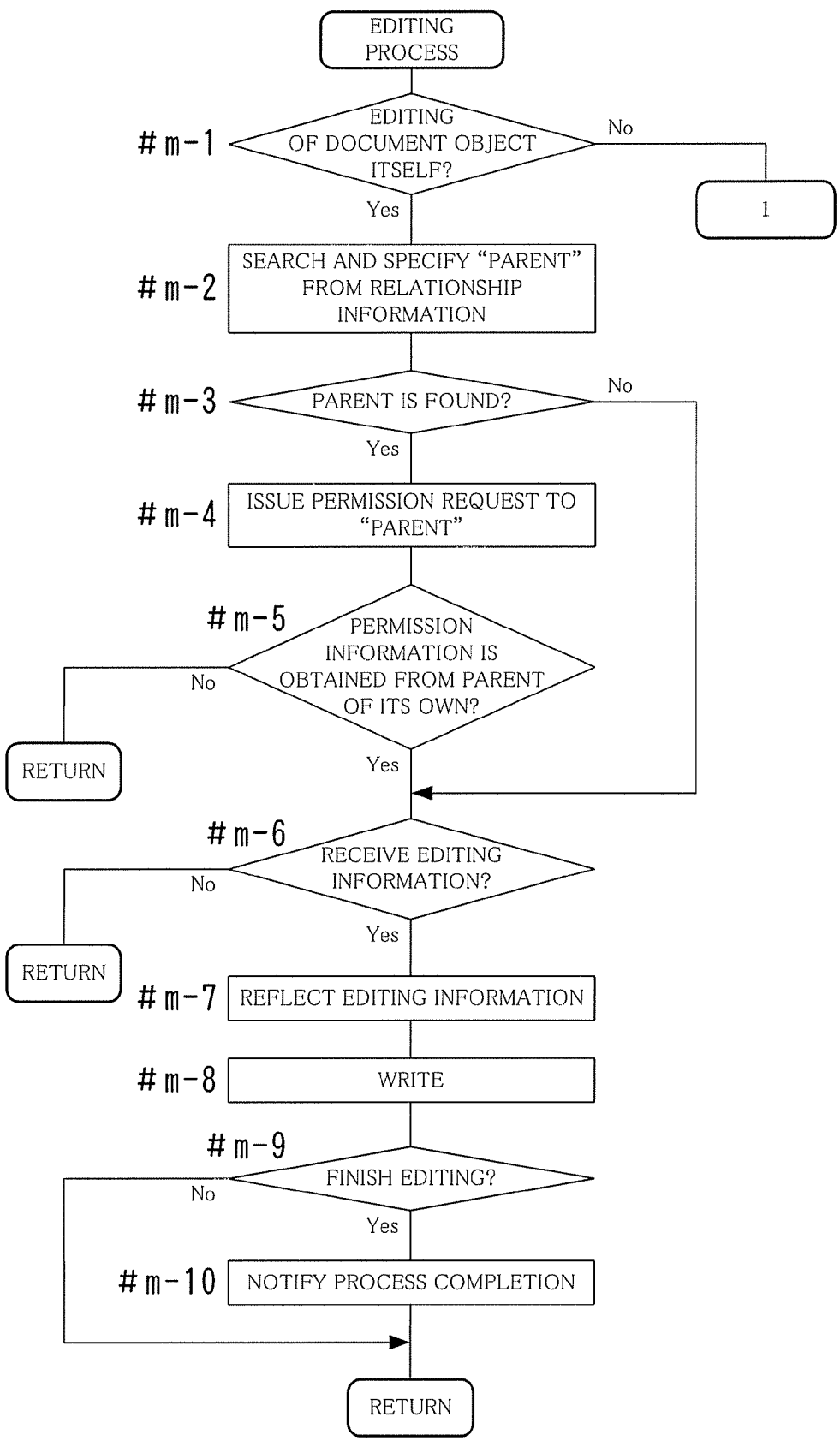
FIG. 52 is a flowchart showing an example of an editing process.
Figure 53:
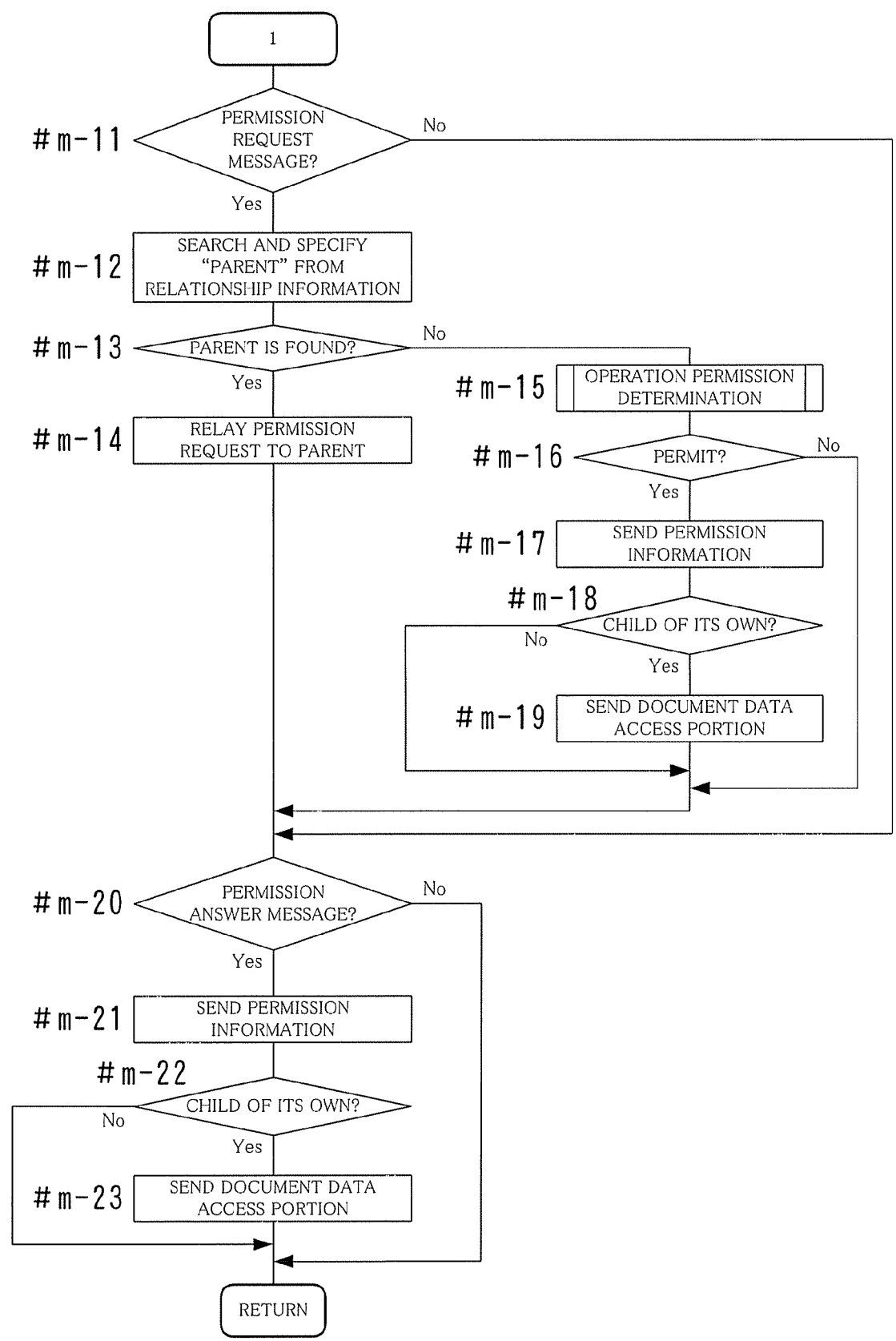
FIG. 53 is a flowchart showing an example of an editing process.

Referring back to FIG. 45, in the case where the obtained message relates to editing of document data 700 of a document object 7 (Yes in #g-8), a process for editing is performed according to the procedure shown in FIGS. 52 and 53 (#g-9).

Specifically, if the obtained message relates to editing of the document data 700 of the document object 7 itself including the document object control program 701 (Yes in #m-1 in FIG. 52), then a parent of the document object 7 itself is searched and specified based on the relationship information 704 (#m-2).

In the case where the document object 7 has no parents (No in #m-3), if information on editing contents operated by a user (editing information) can be received (Yes in #m-6), the document data 700 of the document object 7 is edited (updated) based on the editing information (#m-7). Then, old document data 700 is deleted and the document data 700 after the editing is written (#m-8).

In the case where the document object 7 has a parent (Yes in #m-3), the document object control program 701 requests the parent to permit an editing process (#m-4). Then, if the permission is obtained and an encryption key AK for decoding the document data 700 is obtained (Yes in #m-5), then the document object control program 701 edits (updates) the document data 700 of the document object 7 itself, deletes old document data 700 and writes the document data after the editing (#m-7 and #m-8), as with the case of the absence of a parent.

When the editing process is finished (Yes in #m-9), the document object control program 701 notifies the document object management program 6 of the completion of the editing process (#m-10).

In contrast, in the case where a message relating to editing of document data 700 of other document object 7 whose generation is younger than the document object 7 itself is obtained (No in #m-1), a process is performed according to the procedure shown in FIG. 53.

When the message relates to a request to permit editing (Yes in #m-11 in FIG. 53), a parent of the document object 7 itself is searched and specified based on the relationship information 704 (#m-12).

If the document object 7 has a parent (Yes in #m-13), then the document object control program 701 relays a message relating to the request to the parent (#m-14).

If the document object 7 has no parents (No in #m-13), then the document object control program 701 determines whether or not permission of editing should be given, for example, according to the procedure shown in FIG. 48 (#m-15). The determination may be made by, for example, the same method as the case of determining permission of a replication process described earlier with reference to FIG. 48.

In the case where the document object control program 701 determines that the editing is permitted (Yes in #m-16), information to that effect, i.e., permission information is sent to the request source as a reply (#m-17). Further, when the request source is a child of its own (Yes in #m-18), an access portion of the child, i.e., an encryption key AK for decoding is also sent (#m-19). The permission information is transferred to younger generations one by one and eventually to the request source.

If the obtained message is permission information (Yes in #m-20), then the information is sent (transferred) to the request source (#m-21). Further, when the request source is a child of its own (Yes in #m-22), an access portion of the child, i.e., an encryption key AK for decoding is also sent (#m-23).

Figure 54:
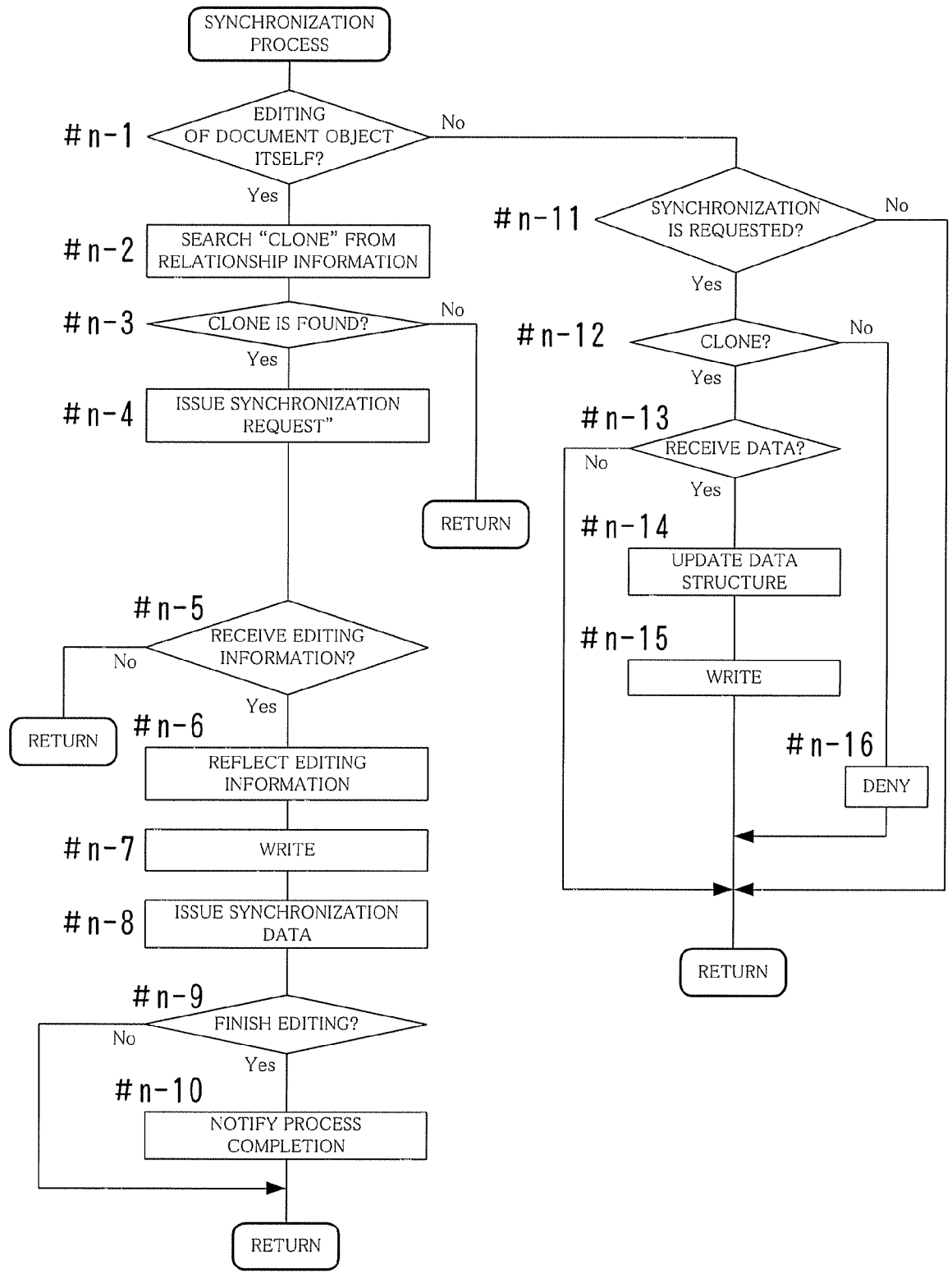
FIG. 54 is a flowchart showing an example of a synchronization process.

Referring back to FIG. 45, in the case where the obtained message relates to synchronization with a clone (Yes in #g-10), a process for synchronization is performed according to the procedure shown in FIG. 54 (#g-11).

Specifically, if the obtained message is one to the effect that the document object 7 itself including the document object control program 701 should be edited (Yes in #n-1 in FIG. 54), then a clone of the document object 7 itself is searched and specified based on the relationship information 704 (#n-2).

If a clone is specified (Yes in #n-3), then the document object control program 701 issues a request for synchronization to the clone (#n-4).

When receiving information on editing contents operated by a user (editing information) (#n-5), the document object control program 701 edits (updates) the document data 700 of the document object 7 itself based on the editing information (#n-6). Then, the document object control program 701 deletes old document data 700 and writes the document data 700 after the editing (#n-7).

Further, in order to make the clone synchronize with the document object 7, the editing information is sent to the clone (#n-8).

When the editing process is finished (Yes in #n-9), the document object control program 701 informs the document object management program 6 of the completion of the synchronization process (#n-10).

In contrast, in the case where editing information (synchronization data) is obtained from the clone (No in #n-1, Yes in #n-11, Yes in #n-12 and Yes in #n-13), the document object control program 701 edits (updates) document data 700 of the document object 7 itself based on the editing information (#n-14). Then, the document object control program 701 deletes old document data 700 and writes the document data 700 after the editing (#n-15).

If editing information is obtained from a document object 7 that is not a clone (No in #n-12), then the document object control program 701 denies the editing information and stops a synchronization process (#n-16).

Figure 55:
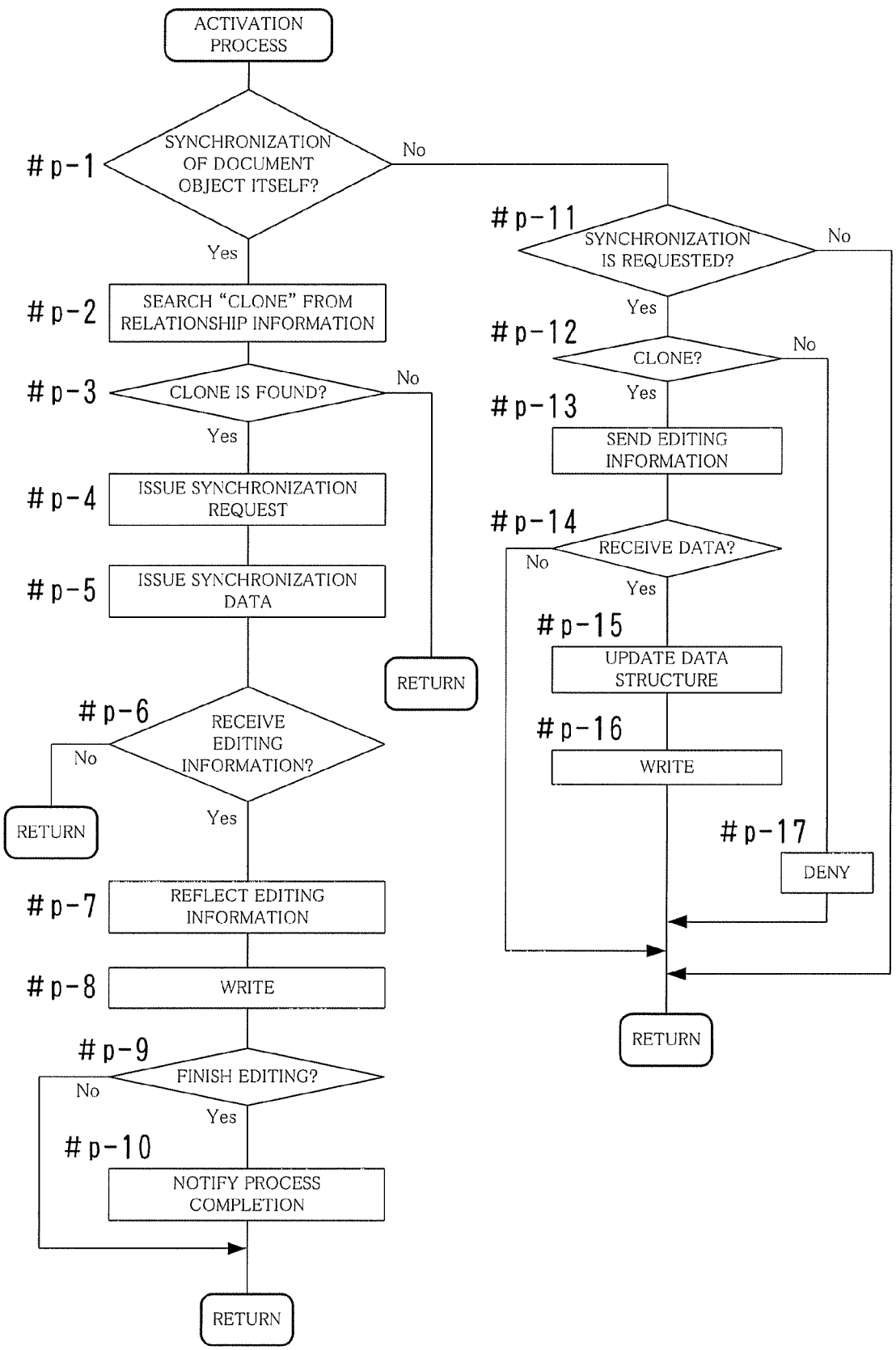
FIG. 55 is a flowchart showing an example of an activation process.

Referring back to FIG. 45, in the case where the obtained message relates to an activation process (Yes in #g-12), a process for activation is performed according to the procedure shown in FIG. 55 (#g-13).

Specifically, if a removable disk is inserted, in order to perform a synchronization process of the document object 7 itself including the document object control program 701 (Yes in #p-1 in FIG. 55), a clone corresponding to the document object 7 is searched from the removable disk based on the relationship information 704 (#p-2).

If a clone is found (Yes in #p-3), then the document object control program 701 issues a request for synchronization to the clone (#p-4), and sends editing information to the clone, indicating the contents of the editing process that is performed on the document data 700 of the document object 7 itself after the clone of the document object 7 itself is caused to be non-activated, i.e., after the removable disk is removed (#p-5).

When receiving the editing information from the clone (#p-6), the document object control program 701 edits (updates) the document data 700 of the document object 7 based on the editing information (#p-7). Then, the document object control program 701 deletes old document data 700 and writes the document data after the editing (#p-8).

If the editing process is finished (Yes in #p-9), then the document object control program 701 notifies the document object management program 6 of the completion of the synchronization process (#p-10).

In contrast, in the case where the document object 7 itself is saved in a removable disk and a request for synchronization is obtained from the clone after the removable disk is activated (No in #p-1, Yes in #p-11, and Yes in #p-12), if the document data 700 of the document object 7 itself is somewhat edited after the previous non-activation, then the document object control program 701 sends editing information indicating the contents of the editing to the clone (#p-13).

When receiving editing information from the clone (Yes in #p-14), the document object control program 701 edits (updates) the document data 700 of the document object 7 based on the editing information (#p-15). Then, the document object control program 701 deletes old document data 700 and writes the document data after the editing (#p-16).

If a request for synchronization is obtained from a document object 7 that is not a clone (No in #p-12), then the document object control program 701 denies the request and stops the synchronization process (#p-17).

This embodiment allows for easy confirmation of data location and others without using a server or the like.

For example, it is possible to easily know where a replication of a document object 7 including the original (first-generation) document data 700 is distributed by tracing parent-child relationship indicated in the relationship information 704.

In addition, it can be understood how a distributed replication is edited only by seeing history information managed by the history management portion 707 of the first generation document data 700.

In this embodiment, replication, browsing and editing are described as examples of events in which document data 700 is used. However, the present invention can apply to events other than those above.

In this embodiment, encryption and decoding of document data 700 are performed based on the common key cryptography. Instead, however, the encryption and decoding may be performed based on the public key cryptography. In such a case, it is preferable that document data 700 is encrypted by a public key and a parent is caused to hold a private key that makes a pair with the public key. Then, when an event in which the document data 700 is used occurs, if authentication is obtained, then the parent may give the private key for decoding.

In the embodiment described above, the overall configuration of the image processing system GSS, the image forming apparatus 1 and the general-purpose computer 2, the configurations of various portions thereof, the details of processing, the processing order, the structure of the document object 7, and the like may be changed as needed, in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A method for managing document data used for reproducing a document the method comprising:
    in a case where second generation document data can be generated by replicating first generation document data that is original document data and (n+1)-th (n≧2) generation document data can be generated by replicating n-th generation document data,
    combining the first generation document data and child identification data in one unit, the child identification data indicating the second generation document data generated by replicating the first generation document data;
    combining k-th (N≧2) generation document data and parent identification data in one unit, the parent identification data indicating which of other (k−1)-th generation document data is replicated to generate the k-th generation document data;
    incorporating, into the unit where the first generation document data is combined, an event execution permission/denial determination program for implementing a determination portion that determines permission/denial of execution of an event relating to document data whose generation is younger than the second generation document data, and
    incorporating, into each of the units where the document data is combined, an information exchange program for implementing an information exchange portion that sends and receives information, and
    when the event relating to the k-th generation document data is executed,
    implementing, in a computer managing the k-th generation document data, the information exchange portion relating to the k-th generation document data by causing the computer to execute the information exchange program,
    implementing, in each computer managing document data that is in a direct line from the k-th generation document data and is older than the k-th generation document data, the information exchange portion relating to each piece of the older document data by causing each of the computers to execute the information exchange program,
    implementing, in a computer managing the first generation document data, the determination portion by causing the computer to execute the determination program,
    giving, to the determination portion implemented in the computer managing the first generation document data, a request to the effect that execution of the event relating to the k-th generation document data should be permitted, by causing each of the information exchange portions relating to each piece of the older document data to relay the request in a manner to deliver the request from the information exchange portion relating to the k-th generation document data to older generation document data based on parent attribute information,
    causing the determination portion to determine whether execution of the event relating to the k-th generation document data is permitted, and
    executing the event in a case where the determination portion determines that execution of the event relating to the k-th generation document data is permitted.

2. The method according to claim 1, further comprising combining, in one unit, log data indicating a log relating to the executed event and any document data that is in a direct line from the document data as a target of the event and is older than the target.

3. The method according to claim 2, further comprising encrypting the k-th generation document data,
    combining, in one unit, document data that is in a direct line from the k-th generation document data and is older than the k-th generation document data and a decryption key for decoding the k-th generation document data, and
    decoding the k-th generation document data using the decryption key of the k-th generation document data in a case where the determination portion determines that execution of the event relating to the k-th generation document data is permitted.

4. The method according to claim 1, further comprising combining, in one unit, execution conditions data indicating conditions for executing the event along with the first generation document data,
    wherein the determination portion determines whether execution of the event based on the execution conditions data is permitted.

5. The method according to claim 1, further comprising combining, in one unit, document data and owner identification data indicating an owner of the document data,
    wherein the determination portion determines whether execution of the event relating to document data based on the execution conditions data is permitted, based on a reply from the owner indicated in the owner identification information relating to the document data.

6. The method according to claim 1, wherein the event is replicating document data as a target.

7. The method according to claim 1, wherein the event is editing document data as a target.

8. The method according to claim 7, further comprising updating, depending on editing details of document data, each piece of document data that is younger or older in a direct line from the document data.

9. The method according to claim 7, further comprising in a case where a medium for backup on which replicated document data is stored is removed from a drive, a replication source of the replicated document data is edited and the medium is mounted again on the drive, updating the replicated document data depending on editing details of the replication source.

10. The method according to claim 1, further comprising in a case where a storage location of m-th generation document data is changed, wherein m≧2,
    updating the child identification data in line with a storage location after the change, the child identification data being combined in a unit along with document data that is in a direct line from the document data and one generation older than the document data, and
    updating the parent identification data in line with the storage location after the change, the parent identification data being combined in a unit along with document data that is in a direct line from the document data and one generation younger than the document data.

* * * * *